(12) United States Patent
Kittaka et al.

(10) Patent No.: US 7,724,997 B2
(45) Date of Patent: May 25, 2010

(54) WAVEGUIDE ELEMENT, METHOD FOR PRODUCING THE WAVEGUIDE ELEMENT, AND OPTICAL SENSOR

(75) Inventors: Shigeo Kittaka, Tokyo (JP); Masatoshi Nara, Tokyo (JP); Keiji Tsunetomo, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 138 days.

(21) Appl. No.: 11/792,904

(22) PCT Filed: Jan. 12, 2006

(86) PCT No.: PCT/JP2006/300288

§ 371 (c)(1),
(2), (4) Date: Mar. 21, 2008

(87) PCT Pub. No.: WO2006/077765

PCT Pub. Date: Jul. 27, 2006

(65) Prior Publication Data

US 2008/0304787 A1    Dec. 11, 2008

(30) Foreign Application Priority Data

Jan. 18, 2005   (JP) ............... 2005-010864

(51) Int. Cl.
G02B 6/34 (2006.01)
G02B 6/02 (2006.01)
(52) U.S. Cl. ........................ 385/37; 385/129
(58) Field of Classification Search ............ 385/12, 385/37, 123–129
See application file for complete search history.

(56) References Cited

U.S. PATENT DOCUMENTS 5,651,818 A * 7/1997 Milstein et al. ............... 117/54

(Continued)

FOREIGN PATENT DOCUMENTS

JP       2002-148187        5/2002

(Continued)

OTHER PUBLICATIONS

Topol'ančik, et al., "Fluid detection with photonic crystal-based multichannel waveguides", Applied Physics Letters, vol. 82, No. 8, Feb. 24, 2003, pp. 1143-1145.

(Continued)

*Primary Examiner*—Uyen-Chau N Le
*Assistant Examiner*—Rhonda S Peace
(74) *Attorney, Agent, or Firm*—Hamre, Schumann, Mueller & Larson, P.C.

(57) ABSTRACT

A waveguide element 21 including a photonic crystal waveguide including a core 4 that is constituted by a photonic crystal having a refractive index periodicity at least in one direction, and that propagates an electromagnetic wave in a direction in which the photonic crystal does not have the refractive index periodicity. At least one of materials forming the core 4 constituted by the photonic crystal, and at least a portion of a cladding in contact with a side face of the core 4 are constituted by a fluid 6. Thus, it is possible to provide a waveguide element that can be used as a light control element, can be produced easily and also can be applied to an optical sensor.

27 Claims, 29 Drawing Sheets

U.S. PATENT DOCUMENTS

| | | |
|---|---|---|
| 6,134,043 A | 10/2000 | Johnson et al. |
| 6,597,721 B1 | 7/2003 | Hutchinson et al. |
| 2003/0142385 A1 | 7/2003 | Kittaka et al. |
| 2003/0174402 A1 | 9/2003 | Kittaka et al. |
| 2003/0174961 A1 | 9/2003 | Hamada |
| 2004/0069948 A1* | 4/2004 | Feisst et al. ............... 250/343 |
| 2005/0017178 A1 | 1/2005 | Ogawa et al. |
| 2005/0200942 A1* | 9/2005 | Grot et al. ................ 359/321 |
| 2006/0078263 A1* | 4/2006 | Kittaka et al. ............. 385/129 |
| 2006/0188398 A1* | 8/2006 | Yano et al. ............. 422/82.01 |
| 2007/0058915 A1* | 3/2007 | Kittaka et al. ............. 385/129 |

FOREIGN PATENT DOCUMENTS

| | | |
|---|---|---|
| JP | 2005-91467 | 4/2005 |
| WO | 98/53351 | 11/1998 |

OTHER PUBLICATIONS

Stanev, et al, "Coupled waveguides for Raman studies of thin liquid films", J. Phys. D: Appl. Phys. 31 (1998), pp. 1782-1786.

Yin, et al., "Integrated biophotonic sensor with single-molecule resolution", CLEO/IQEC/PhAST, 2004, CThI4.

* cited by examiner

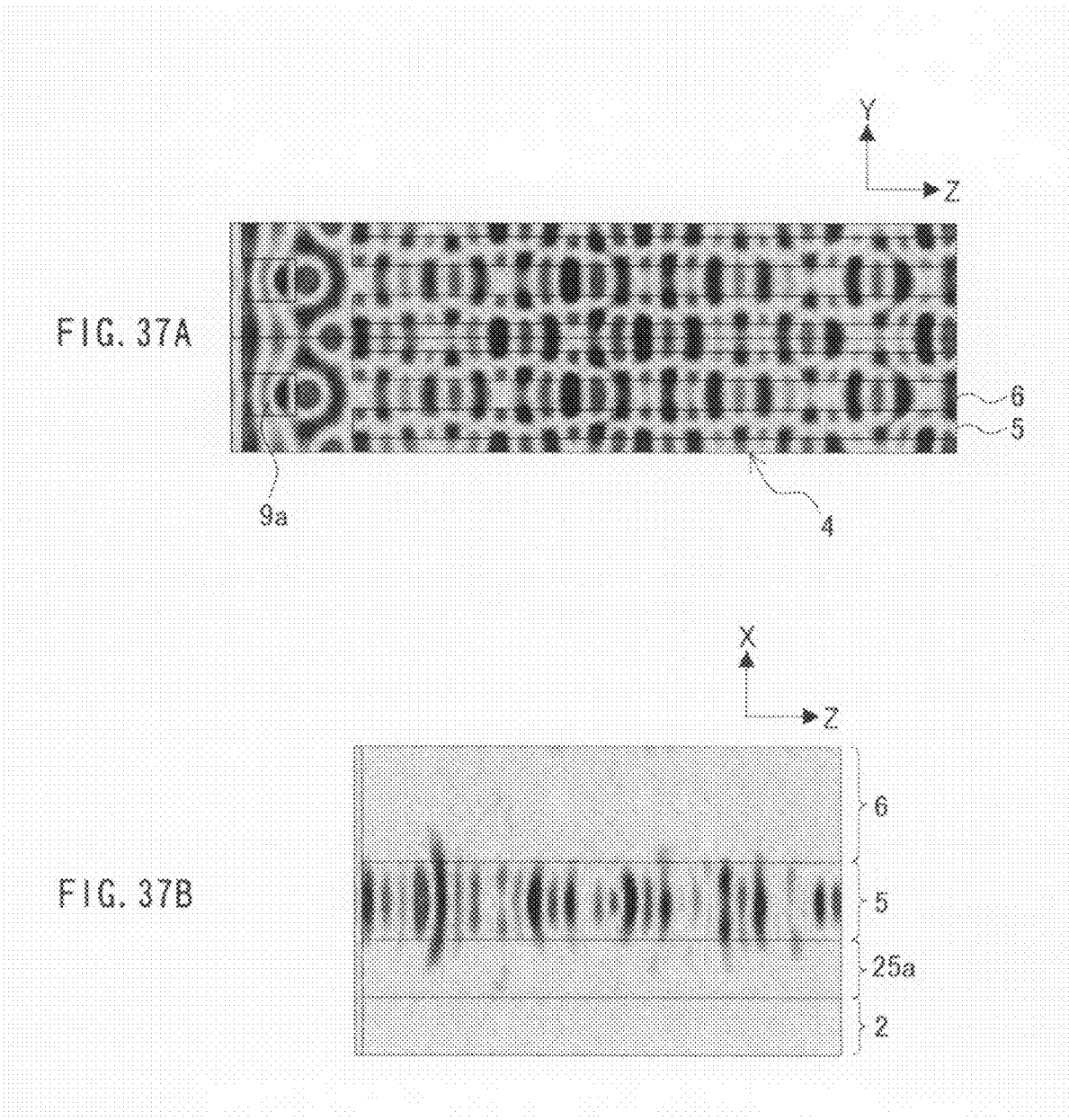

ent through this waveguide, for example, it is possible to detect the characteristics of the test substance. In this case, the energy density of light is high, so that it is possible to perform highly accurate measurement. Furthermore, the measurement accuracy of the optical sensor using a waveguide is improved by increasing the length of the waveguide. The reason is that this allows an increase of the volume of a portion of the test substance that interacts with light. Thus, the measurement accuracy of the optical sensor using a waveguide can be improved easily. However, it is difficult to use air and an aqueous solution as the core of the waveguide, since they have a lower refractive index than a glass material, which is a typical component of a waveguide. Therefore, the optical sensor using a waveguide has a problem in that it is difficult to use air or an aqueous solution as the test substance.

WAVEGUIDE ELEMENT, METHOD FOR PRODUCING THE WAVEGUIDE ELEMENT, AND OPTICAL SENSOR

TECHNICAL FIELD

The present invention relates to a waveguide element using a photonic crystal in the form of a waveguide, a method for producing the waveguide element, and an optical sensor to which the waveguide element is applied.

BACKGROUND ART

Recently, various optometric devices and optical sensors for detecting the characteristics of substances using light have been proposed and also put into practical use. Examples of such optometric devices and optical sensors include a spectroscopic analysis apparatus for analyzing absorption spectra, a surface plasmon resonance (hereinafter, referred to as "SPR") sensor, an optical sensor using a nonlinear emission phenomenon, and an optical sensor using a waveguide. These will be described in the following.

First, the spectroscopic analysis apparatus for absorption spectra will be described, which is used as a common spectrophotometer. The principle of this apparatus is that a spectrum generated by causing a monochromatic light beam to be transmitted through a given gas sample, liquid sample, or transparent solid sample is measured, and this spectrum is compared with the spectrum of a reference cell to detect an absorption peak unique to such a sample.

Next, the SPR sensor will be described. Recently, extensive research and development have been carried out on SPR sensors. SPR sensors utilize a surface plasmon excited at the interface between a metal film and a test substance to detect the characteristics of the test substance. SPR sensors have the characteristics that alteration of the test substance due to light will not occur, since the interaction between light and the test substance (for example, an aqueous solution) is limited to the vicinity of the surface of the metal film.

Next, the optical sensor using a nonlinear emission phenomenon will be described. When a substance is irradiated with incident light, light emission (nonlinear emission) having a frequency different from that of the irradiation light sometimes may be generated due to a nonlinear effect. This optical sensor uses this nonlinear emission to analyze a test substance. Analyses using a nonlinear emission phenomenon include fluorescence analysis, Raman scattering analysis, analysis using two-photon absorption fluorescence reaction, and analyses using second harmonic generation (hereinafter, referred to as "SHG") and third harmonic generation (hereinafter, referred to as "THG"). The intensities of Raman scattering, two-photon absorption fluorescence reaction, SHG and THG, and so on are proportional to the square or cube of the electric field intensity. Accordingly, in order to efficiently cause the effects of these types of emission, it is necessary to increase the energy density of the incident light. Therefore, a method is also adopted in which nonlinear emission is caused by forming a focal point of incident light in a test substance using a lens, and the thus generated nonlinear emission is condensed for analysis.

Next, the optical sensor using a waveguide will be described. When a focal point of incident light is formed in a test substance using a lens, the region having a high light energy density is limited to near the focal point. Therefore, by producing a waveguide including a test substance as a core, and propagating light through that waveguide, it is possible to increase the energy density of light in the test substance over a long distance. By analyzing the light propagating Examples of the optical sensor using a nonlinear luminous phenomenon and the optical sensor using a waveguide are described in Non-patent Document 1 and Non-patent Document 2, for example.

The optical sensor described in Non-patent Document 1 includes a pair of adjacent slab waveguides. This optical sensor is configured such that the gap between the pair of slab waveguides is filled with a liquid test substance, light is propagated through the pair of slab waveguides to generate Raman scattering light, and this light is utilized to detect the characteristics of the test substance. The gap portion between the pair of slab waveguides that is filled with the test substance is an area in which the intensity of the propagation light becomes the highest, so that it is possible to perform highly accurate measurement. Furthermore, increasing the length of the slab waveguides can expand the region in which the interaction between light and the test substance occurs, making it possible to increase the intensity of Raman scattering light even further.

The optical sensor described in Non-patent Document 2 includes a hollow waveguide surrounded by a dielectric multilayer film. In this optical sensor, the hollow part of the hollow waveguide is filled with a liquid test substance to form a waveguide including the test substance as the core. Propagation light is confined within the core by the Bragg reflection effect of the surrounding multilayer film, and this propagation light is used to measure the test substance. Furthermore, it is also possible to confine fluorescence generated by supplying excitation light to the core portion within the core, and collect this from the end face of the waveguide. It is also possible to use this fluorescence to detect the characteristics of the test substance.

Non-patent Document 1: G Stanev, N Goutev, Zh S Nickolov, "Coupled waveguides for Raman studies of thin liquid films", Appl. Phys. 31 (1998), p. 1782-1786

Non-patent Document 2: Dongliang Yin, David W. Deamer, Holger Schmidt, John P. Barber, Aaron R. Hawkins, "Integrated biophotonic sensor with single-molecule resolution", CLEO/IQEC/PhAST, 2004, CThI4

DISCLOSURE OF INVENTION

Problem to be Solved by the Invention

Although the various optical sensors have been described above, these optical sensors have the following problems.

First, it is difficult to reduce the size of the spectroscopic analysis apparatus for absorption spectra, since the thickness of a sample through which light beams are transmitted needs to be increased in order to increase the sensitivity.

The characteristic that can be measured using the SPR sensor substantially is limited to the refractive index of a liquid.

In optical sensors using a nonlinear emission phenomenon, nonlinear emission is spatially and temporally incoherent, so that it is necessary to condense the nonlinear emission, for example, using a lens having a large numerical aperture, and to separate the emission after improving the coherency using slits. Therefore, optical sensors using a nonlinear emission phenomenon experience a great loss of light energy.

In the optical sensor described in Non-patent Document 1, which is an optical sensor using a waveguide, the gap between the pair of slab waveguides must be very narrow, so that the volume of the portion of the liquid serving as the test substance that interacts with light cannot be increased, making it impossible to improve the measurement accuracy. In the case of the optical sensor described in Non-patent Document 2, which is an optical sensor using a waveguide, it is difficult to fill the hollow part with the test substance, or to remove the test substance from the hollow part.

The present invention was made to solve the above-described problems in the conventional technology, and it is an object of the invention to provide a waveguide element that can be used as a light control element, can be produced easily, and also can be used as an optical sensor, a method for producing the waveguide element, and an optical sensor to which the waveguide element is applied.

Means for Solving Problem

In order to achieve the above-described object, a waveguide element according to the present invention includes: a photonic crystal waveguide including a core that is constituted by a photonic crystal having a refractive index periodicity at least in one direction, and that propagates an electromagnetic wave in a direction in which the photonic crystal does not have the refractive index periodicity. At least one of materials forming the core constituted of the photonic crystal, and at least a portion of a cladding in contact with a side face of the core are constituted of a fluid.

An optical sensor according to the present invention includes: a waveguide portion that propagates light; an input portion that makes light incident on the waveguide portion; and a detection portion that detects light emitted from the waveguide portion. The waveguide portion has a configuration in which a plurality of flat plates are provided on a substrate such that they are parallel to each other and perpendicular to the substrate, and a fluid serving as a test substance can be disposed between the flat plates and around each of the flat plates.

A method for producing a waveguide element according to the present invention includes: forming, on a substrate, a plurality of flat plates such that they are parallel to each other and perpendicular to the substrate; disposing a fluid between the flat plates and around each of the flat plates; and solidifying the fluid.

EFFECTS OF THE INVENTION

The waveguide element according to the present invention can be used as a light control element, and also can be produced easily. Furthermore, the waveguide element of the present invention also can be applied to an optical sensor, and can perform highly accurate measurement, in spite of its simple configuration.

BRIEF DESCRIPTION OF DRAWINGS

FIG. 37A shows the simulation results of Calculation Example 2, illustrating the electric field intensity distribution in the YZ plane of the waveguide element.

FIG. 37B shows the simulation results of Calculation Example 2, illustrating the electric field intensity distribution in the XZ plane of the waveguide element.

DESCRIPTION OF THE INVENTION

Figure 1:
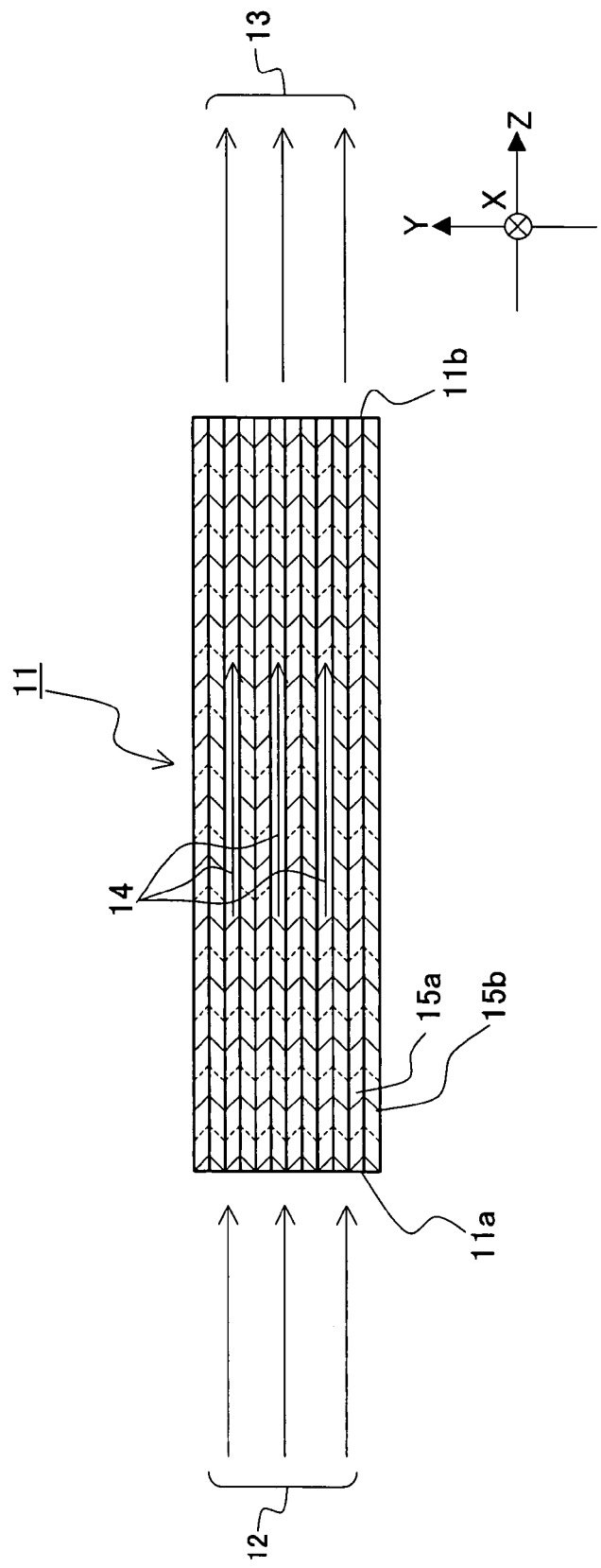
FIG. 1 is a cross-sectional view showing the propagation of electromagnetic waves in a photonic crystal having a refractive index periodicity in one direction.

The waveguide according to the present invention can be produced easily, since its core and a portion of its cladding are constituted by a fluid, and the waveguide can be formed by immersing its portion other than the fluid in the fluid. Furthermore, the waveguide element of the present invention can use an aqueous solution, air and the like, which have a relatively low refractive index, as a part of the core. Furthermore, the wave guide element of the present invention also can be used as a light control element, since its core is constituted by a photonic crystal. Here, "fluid" refers to a material that easily can be altered in shape, such as a liquid or a gas.

In the configuration of the waveguide element according to the present invention, it is preferable that the at least a portion of the cladding in contact with the side face of the core is in contact with at least one side face of the core that is parallel to the direction in which the photonic crystal has the refractive index periodicity, and when the period in a traveling direction of an electromagnetic wave propagating through the core is $\lambda_Z$, the refractive index of the fluid is $n_F$, the period of the core constituted by the photonic crystal is a, and the vacuum wavelength of an electromagnetic wave propagating through the core is $\lambda_0$, then the following condition is satisfied:

$$a\lambda_Z/(\lambda_Z^2/4+a^2)^{0.5} < \lambda_0/n_F$$

According to this preferred example, the propagation light will not leak from at least one side face of the core that is parallel to the direction in which the photonic crystal has the refractive index periodicity, so that it is possible to achieve a waveguide element with a low propagation loss.

In the configuration of the waveguide element of the present invention, it is preferable that a plurality of flat plates are provided at equal intervals on a substrate such that they are parallel to each other and perpendicular to the substrate, the fluid is disposed between the flat plates and around each of the flat plates, the core constituted by the photonic crystal is formed by the flat plates and the fluid disposed between the flat plates, and the fluid disposed on the side face of the core constitutes the at least a portion of the cladding. According to this preferred example, the waveguide element can be formed by simply immersing the substrate on which the flat plates are provided in the fluid, and therefore can be produced easily. In this case, it is also preferable that, when the period in a traveling direction of an electromagnetic wave propagating through the core is $\lambda_Z$, the refractive index of the fluid is $n_F$, the period of the core constituted by the photonic crystal is a, and the vacuum wavelength of the electromagnetic wave propagating through the core is $\lambda_0$, the following condition is satisfied:

$$a\lambda_Z/(\lambda_Z^2/4+a^2)^{0.5} < \lambda_0/n_F$$

According to this preferred example, the propagation light will not leak from the surface included in the side faces of the core that is parallel to the direction in which the photonic crystal has the refractive index periodicity and is in contact with the cladding constituted by the fluid, so that it is possible to achieve a waveguide element with a low propagation loss. In this case, it is also preferable that, when the refractive index of the substrate is $n_S$, the following condition is satisfied:

$$a\lambda_Z/(\lambda_Z^2/4+a^2)^{0.5} < \lambda_0/n_S$$

According to this preferred example, the propagation light will not leak from the surface included in the side faces of the core that is in contact with the substrate, so that it is possible to achieve a waveguide element with a low propagation loss. In this case, it is also preferable that the following condition is satisfied:

$$\lambda_Z < \lambda_0/n_F$$

According to this preferred example, the propagation light will not leak from the surface included in the side faces of the core that is perpendicular to the direction in which the photonic crystal has the refractive index periodicity, so that it is possible to achieve a waveguide element with a low propagation loss. Furthermore, it is preferable that a plurality of cladding flat plates further are provided at equal intervals outside the core on the substrate in the direction in which the core has the refractive index periodicity such that they are parallel to each other and perpendicular to the substrate, the thickness of the plurality of flat plates is different from the thickness of the plurality of cladding flat plates, or the interval between the flat plates and the interval between the cladding flat plates is different, the fluid is immersed between the cladding flat plates and around each of the cladding flat plates, and the cladding flat plates and the fluid constitute a cladding that confines light to the core, using a photonic band gap. According to this preferred example, the cladding flat plates and the fluid constitute the one-dimensional photonic crystal, and the propagation light will not leak from the surface of the core that is on the one-dimensional photonic crystal side, so that it is possible to achieve a waveguide element with a low propagation loss. Furthermore, the waveguide element can be formed by simply immersing the substrate on which the flat plates and the cladding flat plates are provided in the fluid, and therefore can be produced easily. Furthermore, it is preferable that a multilayer film laminated in a direction perpendicular to a principal plane of the substrate is provided between the substrate and the plurality of flat plates. According to this preferred example, by designing the multilayer film such that the propagation light will not leak from the side face of the core that is on the substrate side, it is possible to select the material used for the substrate, without taking into consideration the refractive index of the material. Furthermore, it is preferable that a low refractive index layer made of a material having a lower refractive index than the substrate is provided between the substrate and the plurality of flat plates, and when the refractive index of the low refractive index layer is $n_{SL}$, the following condition is satisfied:

$$a\lambda_Z/(\lambda_Z^2/4+a^2)^{0.5}<\lambda_0/n_{SL}$$

According to this preferred example, it is possible to select the material used for the substrate, without taking into consideration the refractive index of the material.

Furthermore, it is preferable that the configuration of the waveguide element according to the present invention includes an input portion that causes, in the core, propagation light due to a photonic band on a Brillouin zone boundary. According to this preferred example, it is possible to propagate, through the core, propagation light due to a band on a Brillouin zone boundary, so that it is possible to achieve a light control element such as an optical delay element or a dispersion compensation element in optical communications. In this case, it is also preferable that the propagation light due to the band on the Brillouin zone boundary is propagation light due to a first band or a second band. In this case, it is also preferable that the input portion is a waveguide having no periodic structure. In this case, it is also preferable further to include a substrate on whose principal plane the core constituted by the photonic crystal is disposed, and an input-side end face of the core is perpendicular to the principal plane of the substrate, and is not parallel, but inclined with respect to the direction of the periodicity of the core. According to this preferred example, it is possible to realize an input portion that can cause propagation light due to a band on a Brillouin zone boundary in the core with a simple configuration. In this case, it is also preferable that the input portion includes a phase grating having a period that is twice the period of the core. According to this preferred example, it is possible to realize an input portion that can cause propagation light due to a band on a Brillouin zone boundary in the core with a simple configuration.

Furthermore, it is preferable that the configuration of the waveguide element according to the present invention includes an input portion that causes, in the core, propagation light of a propagation mode in a photonic band that is located on a center line of a Brillouin zone or in the vicinity thereof and is not the lowest-order band. In this case, it is also preferable that the input portion is a waveguide having no periodic structure. In this case, it is also preferable further to include a substrate on whose principal surface the core constituted by the photonic crystal is disposed, and an input-side end face of the core is perpendicular to the principal surface of the substrate, and is not parallel, but inclined with respect to the direction of the periodicity of the core. In this case, it is also preferable that the input portion includes a phase grating having a period that is identical with the period of the core. According to this preferred example, it is possible to realize an input portion that can cause, in the core, propagation light of a propagation mode in a photonic band that is located on a center line of a Brillouin zone or in the vicinity thereof and is not the lowest-order band with a simple configuration.

Furthermore, the optical sensor according to the present invention can perform highly accurate measurement with a simple configuration, without the need to increase its size. Moreover, the optical sensor of the present invention can perform highly accurate measurement also on an aqueous solution and air, which have a relatively low refractive index, although it is an optical sensor using a waveguide.

In the configuration of the optical sensor according to the present invention, it is preferable that the detection portion detects the type, intensity, frequency or phase of the light emitted from the waveguide portion.

In the configuration of the optical sensor according to the present invention, it is preferable that a layer that selectively reacts with a specific component contained in the test substance is formed on at least a portion of a surface of the flat plates. According to this preferred example, it is possible to detect whether the test substance reacts with a specific component, or the change resulting from such reaction.

In the configuration of the optical sensor according to the present invention, it is preferable that a metal film is formed on at least a portion of a surface of the flat plates. According to this preferred example, it is possible to allow the optical sensor to function as an SPR sensor. In this case, it is also preferable that a layer that selectively reacts with a specific component contained in the test substance is further formed on at least a portion of a surface of the metal film. According to this preferred example, it is possible to detect whether the test substance reacts with a specific component, or the change resulting from such reaction with the SPR sensor.

Furthermore, with the method for producing a waveguide element according to the present invention, it is possible to produce easily a waveguide element that is made entirely of a solid, by solidifying the fluid portion of a waveguide element that is partly constituted by the fluid.

In the following, embodiments of the present invention will be described specifically with reference to the drawings.

First, the propagation of light (electromagnetic waves) through a photonic crystal having a structure with a periodic refractive index (refractive index periodic structure) will be described. In particular, methods for propagating higher-order mode light will be described.

FIG. 1 is a cross-sectional view showing the propagation of electromagnetic waves in a photonic crystal having a refractive index periodicity in one direction. In FIG. 1, the direction in which the photonic crystal has a refractive index periodicity (the direction of refractive index period) is the Y-axis direction, and directions that are perpendicular to the Y-axis direction and are perpendicular to each other are the X-axis direction and the Z-axis direction. A photonic crystal 11 is a one-dimensional photonic crystal having a refractive index periodicity only in the Y-axis direction. Materials 15a and 15b are laminated alternately in the Y-axis direction to form a multilayer structure. The thickness (length in the Y-axis direction) of the material 15a is $t_A$, and the refractive index of the material 15a is $n_A$. The thickness (length in the Y-axis direction) of the material 15b is $t_B$, and the refractive index of the material 15b is $n_B$. The photonic crystal 11 is a multilayer structure with a period "a" in which the materials 15a and 15b are laminated alternately. The period a is ($t_A+t_B$).

In FIG. 1, the photonic crystal 11 constitutes a core, and a medium existing around the side faces of the photonic crystal 11 serves as a cladding. The core and cladding constitute an optical waveguide. Although not shown in the drawing, the cladding may be air, for example. When a plane wave with a vacuum wavelength of $\lambda_0$ is made incident as incident light 12 from an end face 11a, which is an incident end of the photonic crystal 11 that is perpendicular to the Z-axis, the incident light 12 propagates through the photonic crystal 11 as propagation light 14. The propagation light 14 is emitted as outgoing light 13 from an end face 11b, which is an outgoing end opposite to the incident end. The manner in which the propagation light 14 propagates through the multilayer film of the materials 15a and 15b in the photonic crystal 11 can be determined by calculating and plotting the photonic bands. Methods of the photonic band calculation are described in detail in "Photonic Crystals", Princeton University Press (1995) and in Physical Review B, vol. 44, No. 16, p. 8565, 1991, for example.

The band calculation is performed under the assumption that the photonic crystal 11 shown in FIG. 1 has a periodic structure continuing infinitely in the Y-axis direction (the lamination direction), and extends infinitely in the X-axis direction and the Z-axis direction (the directions in which the layer surfaces extend). The conditions determined by the band calculation will be described below. Since this band calculation is performed for the photonic crystal 11 shown in FIG. 1, the conditions determined by the band calculation will be described with reference to FIG. 1.

Figure 2:
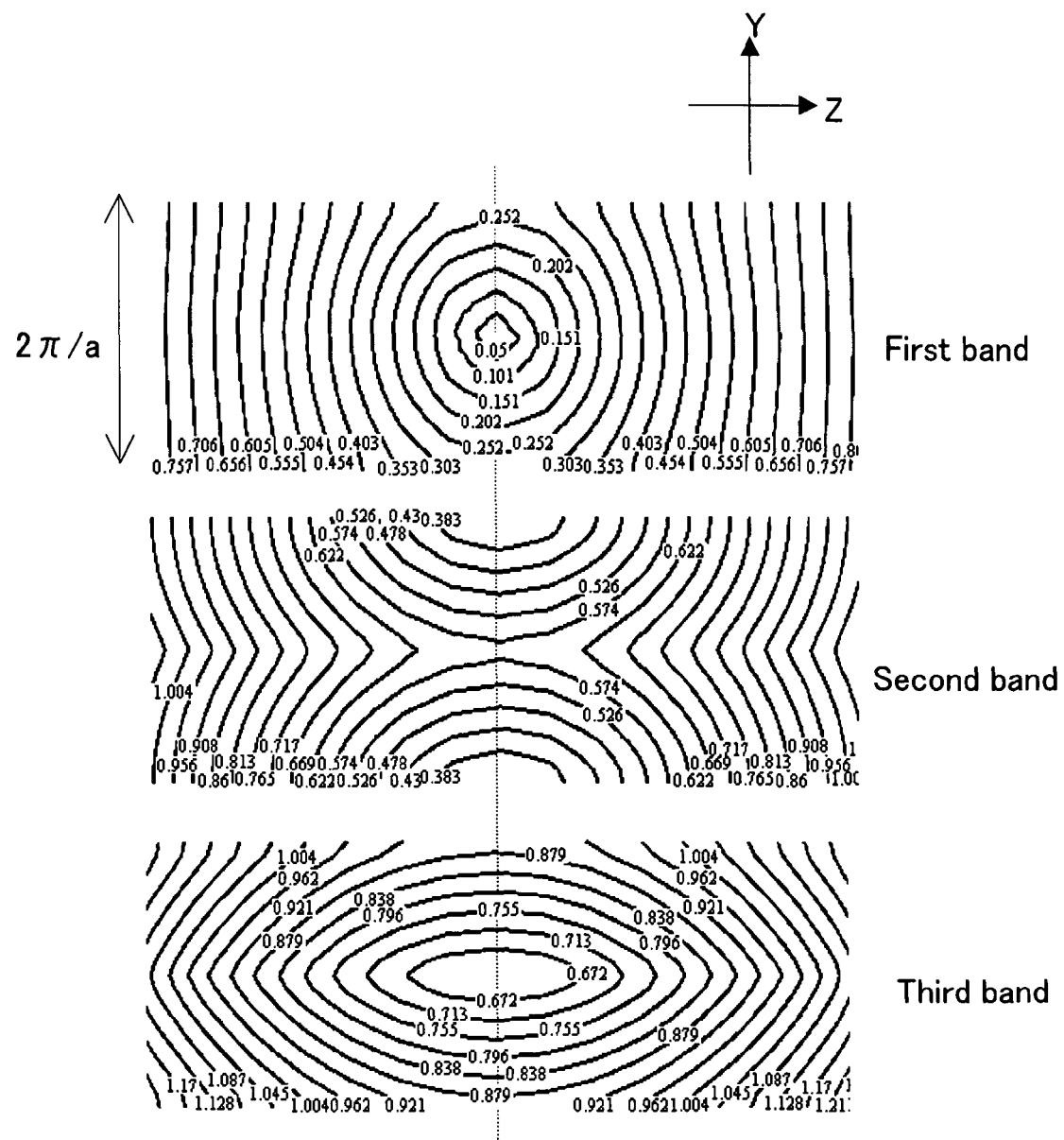
FIG. 2 is a band diagram for the photonic crystal shown in FIG. 1.

FIG. 2 is a band diagram for the photonic crystal 11 shown in FIG. 1. The conditions of the photonic crystal 11 at this time are as follows. First, the refractive index $n_A$ of the material 15a is 2.1011, and the thickness $t_A$ is $t_A$=0.3 a, when expressed in terms of the period a. The refractive index $n_B$ of the material 15b is 1.4578, and the thickness $t_B$ is $t_B$=0.7 a, when expressed in terms of the period a. FIG. 2 shows the results of the band calculation for the photonic crystal 11 in the Y-axis direction and the Z-axis direction, which is a multilayer structure with the period a in which layers of the materials 15a and 15b are laminated alternately. It should be noted that FIG. 2 shows the first, second and third bands for TE polarized light within the range of the first Brillouin zone. FIG. 2 shows contour lines defined by connecting the points with equal normalized frequencies $\omega a/2\pi c$. Hereinafter, the contour line is referred to as "equal frequency line". The subscripts on the lines denote the values of normalized frequency $\omega a/2\pi c$. The normalized frequency $\omega a/2\pi c$ is expressed using the angular frequency $\omega$ of the incident light 12, the period a of the multilayer structure, and the vacuum light velocity c. The normalized frequency also can be expressed as $a/\lambda_0$, using the vacuum wavelength $\lambda_0$ of the incident light 12. In the following, the normalized frequency simply is expressed as $a/\lambda_0$.

In FIG. 2, the width in the Y-axis direction of the Brillouin zone in the photonic crystal 11 is $2\pi/a$. However, since there is no periodicity in the Z-axis direction, the structure spreads infinitely in the lateral direction (Z-axis direction) without any Brillouin zone boundary. The TE polarized light refers to polarized light whose electric field direction is the X-axis direction. The band diagram of TM polarized light whose magnetic field direction is the X-axis direction is not shown. The band diagram of TM polarized light is similar to that of the TE polarized light, but has a somewhat different shape.

The propagation light 14 in the photonic crystal 11 that corresponds to the plane wave (incident light 12) incident on the end face 11a of the photonic crystal 11 will be investigated.

Figure 3:
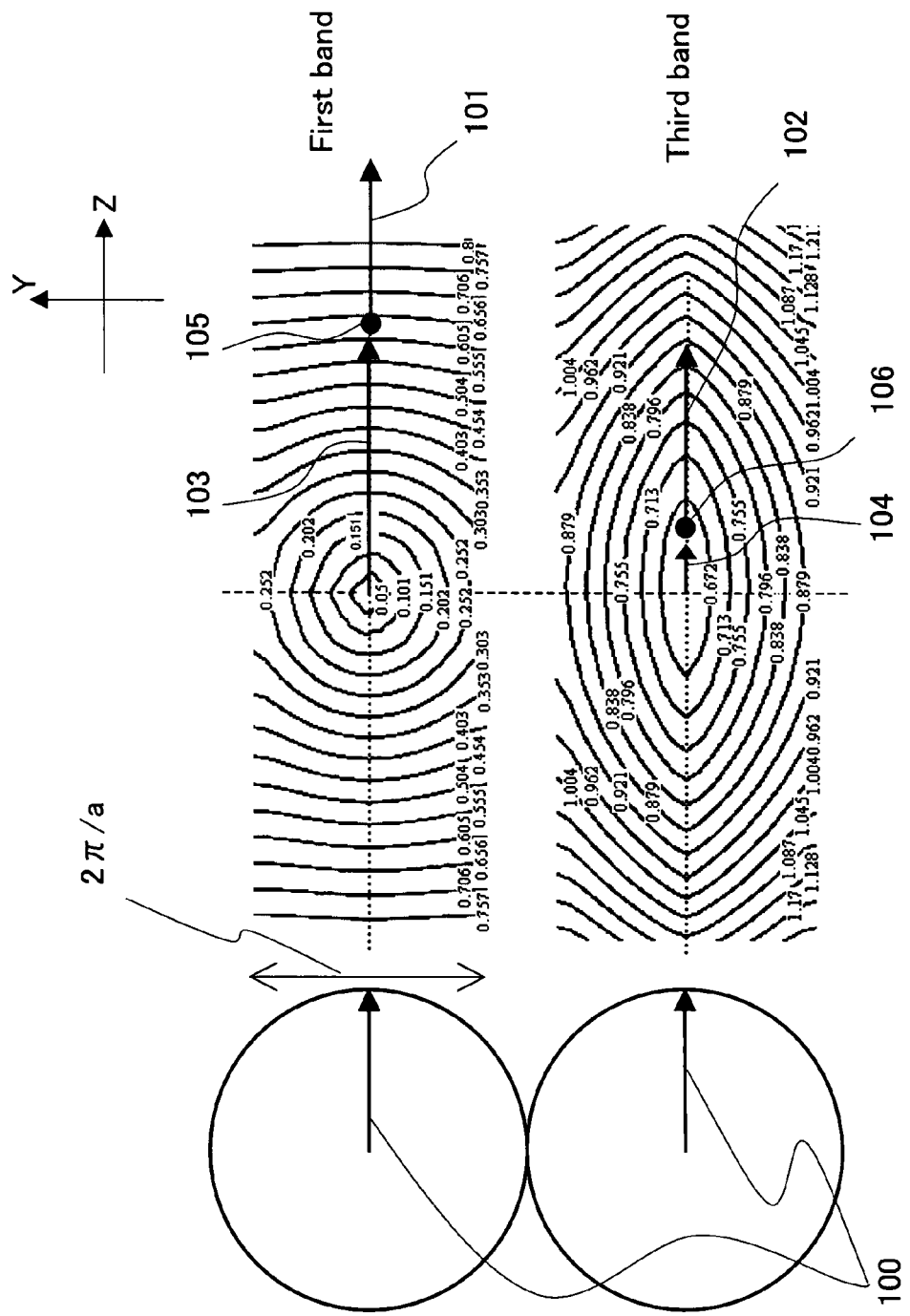
FIG. 3 is a band diagram for illustrating the propagation of light, including the incident light onto the photonic crystal shown in FIG. 1.

FIG. 3 is a band diagram for illustrating the propagation of light, including the incident light onto the photonic crystal 11 shown in FIG. 1. As shown in FIG. 3, a coupled band of the photonic crystal 11 can be determined by creating the drawing.

Specifically, FIG. 3 is a band diagram for the case where a plane wave (TE polarized light) with a specific frequency of $a/\lambda_0$ is made incident in the Z-axis direction from the end face 11a of the photonic crystal 11 shown in FIG. 1. As will be described below, since no propagation light in the second band is present, only the band diagram for the first and third bands is shown in FIG. 3. Additionally, the medium in contact with the end face 11a, which is perpendicular to the Z-axis, that is, the medium serving as the cladding existing around the photonic crystal 11, is a homogeneous medium whose refractive index n is uniform.

In FIG. 3, the band diagram in the photonic crystal 11 is shown on the right side, and the band diagram of the homogeneous medium, which is the outside of the photonic crystal 11, is shown on the left side. Additionally, in FIG. 3, the upper section shows the coupling between the incident light and the first band, and the lower section shows the coupling between the incident light and the third band. Since the incident light 12 is incident on the end face 11a from the homogeneous medium, the band diagram of the incident light 12 is the band diagram in the homogeneous medium.

Here, the band diagram of the homogeneous medium is shown as a sphere (a circle on the YZ plane) having a radius r represented by the following expression:

$$r = n \cdot (a/\lambda_0) \cdot (2\pi/a)$$

In the above equation, the term ($2\pi/a$) on the right-hand side is a coefficient for making this band diagram correspond to the band diagram of the photonic crystal 11.

In FIG. 3, corresponding points 105 and 106, at which the normalized frequency $a/\lambda_0$ matches that of the incident light 12, are present on the first and third bands, so that waves corresponding to the respective bands propagate through the photonic crystal 11. Additionally, in FIG. 3, the direction and the period of the wavefront of the incident light 12 are expressed by the reciprocals of the direction and the length of arrows 100, which are wave vectors, and the direction and the period of the wavefront of the propagation light 14 similarly are expressed by the reciprocals of the direction and the length of arrow 103 (the first band) and arrow 104 (the third band), which are wave vectors. Further, the traveling direction of the wave energy of the propagation light 14 is the direction normal to the equal frequency lines, and indicated by arrows 101 and 102. Thus, the propagation light due to each of the bands travels in the Z-axis direction.

Figure 4:
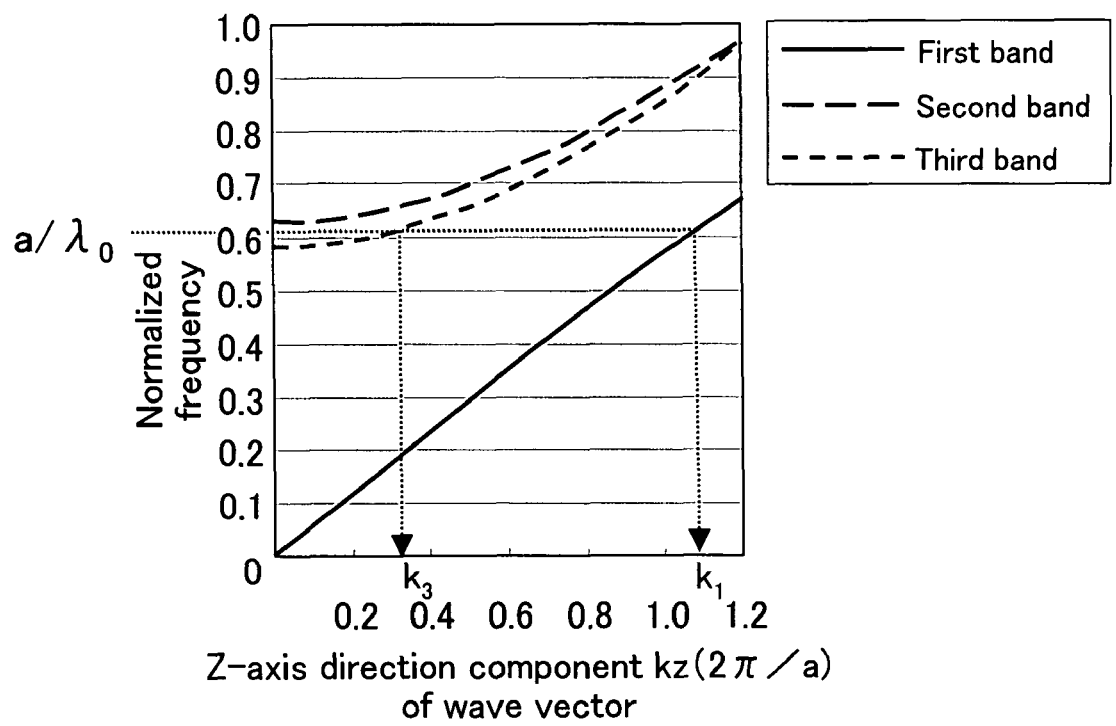
FIG. 4 is a band diagram showing the band diagram of FIG. 3 only for the Z-axis direction.

FIG. 4 is a band diagram showing the band diagram of FIG. 3 only for the Z-axis direction. In FIG. 4, the horizontal axis denotes a Z-axis direction component kz of the wave vector, and the vertical axis denotes the normalized frequency. As shown in FIG. 4, depending on the structure of the photonic crystal 11, the normalized frequency of the third band may be lower than that of the second band. When the vacuum wavelength of the incident light 12 is $\lambda_0$, the value of the normalized frequency is determined by $a/\lambda_0$. Therefore, as shown in FIG. 4, when the vacuum wavelength of the incident light 12 is $\lambda_0$, Z-axis direction components $k_1$ and $k_3$ of the wave vectors corresponding to the respective bands are present in the photonic crystal 11. That is, the propagation light 14 propagates through the photonic crystal 11 in the Z-axis direction as waves with a wavelength $\lambda_1=2\pi/k_1$ and a wavelength $\lambda_3=2\pi/k_3$. Since there is no wave vector corresponding to the second band, no propagation light in the second band is present.

Here, a numerical value obtained by dividing a vacuum wavelength $\lambda_0$ of light by a wavelength (e.g., $\lambda_1$, $\lambda_3$ or the like) of light propagating through the photonic crystal 11 is defined as the "effective refractive index". As can be seen from FIG. 4, in the first band, the normalized frequency (the vertical axis) and the Z-axis direction component kz (the horizontal axis) of the wave vector are substantially proportional, so that there is substantially no change of the effective refractive index with respect to changes of $\lambda_0$. However, for the higher-order bands (the second and third bands in FIG. 4), the effective refractive index changes greatly in accordance with $\lambda_0$, and the effective refractive index may drop below 1 when $a/\lambda_0$ is close to the lower limit.

It is well known that the value obtained by differentiating the band curves shown in FIG. 4 by kz (that is, the slope of the tangent) is the group velocity of the propagation light 14. In the case of FIG. 4, for the second and third bands (the higher-order bands), the slope of the tangent of the band curves decreases rapidly as the value of $a/\lambda_0$ becomes small, and the slope of the tangent of the band curves becomes zero when $a/\lambda_0$ is the lower limit. This is the group-velocity anomaly peculiar to the photonic crystal 11. The group-velocity anomaly in the photonic crystal 11 is very large, and leads to a dispersion that is opposite to that in ordinary homogenous materials (as the wavelength of the incident light 12 becomes large, group velocity slows down). Therefore, an optical waveguide capable of utilizing this higher-order band light can be used as a light control element such as an optical delay element or a dispersion compensation element in optical communications. As stated above, optical elements utilizing higher-order band propagation light are very useful. However, as is evident from FIG. 4, when the third band light is propagated, the first band light is always propagated as well. The first band propagation light hardly exhibits effects of "very large wavelength dispersion" or "group-velocity anomaly" described above, so that it is merely a loss in the case of using higher-order band propagation light for obtaining these effects. In other words, the first band propagation light considerably reduces the utilization efficiency of the incident light energy, and also causes a decrease in the S/N ratio of the optical element as stray light.

In this respect, the studies conducted by the inventors of the present invention have revealed that, "when an appropriate phase modulation wave having a period a is allowed to enter a multilayer film layer (one-dimensional photonic crystal) having a period a in the same direction, it is possible to obtain only propagation light belonging to a specific higher-order band." According to this, it is possible to propagate only waves belonging to a specific higher-order photonic band. In addition to this, the inventors of the present invention have revealed methods for propagating only higher-order band propagation light through a photonic crystal (e.g., see JP 2003-215362A and JP 2003-287633A).

Furthermore, the studies conducted by the inventors of the present invention have revealed that, "when the propagation light in the photonic crystal is coupled to a band on a Brillouin zone boundary, all the bands, including the first band, exhibit a change similar to that of a higher-order band". According to this, it is possible to eliminate the band light that causes a loss, thereby producing a useful optical element.

Assuming that the optical path is propagated in the reverse direction, it also should be appreciated easily that, after the propagation light 14, which is higher-order band propagation light, is emitted from the end face 11b (see FIG. 1) of the photonic crystal 11, it is possible to restore the outgoing light 13 into a plane wave with a suitable phase modulation means.

Figure 5:
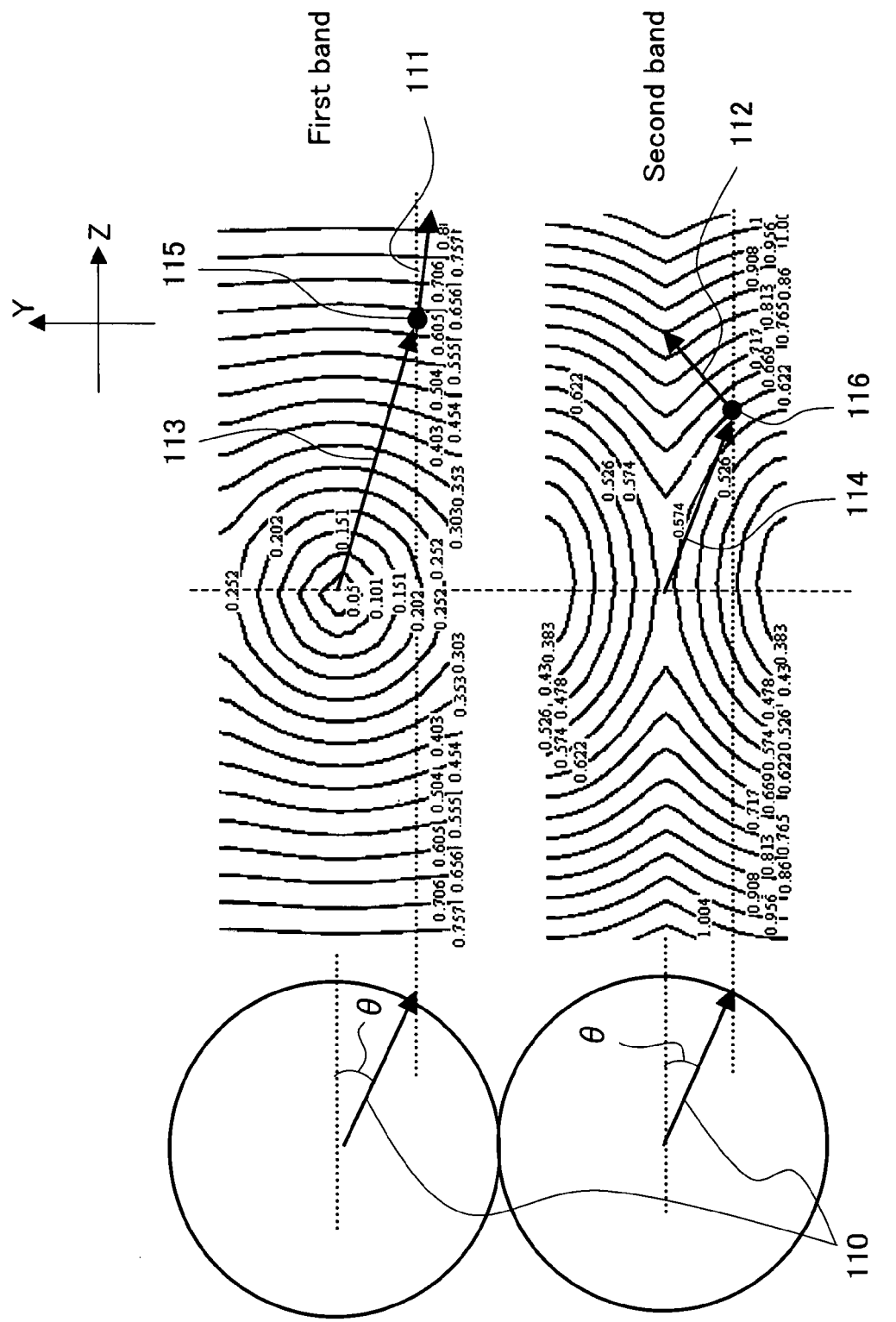
FIG. 5 is a band diagram for the case where the incident light on a one-dimensional photonic crystal is made incident obliquely at an incident angle θ onto the incident end face.

The following is a description of methods for coupling the propagation light in the photonic crystal to a band on a Brillouin zone boundary. First, a method will be described in which the propagation light in the photonic crystal is coupled to a band on a Brillouin zone boundary by making the incident light incident obliquely at an incident angle θ on the incident end face of the photonic crystal. FIG. 5 is a band diagram for the case where the incident light on a one-dimensional photonic crystal is made incident obliquely at an incident angle θ onto the incident end face. Here, the one-dimensional photonic crystal is the photonic crystal 11 shown in FIG. 1. Additionally, the incident angle θ is an angle formed by the direction perpendicular to the incident end face 11a, that is, the Z-axis direction, and the traveling direction of the incident light. It should be noted that the slope of the incident light is limited to the YZ plane. Further, the incident end face 11a of the photonic crystal 11 is perpendicular to the Z-axis.

In the band diagram shown in FIG. 5, the traveling direction of the propagation light propagating through the photonic crystal 11 is the direction normal to the equal frequency lines. As can be seen from FIG. 5, the propagation light propagates through the photonic crystal 11 in two different directions for the first band and the second band, respectively, and neither of these direction is the Z-axis direction.

The band diagram of FIG. 5 will be described specifically. Corresponding points 115 and 116, at which the normalized frequency $a/\lambda_0$ matches that of the incident light, are present in the first and second bands, so that waves corresponding to the respective bands propagate through the photonic crystal 11. The wave vector of the incident light is indicated by arrows 110, and the wave vector of the propagation light is indicated by arrow 113 (the first band) and arrow 114 (the second band). Further, the traveling direction of the energy of the propagation light in the first band can be indicated by arrow 111, and the traveling direction of the energy of the propagation light in the second band can be indicated by arrow 112.

Figure 6:
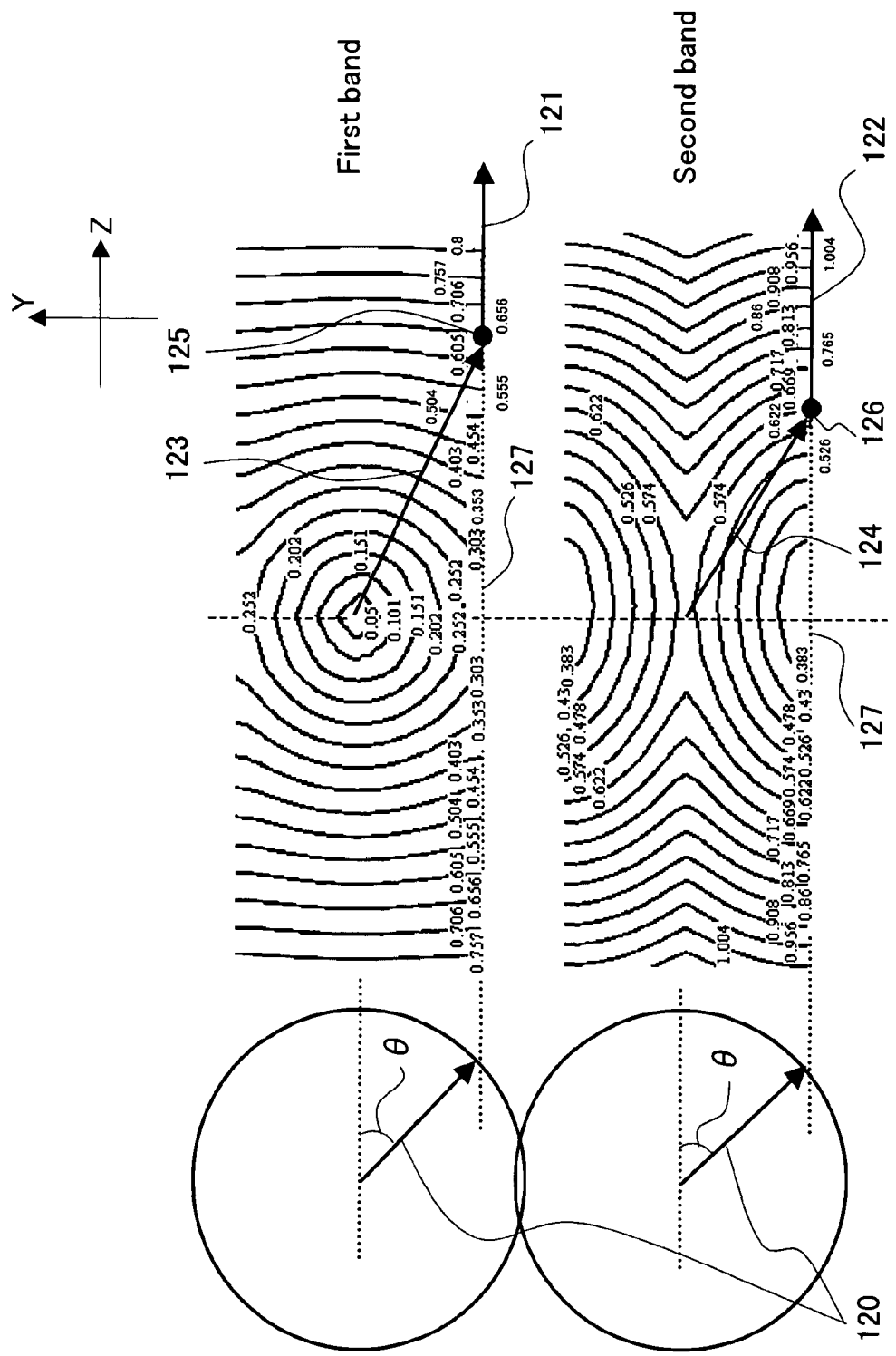
FIG. 6 is a band diagram for a one-dimensional photonic crystal for the case where the incident light and the first and second bands are coupled on a Brillouin zone boundary.

Next, the case will be described where the propagation light in the first band and the propagation light in the second band both propagate in the Z-axis direction. FIG. 6 is a band diagram for a one-dimensional photonic crystal for the case where the incident light in the first band and the incident light in the second band are coupled on a Brillouin zone boundary. More specifically, in order to realize such propagation, the incident angle θ is set such that the condition of Expression (1) below is satisfied. Here, the one-dimensional photonic crystal is the photonic crystal 11 shown in FIG. 1. Additionally, since the incident end face 11a of the photonic crystal 11 is perpendicular to the Z-axis direction, which is the propagation direction of light, "incident at an incident angle θ"

means that light that is inclined at an angle θ with respect to the Z-axis direction is incident.

$$n \cdot \sin\theta \cdot (a/\lambda_0) = \pm 0.5 \quad (1)$$

In Expression (1) above, n is the refractive index of the medium in contact with the end face 11*a* of the photonic crystal 11, that is, the medium serving as the cladding existing around the photonic crystal 11.

When the incident light 12 is made incident on the photonic crystal 11 at an incident angle θ satisfying the condition of Expression (1) above, the first and second propagation bands are present on a Brillouin zone boundary 127, as can be seen from FIG. 6. In FIG. 6, the wave vector of the incident light is indicated by arrows 120, and the traveling direction of the energy of the propagation light in the photonic crystal 11 is indicated by arrow 121 (the first band) and arrow 122 (the second band). Further, corresponding points 125 and 126, at which the normalized frequencies $a/\lambda_0$ on the first and second bands match that of the incident light, are present on the Brillouin zone boundary 127. The wave vector of the propagation light is indicated by arrow 123 (the first band) and arrow 124 (the second band).

The symmetry on the Brillouin zone boundary 127 shows that the traveling direction of the wave energy coincides with the Z-axis direction, so that the propagation light travels in the Z-axis direction. Here, taking into consideration the periodicity in the Y-axis direction of the Brillouin zone, the condition to be satisfied by the incident angle θ in order to realize propagation in the Z-axis direction may be set as follows.

$$n \cdot \sin\theta \cdot (a/\lambda_0) = \pm 1.0, \pm 1.5, \pm 2.0, \ldots$$

However, this is difficult to realize, since the values of n and θ need to be increased with an increase in the absolute values on the right hand side.

Figure 7:
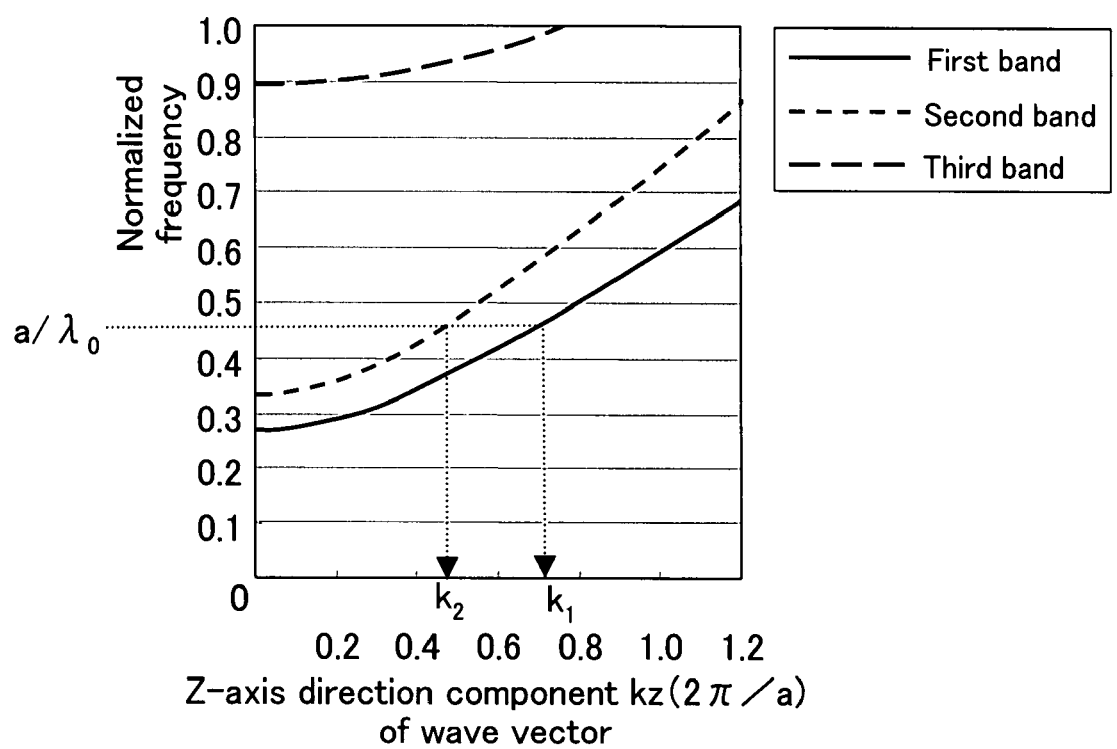
FIG. 7 is a band diagram showing the band diagram on the Brillouin zone boundary in FIG. 6 only for the Z-axis direction.

FIG. 7 is a band diagram showing the band diagram on the Brillouin zone boundary in FIG. 6 only for the Z-axis direction. In FIG. 7, the horizontal axis and the vertical axis are the same as those in FIG. 4. As can be seen from FIG. 7, all the bands on the Brillouin zone boundary, including the first band, exhibit the same change as that of the higher-order band shown in FIG. 4. In other words, a "large change of an effective refractive index due to the wavelength" or "group-velocity anomaly" occurs in all the bands. Accordingly, the waveguide that realizes propagation due to a band on a Brillouin zone boundary can propagate light exhibiting the above-described characteristics with low loss, and therefore can be applied to a light control element and the like. Several such methods for realizing "propagation on a Brillouin zone boundary" have been revealed, and they will be described below.

The first method for realizing propagation on a Brillouin zone boundary (method using propagation of a plurality of bands by oblique incidence of light) already has been described (see above). The above-described first method for realizing propagation on a Brillouin zone boundary easily can be realized, since the method simply makes the incident light (plane wave) incident on the photonic crystal in an inclined manner. With the first method, it is possible to cause a phenomenon such as a "large change of an effective refractive index due to the wavelength" or "group-velocity anomaly". Furthermore, "the frequency region in which both the first band and the second band are present" is broad, so that it is possible to select the incident angle θ and the refractive index n in a range that can be implemented easily. Further, by increasing the value of the normalized frequency $a/\lambda_0$, it is possible to add propagation light of a higher-order band that is higher than the third band.

In the first method, propagation light of two or more different bands is mixed. In the following, the form of propagation of the propagation light in this case will be described.

Figure 8:
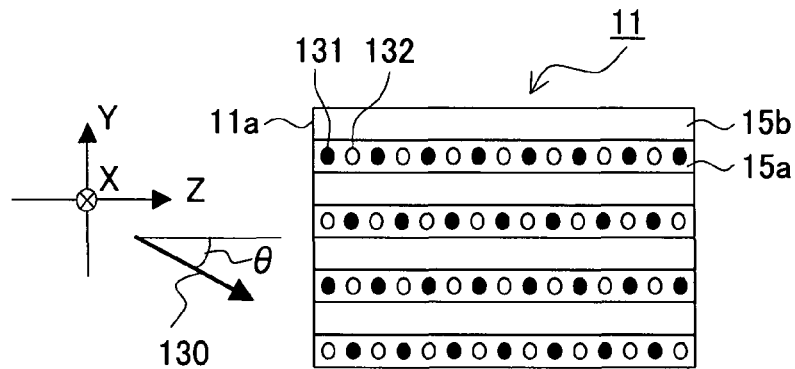
FIG. 8 is a cross-sectional view schematically showing the form of propagation due to the first band on a Brillouin zone boundary of a one-dimensional photonic crystal.
Figure 9:
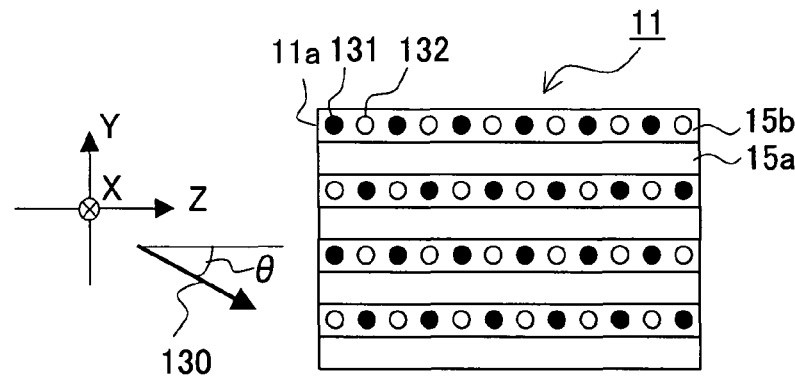
FIG. 9 is a cross-sectional view schematically showing the form of propagation due to the second band on a Brillouin zone boundary of a one-dimensional photonic crystal.
Figure 10:
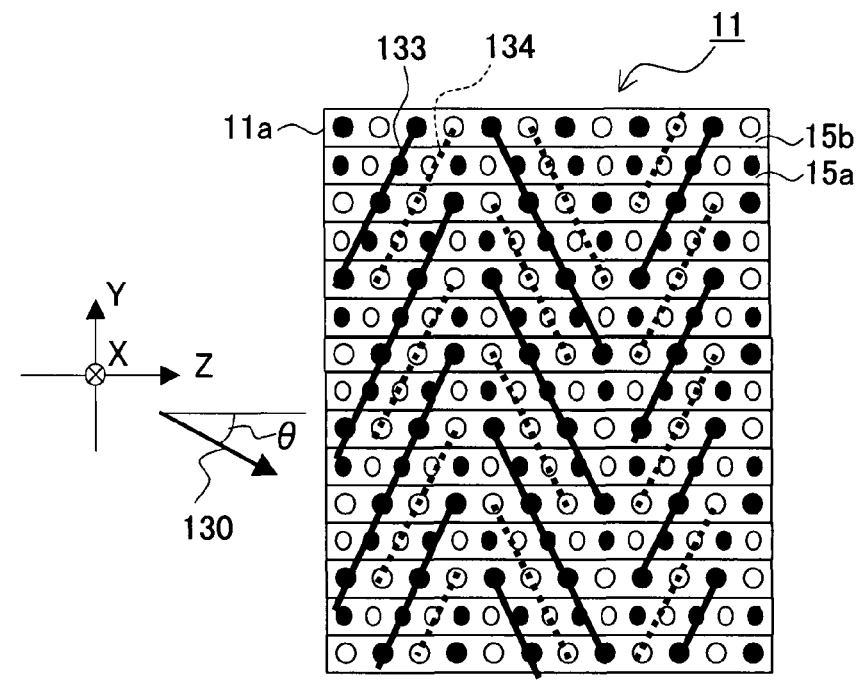
FIG. 10 is a cross-sectional view schematically showing the forms of propagation due to the first band and the second band on a Brillouin zone boundary of a one-dimensional photonic crystal.

When light that is in a frequency range in which both the first band and the second band are present, and exhibits the band diagram as shown in FIGS. 6 and 7 is incident on the photonic crystal 11 at an incident angle θ satisfying Expression (1) above, that is, $$n \cdot \sin\theta \cdot (a/\lambda_0) = \pm 0.5,$$

then it is possible to obtain a wave in which the propagations due to the first band and the second band are superposed, and that exhibits the characteristics of a higher-order band. This phenomenon will be described with reference to FIGS. 8 to 10. FIG. 8 is a cross-sectional view schematically showing the form of propagation due to the first band on a Brillouin zone boundary of a one-dimensional photonic crystal. FIG. 9 is a cross-sectional view schematically showing the form of propagation due to the second band on a Brillouin zone boundary of a one-dimensional photonic crystal. FIG. 10 is a cross-sectional view schematically showing the forms of propagation due to the first band and the second band on a Brillouin zone boundary of a one-dimensional photonic crystal.

More specifically, FIG. 8 schematically shows only the form of propagation due to the first band of incident light 130 incident on the photonic crystal 11 shown in FIG. 1 from the end face 11*a* at an incident angle θ satisfying Expression (1) above. Similarly, FIG. 9 schematically shows only the form of propagation due to the second band of the incident light 130 incident on the photonic crystal 11 from the end face 11*a* at an incident angle θ satisfying Expression (1) above. FIG. 10 shows these forms of propagation when they are superposed, and schematically shows the form of propagation when light in a frequency range in which both the first band and the second band are present is made incident on the photonic crystal 11 from the end face 11*a* at an incident angle θ satisfying the condition of Expression (1) above. FIGS. 8 and 9 each show crests 131 (positions at which the amplitude of the electric field has a maximum on the positive side) and troughs 132 (positions at which the amplitude of the electric field has a maximum on the negative side) of the propagation light. The photonic crystal 11 shown in FIGS. 8 to 10 is the same as that shown in FIG. 1, and is formed by laminating layers of the materials 15*a* and 15*b* alternately.

For the propagation light due to the first band, antinodes are located in the high refractive index layers (e.g., the materials 15*a*), and nodes are located in the low refractive index layers (e.g., the materials 15*b*) (see FIG. 8). Here, the adjacent high refractive index layers (the materials 15*a*) have phases that are shifted by half a period.

On the other hand, for the propagation light due to the second band, antinodes are located in the low refractive index layers (materials 15*b*), and nodes are located in the high refractive index layers (materials 15*a*), and the period of the propagation light in the second band is longer than that of the propagation light in the first band (see FIG. 9). Here, the adjacent low refractive index layers (materials 15*b*) have phases that are shifted by half a period.

FIG. 10 is a diagram in which the forms of propagation shown in FIGS. 8 and 9 are superposed, and the peaks of the electric field are connected with lines. In FIG. 10, the portions connected by solid lines are the crests 133 of the propagation light, and the portions connected with broken lines are the troughs 134 of the propagation light, so that an electric field pattern in which lines of crests and troughs are arranged in a zigzag manner occurs in the photonic crystal 11. In this way, when light in a frequency range in which both the first band and the second band are present is made incident on the photonic crystal 11 from the end face 11a at an incident angle θ satisfying Expression (1) above, the propagation light in these bands is mixed and becomes light having a pattern as shown in FIG. 10.

Here, the propagation light due to different bands has different wavelengths or different group velocities in the photonic crystal 11. In the first method, this causes considerable problems in the case of an element that requires the use of a single wavelength or a single group velocity, since the propagation light in two or more different bands is mixed. Therefore, the first method (method using propagation of a plurality of bands by oblique incidence of light) is suitable especially for applications in which "it is sufficient that the group velocity of the propagation light is delayed and the nonlinear effect is increased".

Next, the second method (method using a single propagation of the first band by oblique incidence of light) for realizing propagation on a Brillouin zone boundary will be described.

Figure 11:
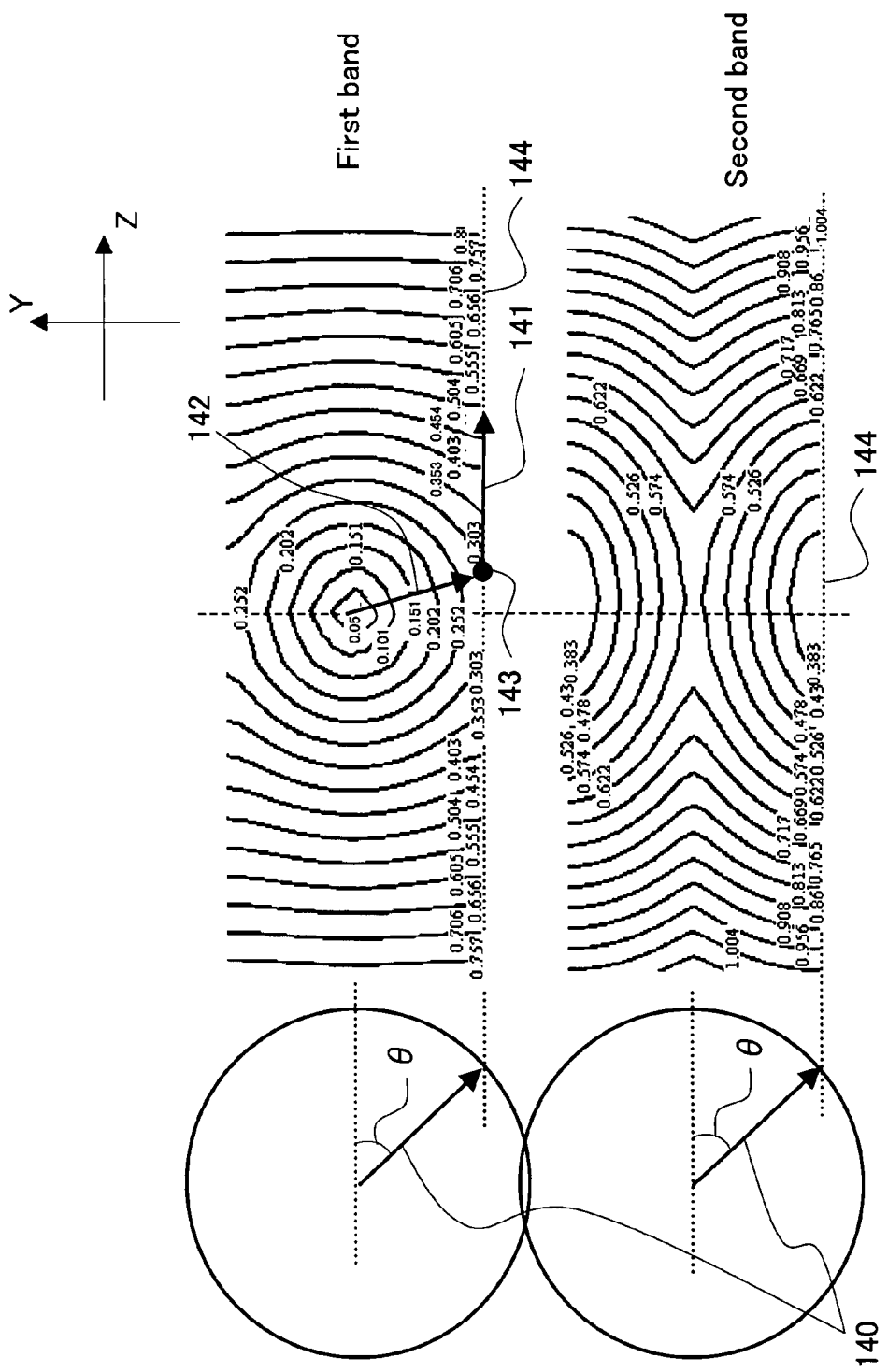
FIG. 11 is a band diagram for illustrating the second method for realizing propagation on a Brillouin zone boundary.

FIG. 11 is a band diagram for illustrating the second method for realizing propagation on a Brillouin zone boundary. For example, FIG. 11 is a band diagram for the case where light in a frequency range in which only the first band is present is made incident on the photonic crystal 11 shown in FIG. 1 at an incident angle θ satisfying the condition of Expression (1) above. In FIG. 11, only the first band is present on a Brillouin zone boundary 144, and no other band is present. In FIG. 11, arrows 140 indicate the wave vector of the incident light, and arrow 142 indicates the wave vector of the propagation light. Arrow 141 indicates the traveling direction of energy, and a corresponding point 143, at which the normalized frequency on the first band matches that of the incident light, is present on the Brillouin zone boundary 144.

As shown in FIG. 11, when the incident angle θ is set such that the condition of Expression (1) above is satisfied in a frequency range in which only the propagation light in the first band is present, it is possible to obtain propagation due to a single band.

In such a condition, the propagation light propagating through the photonic crystal has a form of propagation as shown in FIG. 8. Furthermore, although the propagation light propagating through the photonic crystal is propagation light in the first band, it has the characteristics of a higher-order band.

As with the first method described above, the second method (method using a single propagation of the first band by oblique incidence of light) can be realized easily, since the method simply makes the incident light (plane wave) incident on the photonic crystal in an inclined manner. However, "frequency range in which only the first band is present" has a small value of a/λ₀, so that it is necessary to increase both the incident angle θ and the refractive index n, resulting in the problem of an increased reflectance at the end face of the photonic crystal and hence an increase of loss.

Next, the third method (phase modulation of incident light by interference of plane waves) for realizing propagation on a Brillouin zone boundary will be described.

Figure 12:
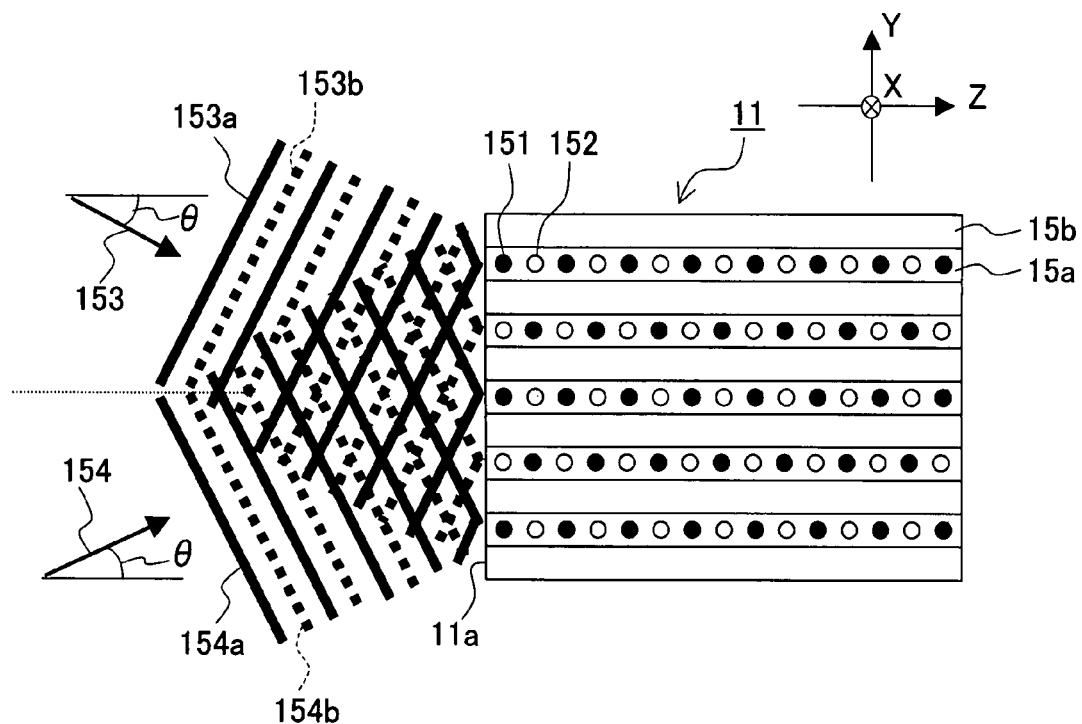
FIG. 12 is a cross-sectional view of a one-dimensional photonic crystal for illustrating the third method for realizing propagation on a Brillouin zone boundary.

FIG. 12 is a cross-sectional view of a one-dimensional photonic crystal for illustrating the third method for realizing propagation on a Brillouin zone boundary. The photonic crystal 11 in FIG. 12 is the same as that shown in FIG. 1.

As shown in FIG. 12, plane waves 153 and 154 having the same wavelength cross each other and are made incident on the photonic crystal 11. The plane waves 153 and 154 each is made incident on the photonic crystal 11 at an incident angle ±θ satisfying the condition of Expression (1) above. In FIG. 12, of the plane waves 153 and 154, the portions indicated by solid lines are crests 153a and 154a, respectively, of the electric field, and the portions indicated by broken lines are troughs 153b and 154b, respectively, of the electric field.

By making the plane waves 153 and 154 each having an incident angle ±θ and intersecting with each other incident on the photonic crystal 11, an electric field pattern having nodes and antinodes in the Y-axis direction is formed on the incident end face 11a of the photonic crystal 11 by interference of the two plane waves 153 and 154. Therefore, the photonic crystal 11 is disposed such that the high refractive index layers (materials 15a) are located in the antinode portions. Additionally, crests 151 and troughs 152 of the propagation light are shown in the drawing. Consequently, only propagation light due to the first band is generated. When the photonic crystal 11 is disposed such that the low refractive index layers (materials 15b) are located in the antinode portions, only propagation light due to the second band is generated.

Figure 13:
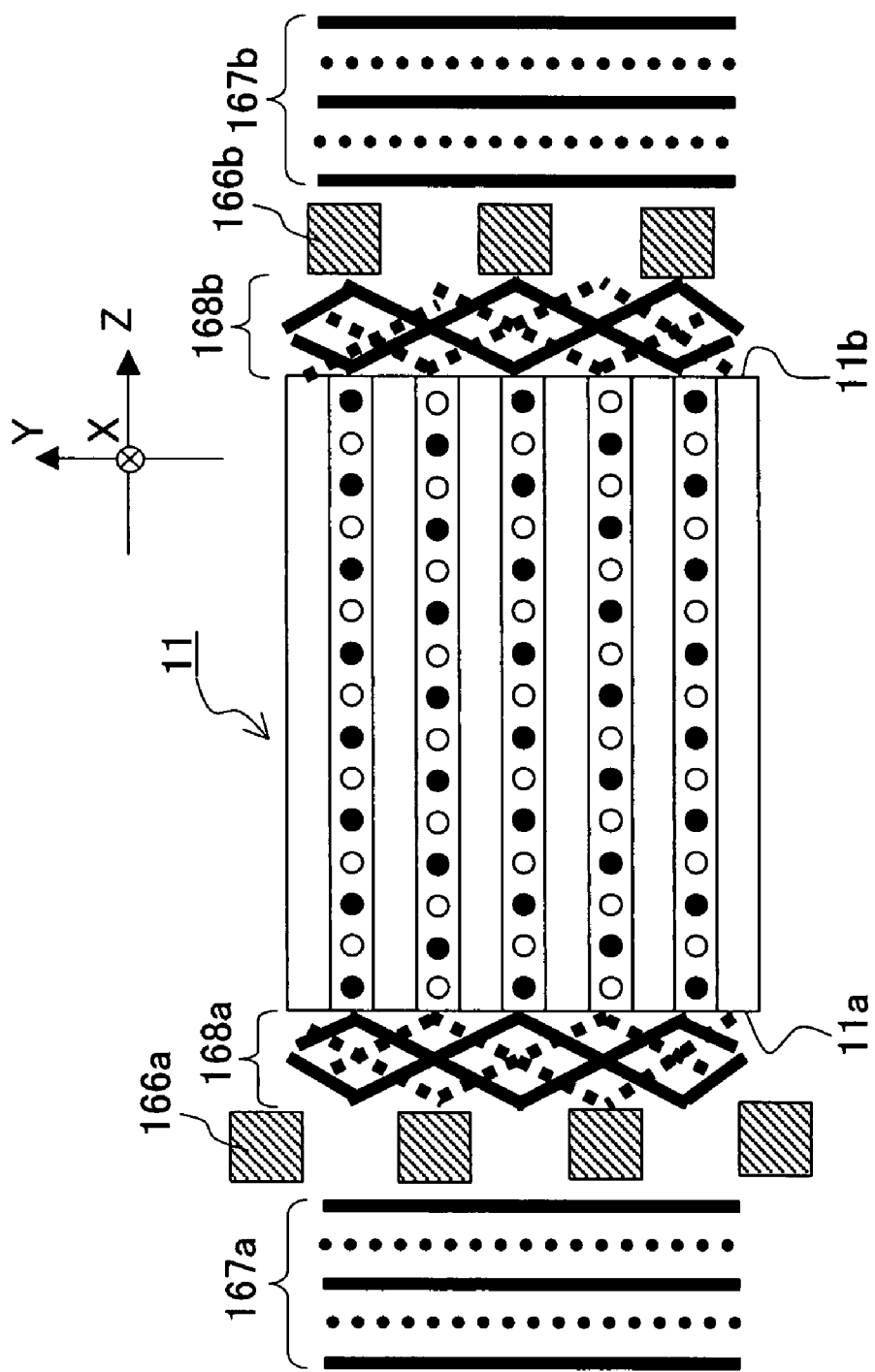
FIG. 13 is a cross-sectional view of a one-dimensional photonic crystal for illustrating the fourth method for realizing propagation on a Brillouin zone boundary.

Next, the fourth method (phase modulation of incident light using phase gratings having a period 2a) for realizing propagation on a Brillouin zone boundary will be described. FIG. 13 is a cross-sectional view of a one-dimensional photonic crystal for illustrating the fourth method for realizing propagation on a Brillouin zone boundary. The one-dimensional photonic crystal 11 in FIG. 13 is the same as that shown in FIG. 1.

As shown in FIG. 13, in the fourth method, phase gratings 166a and 166b having a refractive index period (2a) that is twice the refractive index period a of photonic crystal 11 are disposed in contact with or close to the incident end face 11a and the outgoing end face 11b of the photonic crystal 11. At this time, the incident end and the outgoing end of the phase gratings 166a and 166b are perpendicular to the propagation direction (Z-axis direction). When incident light 167a, which is a plane wave, is made incident perpendicularly on the phase grating 166a, it is possible to form an electric field pattern having nodes and antinodes by interference of positive first-order diffracted light and negative first-order diffracted light, as with the case of the third method (phase modulation of incident light by interference of plane waves) shown in FIG. 12. That is, the incident light 167a, which is a plane wave, becomes light 168a similar to the plane waves 153 and 154 in FIG. 12 by passing through the phase grating 166a. In other words, two plane waves intersecting with each other at an incident angle satisfying the condition of Expression (1) above and having the same wavelength are generated. Therefore, when the photonic crystal 11 is disposed such that the high refractive index layers are located in the antinode portions, only propagation light due to the first band is generated. When the photonic crystal 11 is disposed such that the low refractive index layers are located in the antinode portions, only propagation light due to the second band is generated.

Zero-order light and second-order or higher-order diffracted light resulting from the phase grating 166a cannot be coupled to a specific band of the photonic crystal, so that both the positive first-order diffracted light and the negative first-order diffracted light ideally are diffracted with a diffraction efficiency of 50%. Therefore, it is desirable that the phase grating 166a has a shape that is optimized such that the intensity of the positive and negative first-order diffracted light is as high as possible.

Further, the efficiency for the first-order diffracted light of a phase grating that is optimized at a specific wavelength will not be reduced rapidly even if the wavelength varies to some extent, and remains at a high level. Therefore, with the fourth method (phase modulation of incident light using phase gratings having a period 2a), it is possible to secure a wider usable wavelength region. Furthermore, by disposing the phase grating 166b having the same period as the phase grating 166a on the outgoing end face 11b side of the photonic crystal 11, it is possible to convert light 168b emitted from the photonic crystal 11 to outgoing light 167b, which is a plane wave.

Although, in the fourth method, the phase gratings 166a and 166b having a refractive index period (2a) that is twice the refractive index period a of the photonic crystal 11 are used as the phase gratings, it is also possible to use phase gratings having the same refractive index period as the refractive index period a of the photonic crystal 11. In this case, propagation is realized by a higher-order band at the center of the Brillouin zone. In addition, the condition in the case of using the phase gratings having the refractive index period a is disclosed in JP 2003-215362A, for example.

Figure 14:
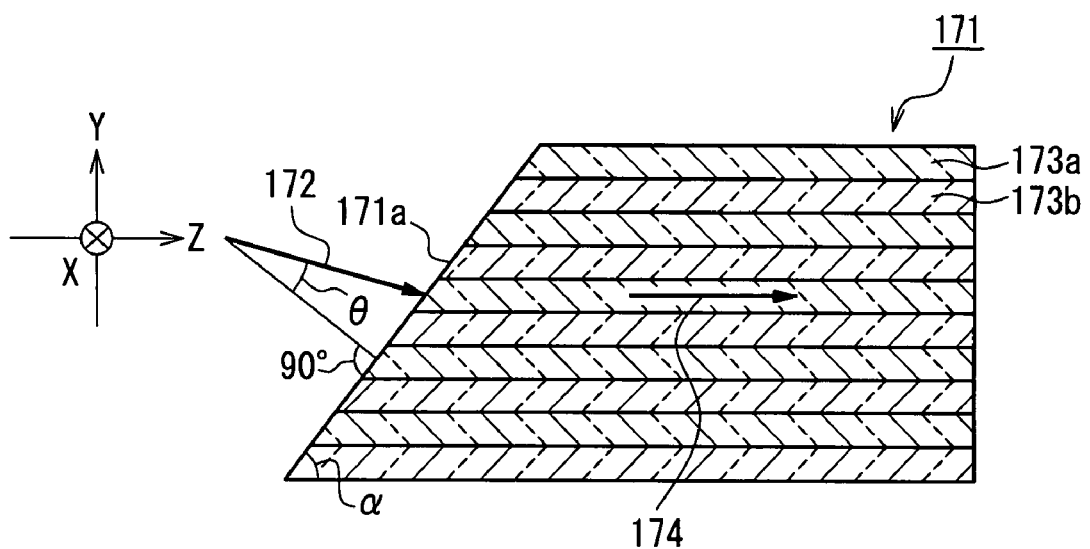
FIG. 14 is a cross-sectional view showing electromagnetic wave propagation in a photonic crystal having an oblique incident end face for illustrating the fifth method for realizing propagation on a Brillouin zone boundary.
Figure 15:
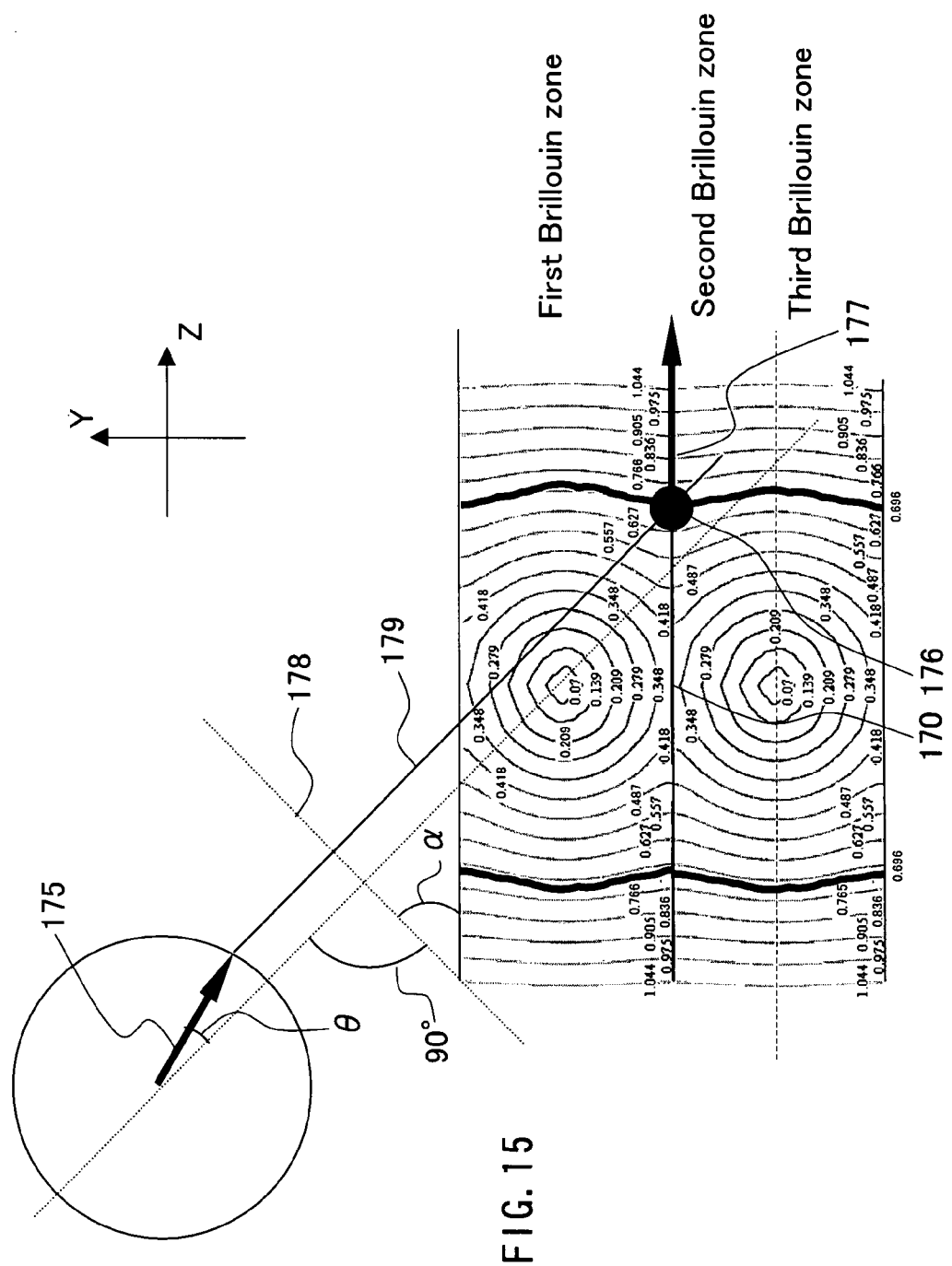
FIG. 15 is a band diagram for illustrating the fifth method for realizing propagation on a Brillouin zone boundary.

Next, the fifth method (utilization of oblique incident end face) for realizing propagation on a Brillouin zone boundary will be described. FIG. 14 is a cross-sectional view showing electromagnetic wave propagation in a photonic crystal having an oblique incident end face for illustrating the fifth method for realizing propagation on a Brillouin zone boundary. In FIG. 14, the direction in which the photonic crystal has a refractive index periodicity (the direction of refractive index period) is the Y-axis direction, and directions that are perpendicular to the Y-axis direction and are perpendicular to each other are the X-axis direction and the Z-axis direction. FIG. 15 is a band diagram for illustrating the fifth method for realizing propagation on a Brillouin zone boundary. The band diagram of FIG. 15 shows the first band, and also shows the first Brillouin zone, the second Brillouin zone and the third Brillouin zone.

As shown in FIG. 14, a photonic crystal 171 having an oblique incident end face 171a is formed by laminating layers of materials 173a and 173b alternately in the Y-axis direction. The incident end face 171a is inclined at an angle α with respect to the Z-axis direction, which is the propagation direction of propagation light 174. Incident light 172 is incident on the end face 171a at an incident angle θ. The incident angle θ is an angle formed by a direction perpendicular to the end face 171a (normal direction) and the traveling direction of the incident light 172. It should be noted that the above-described angles are limited to the YZ plane. In the photonic crystal 171, the propagation light 174 propagates in the Z-axis direction.

FIG. 15 is a band diagram for the case where light propagates through the photonic crystal 171 having the oblique incident end face 171a. From FIG. 15, it is seen that it is possible to achieve propagation on a Brillouin zone boundary 170 in the photonic crystal 171 having the oblique incident end face 171a.

In FIG. 15, the wave vector of the incident light 172 is indicated by arrow 175. In addition, a corresponding point 176, at which the normalized frequency a/λ₀ on the first band matches that of the incident light 172, is present on the Brillouin zone boundary 170. The traveling direction of the energy of the propagation light 174 is indicated by arrow 177. Further, the corresponding point 176 is on a normal 179 of a line 178 indicating the incident end face 171a.

By adjusting the angle α and the incident angle θ as shown in FIG. 15 in the photonic crystal 171 whose end face 171a is inclined with respect to the propagation direction of the propagation light 174, it is possible to realize propagation on the Brillouin zone boundary 170.

With the above-described first to fifth methods, it is possible to realize propagation on a Brillouin zone boundary in a one-dimensional photonic crystal. Consequently, it is possible to generate higher-order band propagation light in a one-dimensional photonic crystal, efficiently. In addition, when propagation on a Brillouin zone boundary is used, all the bands, including the first band, exhibit the same characteristics as those of a higher-order band. Furthermore, it is also possible to propagate the propagation light due to the respective bands on the Brillouin zone boundary individually. Furthermore, significant diffraction occurs when light propagating through the photonic crystal is emitted into a homogeneous medium from the outgoing end face of the photonic crystal that is perpendicular to the Z-axis, so that the light cannot be emitted as a plane wave, and therefore is difficult to handle. Therefore, a phase grating that is the same as the one used at the incident end face of the photonic crystal in the fourth method also may be disposed at the outgoing end face, or an oblique outgoing end face may be used as the outgoing end face, just as an oblique incident end face is used as the incident end face of the photonic crystal in the fifth method. This makes it possible to restore the outgoing light from the photonic crystal into a plane wave, conversely to the case where a plane wave serving as the incident light is turned into propagation light on a Brillouin zone boundary in the photonic crystal. In other words, it is possible to retrieve a plane wave from the photonic crystal. When outgoing light is turned into a plane wave, it is possible to achieve coupling to optical fiber and the like, easily.

Figure 16:
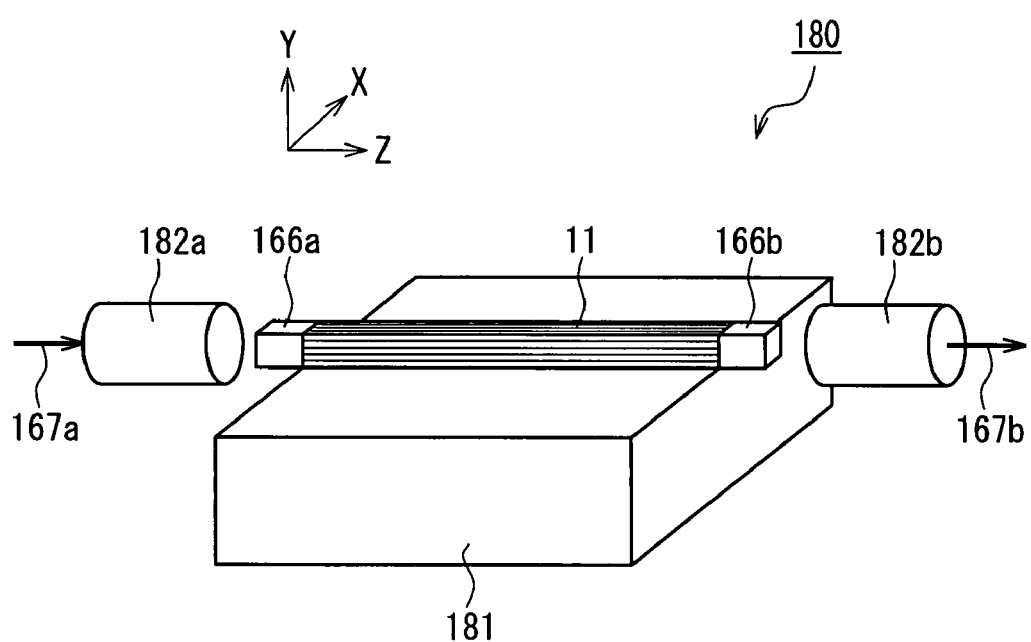
FIG. 16 is a perspective view showing an example of the configuration of a waveguide element using a one-dimensional photonic crystal.

Next, an example of the configuration of a waveguide element, which is an optical element, using a photonic crystal will be described. For example, the use of the configuration of a waveguide element as schematically shown in FIG. 16 is preferable, since it makes it easy to achieve coupling with optical fiber and the like. FIG. 16 is a perspective view showing an example of the configuration of a waveguide element using a one-dimensional photonic crystal. In a waveguide element 180 shown in FIG. 16, the one-dimensional photonic crystal 11 shown in FIG. 1, which has a refractive index periodicity in one direction, is provided on a suitable substrate 181. In order to achieve single mode propagation by reducing the propagation modes in a direction parallel to the XZ plane in FIG. 16, it is preferable that the one-dimensional photonic crystal 11 is processed into a linear waveguide. The phase gratings 166a and 166b serving as the phase modulation portion described in the above fourth method are provided at both ends of the photonic crystal 11. In addition, there is also provided incident means, such as a rod lens 182a, for making incident light 167a, which is a plane wave, incident on the phase grating 166a. With the rod lens 182a, the incident light 167a is condensed on the end face of the phase grating 166a. With this configuration, it is possible to make light incident perpendicularly on the phase grating 166a. By disposing the phase grating 166a and the photonic crystal 11 in the relationship described in the fourth method, it is possible to realize propagation on a Brillouin zone boundary in the photonic crystal 11. Consequently, it is possible to cause "very large wavelength dispersion" or "group-velocity anomaly". The propagation light propagated through the photonic crystal 11 is converted into a plane wave at the phase grating 166b, and then coupled to a rod lens 182b, so that the outgoing light 167b propagates through the rod lens 182b. Accordingly, the waveguide element 180 can be used as a light control element such as an optical delay element or a dispersion compensation element in optical communications. It should be noted that the waveguide element in which propagation on the Brillouin zone boundary is realized is not limited to the configuration shown in FIG. 16, and various other configurations are possible.

In the case of forming a waveguide element including a one-dimensional photonic crystal as a core in this way, it is preferable to provide a cladding to perform sufficient light confinement in the vertical direction (the Y-axis direction) and the horizontal direction (the X-axis direction). When sufficient light confinement is not achieved, the propagation light will leak from the photonic crystal. It is also possible to allow the medium (e.g., air) existing around the photonic crystal to function as a cladding, without additionally providing a cladding. The following is a description of the light confinement in a one-dimensional photonic crystal.

Figure 17:
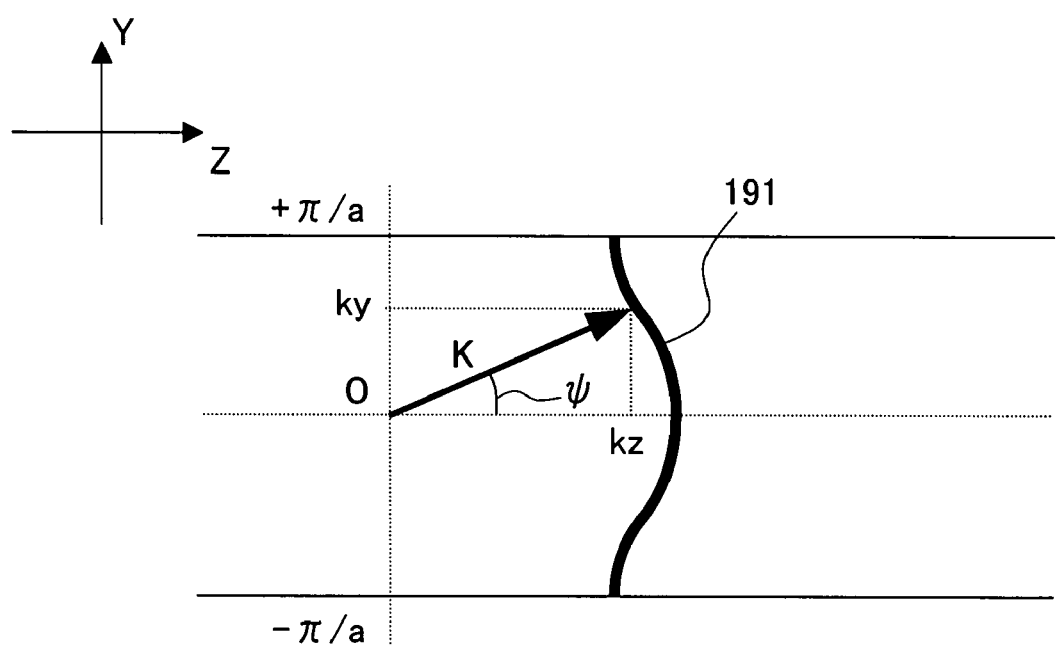
FIG. 17 is a band diagram showing the first band of propagation light in a one-dimensional photonic crystal on the YZ plane.

First, the light confinement in the vertical direction (Y-axis direction), which is the direction of refractive index period, will be described with reference to the one-dimensional photonic crystal 11 shown in FIG. 1. The condition for light confinement in the vertical direction means the condition for eliminating light leakage from the surface of the photonic crystal 11 that is parallel to the XZ plane. FIG. 17 is a band diagram showing the first band of propagation light in a one-dimensional photonic crystal on the YZ plane. In other words, FIG. 17 shows the first band on the YZ plane whose X-coordinate is 0. In addition, an equal frequency line 191 in FIG. 17 corresponds to the normalized frequency $a/\lambda_0$ of the propagation light 14.

The wave vector K of the propagation light 14 corresponding to the point (0, ky, kz) on the equal frequency line 191 can be expressed as follows.

$$K=(0,ky,kz)$$

The wavefront of the propagation light 14 generated in the photonic crystal 11 is perpendicular to the wave vector K. The wavelength $\lambda_k$ of the propagation light 14 can be determined by dividing $2\pi$ by a magnitude of the wave vector K. The magnitude of the wave vector K can be determined using the Pythagorean theorem with reference to FIG. 17. The wavelength $\lambda_k$ and the direction angle $\Psi$ of the wave vector K readily can be determined with reference to FIG. 17. That is, they can be expressed as follows.

$$\lambda_k=2\pi/|K|=2\pi/(ky^2+kz^2)^{0.5} \quad (2)$$

$$\tan \Psi=ky/kz \quad (3)$$

The photonic crystal 11 will be described in further detail with reference to FIG. 18, in which the configuration of the core portion and the number of layers are shown. Here, assuming that the lowermost layer and the uppermost layer of the photonic crystal 11 are high refractive index layers (e.g., the materials 15a), and that the number of layers of the materials 15a is (m+1), then the number of layers of the materials 15b (low refractive index layers) is m (m is a positive integer).

The phase matching condition of the wave propagating through the photonic crystal 11 serving as the core portion can be expressed as follows.

$$2A|K|\sin \Psi=\Phi+\pi N(N=0,1,2,3,\ldots) \quad (4)$$

wherein, 2 A is the thickness of the core (see Yasuo Kokubu, "KOHA KOGAKU", (KYORITSU SHUPPAN), p. 48).

In Expression (4) above, $\Phi$ is the phase change amount at the interface between the core and the cladding. However, since the antinodes of the electric field are located at the center of the high refractive index layers (the materials 15a) in the propagation light in the first band on the Brillouin zone boundary (see FIG. 8), $\Phi$ is given as follows.

$$\Phi=0 \quad (5)$$

Figure 18:
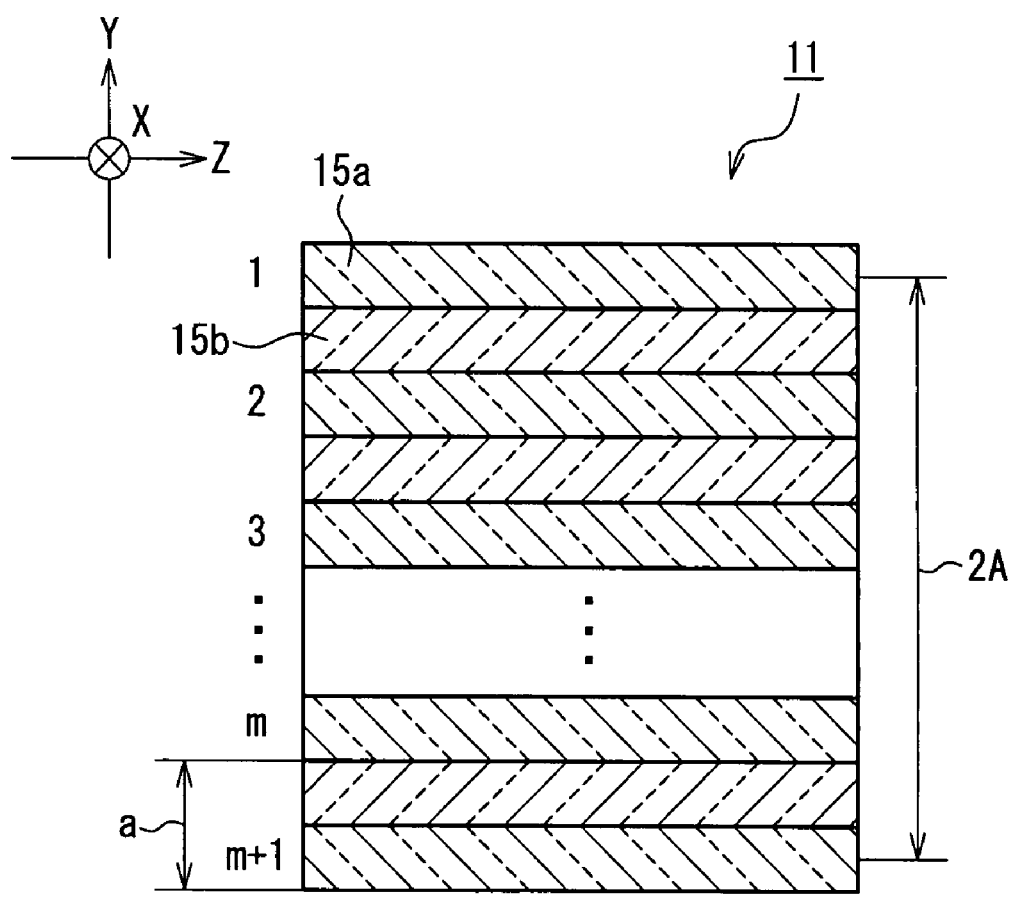
FIG. 18 is a diagram showing the configuration of a core portion and the number of layers in the photonic crystal.

As shown in FIG. 18, the thickness 2A of the core is the distance between the intermediate portion of the uppermost layer and that of the lowermost layer in the Y-axis direction of the photonic crystal 11, so that the thickness 2A can be simplified as follows.

$$2A=ma \quad (6)$$

Rearranging Expression (4) above by substituting Expressions (2), (3), (5) and (6) above into Expression (4), Expression (7) below is given.

$$ky=\pi N/ma \quad (7)$$

Figure 19:
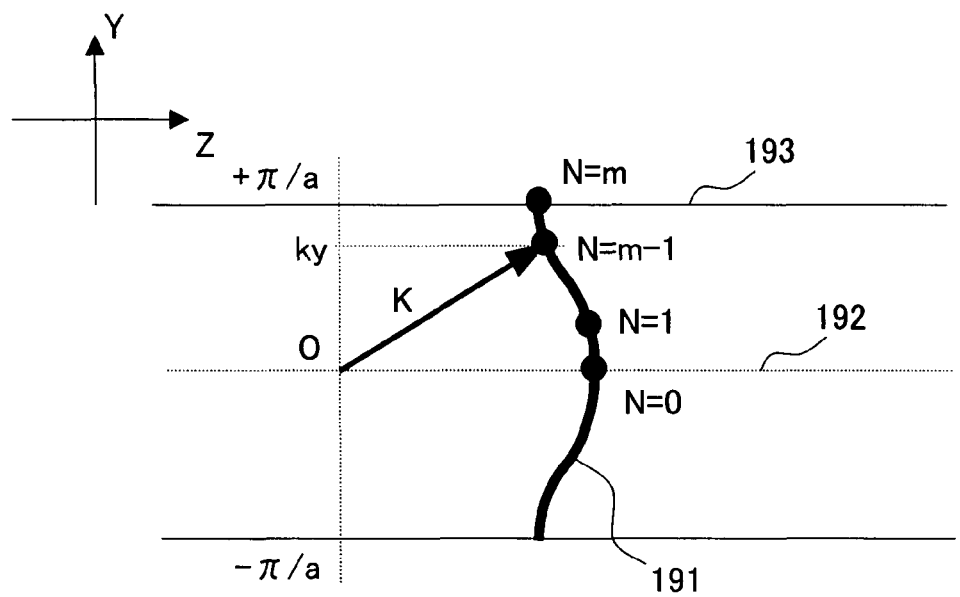
FIG. 19 is a band diagram obtained by further including modes in the band diagram of the first band on the YZ plane shown in FIG. 17.

The point on the band that satisfies the condition of Expression (7) above is the propagation light, i.e., the mode, satisfying the phase matching condition. FIG. 19 is a band diagram obtained by further including modes in the band diagram of the first band on the YZ plane shown in FIG. 17. As the modes on the equal frequency line 191, the modes from zero-order mode, which corresponds to N=0, through mth-order mode, which corresponds to N=m, are present. It should be noted that only the cases where N=m, m−1, 1, 0 are shown in FIG. 19.

As can be seen from FIG. 19, the propagation light on a Brillouin zone center line 192 is the zero-order mode, and the propagation light on a Brillouin zone boundary 193 is the mth-order mode.

Figure 20:
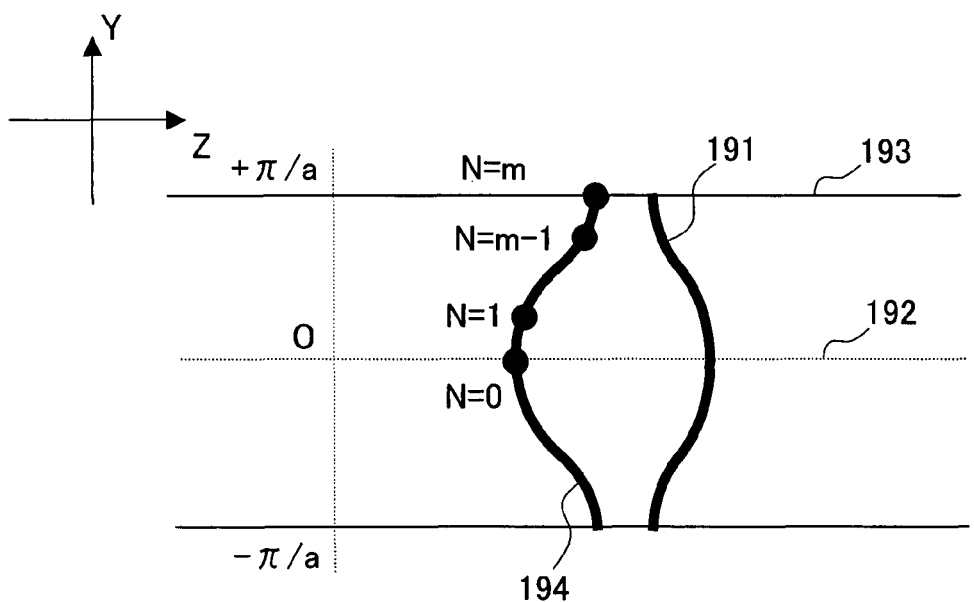
FIG. 20 is a band diagram obtained by further including the second band in which modes are included in the band diagram shown in FIG. 19.

FIG. 20 is a band diagram obtained by further including the second band in which modes are included in the band diagram shown in FIG. 19. FIG. 20 shows the equal frequency line 191 of the first band and an equal frequency line 194 of the second band. When a second band that corresponds to the normalized frequency $a/\lambda_0$ is present, assuming that the lowermost layer and the uppermost layer of the photonic crystal 11 are low refractive index layers, and that the number of layers of the low refractive index layers is (m+1), then m modes are present in the second band.

Although an ordinary single mode optical waveguide propagates only the zero-order mode (N=0) in the first band, the photonic crystal 11 can propagate the mth-order mode on the Brillouin zone boundary, as described above. Accordingly, when the effective refractive index in the Z-axis direction of the mth-order mode is larger than the refractive index of the medium serving as the cladding provided in contact with the photonic crystal 11 in the vertical direction (Y-axis direction), the light is confined within the photonic crystal 11 due to the refractive index difference. However, when the effective refractive index in the Z-axis direction of the mth-order mode is smaller than the refractive index of the medium serving as the cladding provided in contact with the photonic crystal 11 in the vertical direction (Y-axis direction), the propagation light will leak to the side of the medium serving as the cladding due to the refractive index difference. Particularly, when the effective refractive index in the Z-axis direction of the light is less than 1, it is not possible to prevent the light leakage, even if air is used as the medium serving as the cladding.

Figure 21:
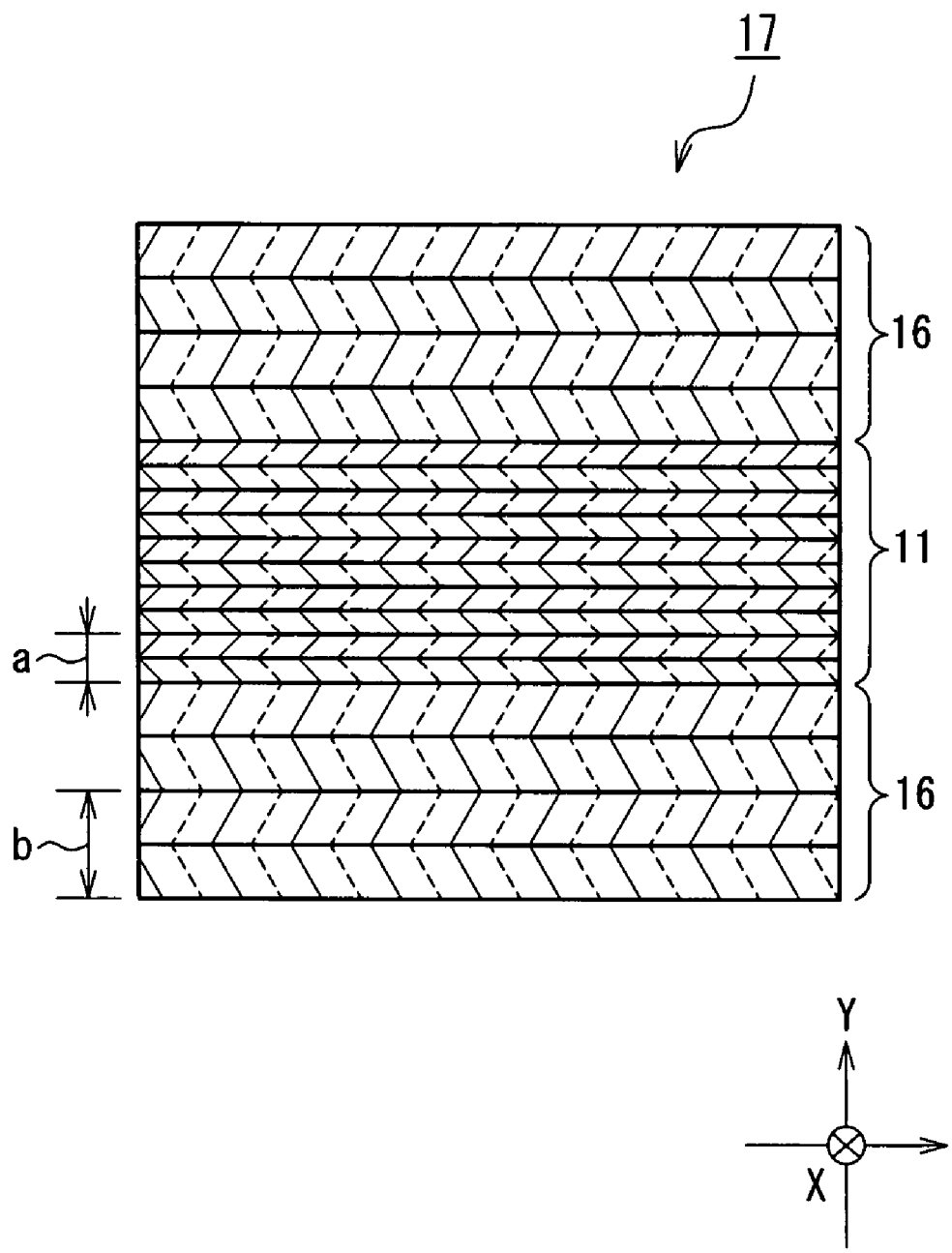
FIG. 21 is a cross-sectional view showing the configuration of a photonic crystal waveguide having a cladding and a core that are constituted by a one-dimensional photonic crystal.

In such a case, using a photonic crystal as the cladding makes it possible to confine light using a photonic band gap. FIG. 21 is a cross-sectional view showing the configuration of a photonic crystal waveguide having a cladding and a core that are constituted by a one-dimensional photonic crystal. A photonic crystal waveguide 17 shown in FIG. 21 includes the one-dimensional photonic crystal 11 shown in FIG. 1 as a core, and a cladding 16 constituted by a one-dimensional photonic crystal having a refractive index periodicity in the same direction as the direction of refractive index period of the one-dimensional photonic crystal 11. The cladding 16 is provided in the vertical direction (Y-axis direction) of the photonic crystal 11. The cladding 16 is formed by arranging periodically two materials that are the same as the materials 15a and 15b forming the photonic crystal 11, in the same direction as the direction of refractive index period of the photonic crystal 11. In other words, the cladding 16 is formed by arranging the same material as the photonic crystal 11 such that it has a refractive index periodicity in the Y-axis direction, and the period b of the cladding 16 is different from the period a of the photonic crystal 11. The photonic crystal waveguide 17 is a one-dimensional photonic crystal including a portion (the cladding 16) whose refractive index period is the period b and a portion (the photonic crystal 11 serving as the core) whose refractive index period is the period a in the direction of refractive index period, and the portion with the period a is sandwiched by the portions with the period b. In addition, the relationship a<b holds between the period b of the cladding 16 and the period a of the photonic crystal 11.

Figure 22:
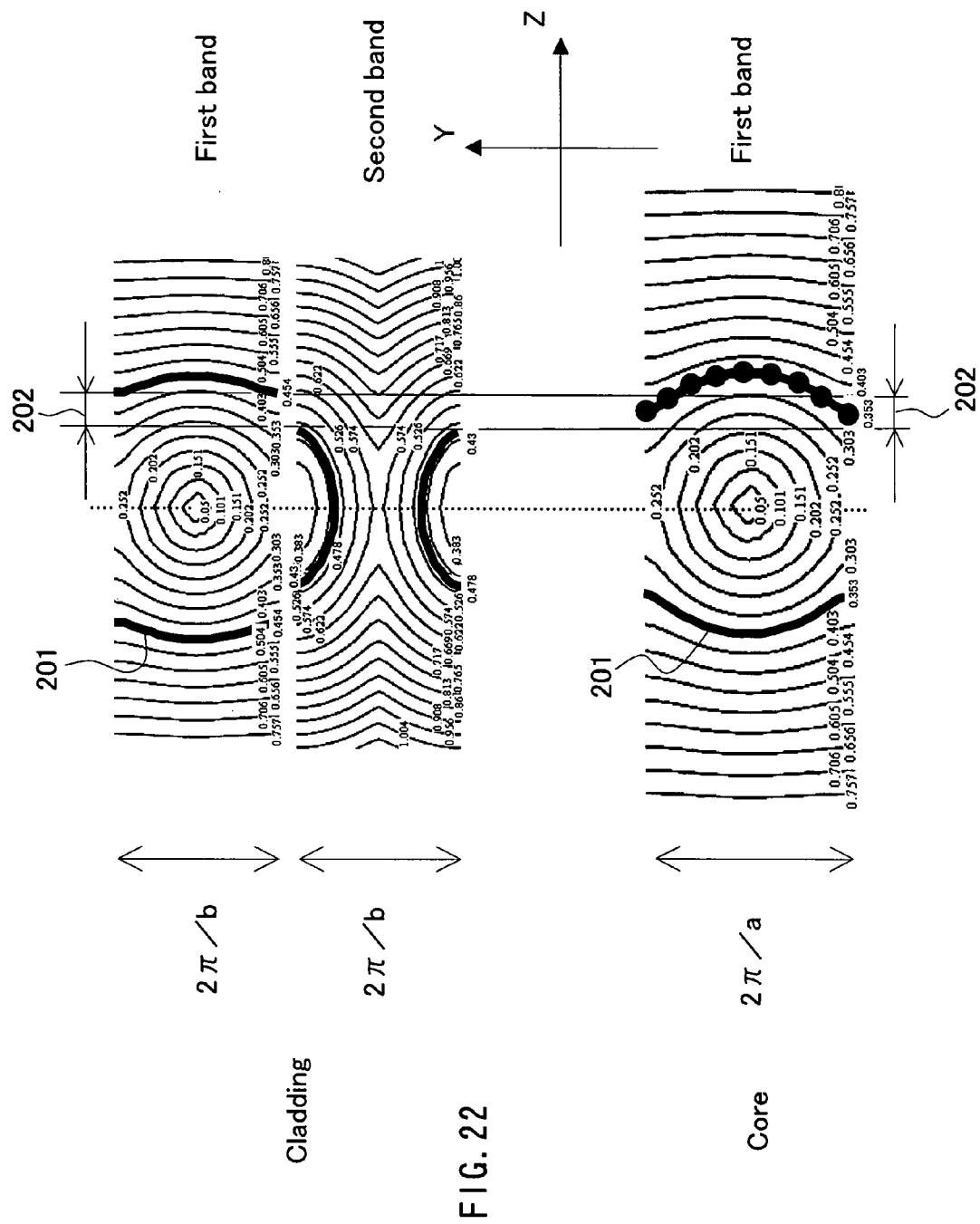
FIG. 22 is a band diagram of the photonic crystal waveguide shown in FIG. 21.

A further description will be given with reference to FIG. 22. FIG. 22 is a band diagram for the photonic crystal waveguide shown in FIG. 21. In FIG. 22, the upper section shows a band diagram for the first band and the second band in the cladding, and the lower section shows a band diagram for the first band in the core. In FIG. 22, heavy lines 201 indicate the bands corresponding to the propagation light whose vacuum wavelength is $\lambda_0$. The points on the heavy lines 201 in the lower section indicate the respective modes.

In the band diagram for the cladding 16, an area in which the heavy lines 201 in the first band and the second band in the Z-axis direction are not continuous is a photonic band gap 202 of the cladding 16. No propagation light occurs within the range of the photonic band gap 202. The propagation light in the core (photonic crystal 11) included in the range of the photonic band gap 202 will not propagate through the cladding 16 and therefore will not leak from the cladding 16. As a result, when there is any propagation mode in the photonic crystal 11 (core) within the range of the photonic band gap 202, the light will not leak from the cladding 16, so that light confinement is achieved in the Y-axis direction. As can be seen from the lower section of FIG. 22, the light included in the photonic band gap 202 is constituted by light of Mode N=m and light of Mode N=(m−1) that are located on the Brillouin zone boundary. Accordingly, the light propagating in the first band in the core (photonic crystal 11) in the photonic band gap 202 is constituted by the light of Mode N=m and the light of Mode N=(m−1) present on the Brillouin zone boundary. That is, among the light due to the first band propagating through the photonic crystal 11 serving as the core of the photonic crystal waveguide 17, only two types of light, namely, the light of Mode N=m and the light of Mode N=(m−1) are confined with the cladding 16.

Although the period b of the cladding 16 is slightly larger than the period a of the core (photonic crystal 11) in the photonic crystal waveguide 17 shown in FIG. 21, the photonic band gap 202 moves toward the left in FIG. 22, as the difference between the period a and the period b is decreased further. Adjusting the position of the photonic band gap 202 in this way makes it possible to adjust the modes included in the photonic band gap 202. This also makes it possible to realize single-mode propagation in which only the desired mth-order mode is allowed to propagate. It is difficult to realize the single-mode propagation when the number of modes of the core is large, since the positions of the mth-order mode and the (m−1)-order mode come close to each other on the band diagram. However, it is theoretically possible to realize the single-mode propagation in any case by making the values of the period a and the period b close to each other.

However, the simulations carried out by the inventors have revealed that the confinement effect is reduced when the values of the period a and the period b are made too close to each other. Therefore, when actually designing a photonic crystal waveguide, it is necessary to achieve a configuration that is well-balanced in terms of the conditions, including, for example, the practical upper limit of the period b of the cladding 16, the difference between the values of the period a and the period b that can realize sufficient confinement, and the value of the period a of the photonic crystal 11 serving as the core.

Furthermore, it is also possible to propagate, for example, a mode present on a Brillouin zone boundary of the second band as shown in FIG. 20 through the photonic crystal 11 serving as the core. In the following, the method for realizing this will be described. To realize such propagation, the photonic band gap 202 in FIG. 22 needs to be moved further to the left in the band diagram. For this purpose, the position of the photonic band gap 202 may be adjusted by decreasing the period b to a value that is slightly smaller than the period a. By doing so, the desired mode present on the Brillouin zone boundary of the second band is included within the range of the photonic band gap 202. This allows the desired mode to be confined with the cladding 16, and to propagate through the photonic crystal 11 serving as the core, thereby realizing the single-mode propagation.

It is also possible to adjust the position of the photonic band gap 202 by setting the same period for the core (photonic crystal 11) and the cladding 16, and setting different film thickness ratios for the media forming the core and the cladding 16. This makes it possible to achieve the single-mode condition, and to realize the single-mode propagation.

It is possible to achieve the single-mode condition, and to realize the single-mode propagation also in a photonic crystal waveguide in which a cladding constituted by a one-dimensional photonic crystal is formed by laminating layers of media different from those of a core constituted by a one-dimensional photonic crystal. Furthermore, it is possible to achieve the single-mode condition, and to realize the single-mode propagation also in a photonic crystal waveguide in which a core or a cladding is formed by laminating layers of three or more different media, and three or more layers are provided in one period of the core or the cladding. In addition, the above-described methods for achieving the single-mode condition may be used singly or in combination.

The above-described determination of the light confinement with the band diagram is made based on an infinite periodic structure. Therefore, when the number of periods of the photonic crystal (cladding 16) for light confinement is, for example, about three, the light confinement may not be achieved sufficiently, so that the propagation light may leak to the outside. However, providing an unnecessarily large number of periods is not preferable in terms of the manufacturing cost, or the durability and the precision of the multilayer film. It is preferable that the minimum number of periods that is required in practice is decided experimentally or by electromagnetic wave simulations, while taking the use conditions into consideration. More specifically, the number of periods of the photonic crystal (cladding 16) for light confinement is preferably about 10.

Figure 23:
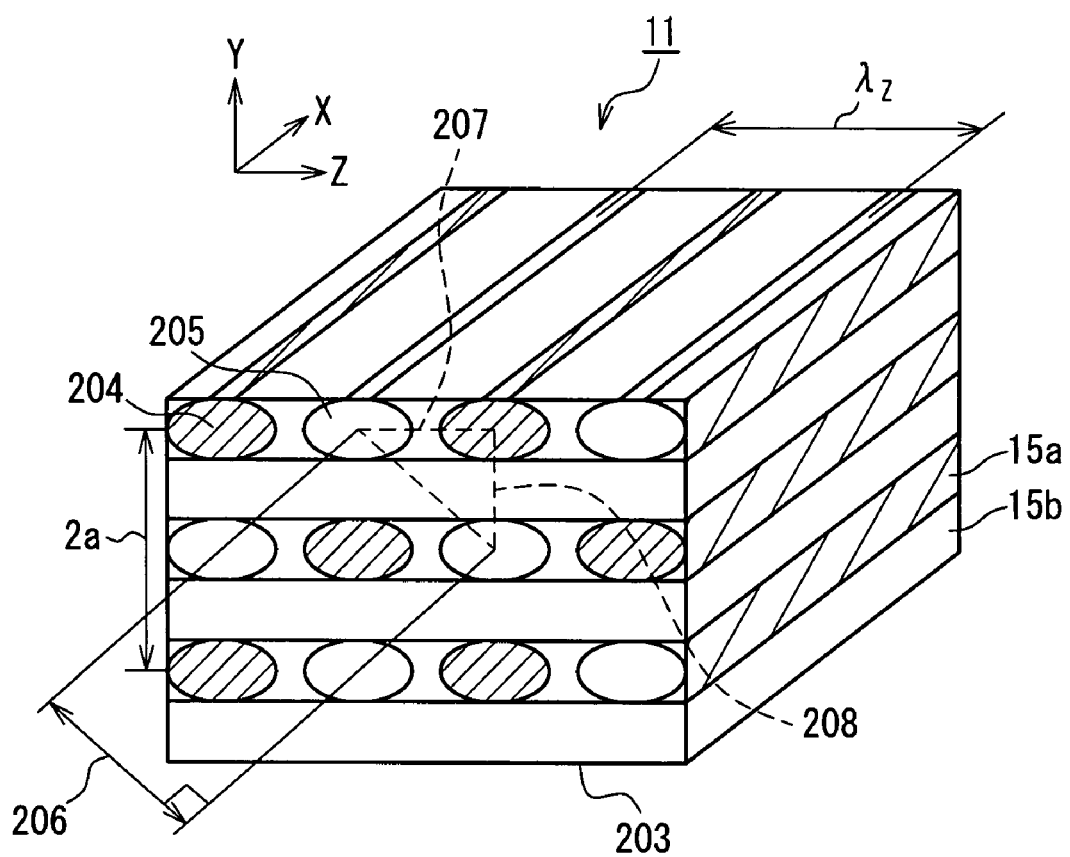
FIG. 23 is a diagram showing an electric field for the case where the mth-order propagation light travels in the Z-axis direction in the one-dimensional photonic crystal.

Next, a description will be given for the light confinement condition for preventing leakage of light from a side face of the one-dimensional photonic crystal that is parallel to the YZ plane. First, the case is considered where the above-described mth-order propagation light travels in the Z-axis direction in the photonic crystal 11. FIG. 23 is a diagram showing an electric field for the case where the mth-order propagation light travels in the Z-axis direction in the one-dimensional photonic crystal. As shown in FIG. 23, an electric field pattern shown as a checkered pattern is formed on a side face of the photonic crystal 11 on which the periodic structure is exposed (surface parallel to the YZ plane) 203 in the case where the mth-order propagation light travels in the Z-axis direction in the photonic crystal 11. More specifically, FIG. 23 shows crests 204 of the electric field and troughs 205 of the electric field. Although not shown in the drawing, the medium serving as the cladding existing around the photonic crystal 11 is a homogeneous medium whose refractive index n is uniform. Accordingly, the side face 203 of the photonic crystal 11 on which the periodic structure is exposed is in contact with the homogeneous medium having a refractive index n.

Using the period a of the photonic crystal 11, the characteristics of these electric fields will be described. As shown in FIG. 23, a wavefront having a period 206 is generated on the homogeneous medium side of the side face 203 on which the periodic structure is exposed and that is in contact with the homogeneous medium. The wavefront may be leaking light. FIG. 23 shows a right triangle formed by additional lines 207 and 208 that are perpendicular to each other and the period 206 (hypotenuse). The lengths of the additional lines 207 and 208 are $\lambda_Z/2$ and a, respectively, so that the length (magnitude) of the period 206 readily can be determined. Here, $\lambda_Z$ is the period in the traveling direction of the propagation light. That is, the magnitude of the period 206 more specifically can be expressed as $a\lambda_Z/(\lambda_Z^2/4+a^2)^{0.5}$. Accordingly, when the magnitude $a\lambda_Z/(\lambda_Z^2/4+a^2)^{0.5}$ of the period 206 is larger than the wavelength $\lambda_0/n$ in the homogeneous medium having a refractive index n, the wavefront will be leaking light. Therefore, the condition for preventing the light propagating through the homogeneous medium having a refractive index n from leaking from the surface of the photonic crystal 11 that is parallel to the YZ plane is given as Expression (8) below.

$$\lambda_0/n > a\lambda_Z/(\lambda_Z^2/4+a^2)^{0.5} \qquad (8)$$

For example, from the expression $\lambda=2\pi/k_Z$, in which the Z-axis direction component kz of the wave vector in FIG. 7 is used, $\lambda_Z$ can be determined by $\lambda_Z=2\pi/k_1$ in case of the propagation in the first band for the vacuum wavelength $\lambda_0$.

Embodiment 1

In the above description regarding the photonic crystal, there is no particular limitation with respect to the materials forming the photonic crystal. A waveguide element according to Embodiment 1 of the present invention includes a one-dimensional photonic crystal having a refractive index periodicity in one direction, and propagates light in a direction in which the one-dimensional photonic crystal does not have the refractive index periodicity. In this case, the photonic crystal constitutes a core, and at least one of the materials forming the photonic crystal is a fluid. Further, the fluid also constitutes at least a portion of a cladding that is in contact with a side face of the core. The fluid is a material whose shape can be altered easily, such as a liquid or a gas. Further, the photonic crystal also may be formed in at least a portion of the cladding.

Figure 24:
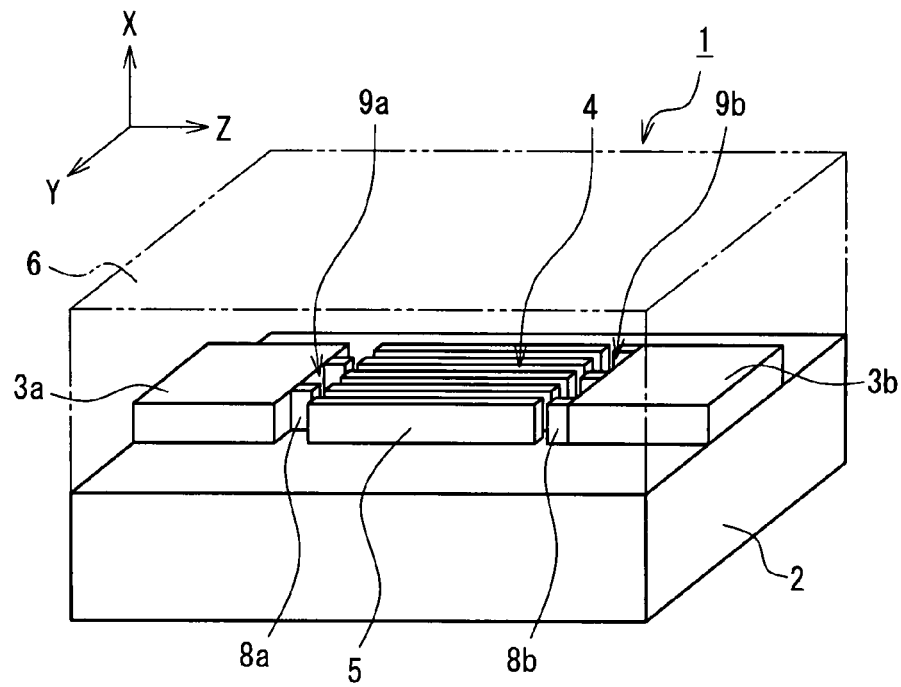
FIG. 24 is a perspective view showing the configuration of a waveguide element according to Embodiment 1 of the present invention.

A waveguide element according to Embodiment 1 of the present invention will be described with reference to the drawings. FIG. 24 is a perspective view showing the configuration of a waveguide element according to Embodiment 1 of the present invention. FIG. 24 shows the configuration of a waveguide element using a one-dimensional photonic crystal. In FIG. 24, the direction in which the photonic crystal has a refractive index periodicity (the direction of refractive index period) is the Y-axis direction, and directions that are perpendicular to the Y-axis direction and are perpendicular to each other are the X-axis direction and the Z-axis direction.

The waveguide element 1 according to Embodiment 1 shown in FIG. 24 is a waveguide-type optical element including a one-dimensional photonic crystal. As shown in FIG. 24, the waveguide element 1 according to Embodiment 1 includes a substrate 2, waveguides 3a and 3b provided on the substrate 2, a plurality of flat plates 5 arranged periodically in the form of a ridge on the substrate 2, a fluid 6, and a plurality of flat plates 8a for the phase grating and a plurality of flat plates 8b for the phase grating respectively forming phase gratings 9a and 9b with the fluid 6. In addition, the waveguide 3a and the phase grating 9a constitute an input portion, and the waveguide 3b and the phase grating 9b constitute an output portion.

The flat plates 5 are arranged periodically in the Y-axis direction on the substrate 2 so that they are parallel to each other, and the space between the flat plates 5 is filled with the fluid 6. The flat plates 5 and the fluid 6 are arranged alternately periodically, and the flat plates 5 and the fluid 6 constitute a photonic crystal 4 (core). In other words, the photonic crystal 4 is a one-dimensional photonic crystal having a refractive index periodicity only in the Y-axis direction. Further, each of the pluralities of flat plates 8a and 8b for the phase grating and the fluid 6 are arranged alternately periodically. Thus, the phase gratings 9a and 9b, which are the same as the phase gratings 166a and 166b (see FIG. 13) used in the above-described fourth method, are formed. The phase grating 9a on the input side is provided between the waveguide 3a and the photonic crystal 4, and the phase grating 9b on the output side is provided between the photonic crystal 4 and the waveguide 3b. The phase gratings 9a and 9b may have, for example, a structure including the fluid 6 and having a refractive index periodicity only in the Y-axis direction, and therefore can be formed easily. Further, it is possible to convert light emitted from the photonic crystal 4 into a plane wave by providing the phase grating 9b on the output side of the photonic crystal 4. The phase gratings 9a and 9b may have the same configuration as that of the phase gratings 166a and 166b shown in FIG. 13, and the period of the phase gratings 9a and 9b may be, for example, twice that of the photonic crystal 4. This makes it possible to realize the above-described fourth method, and also to provide an input portion that generates propagation light due to a band on a Brillouin zone boundary in the photonic crystal 4 (core), using a simple configuration.

The fluid 6 is disposed not only between the flat plates 5, between the flat plates 8a for the phase grating and between the flat plates 8b for the phase grating, but also around the flat plates 5, the waveguides 3a and 3b and the flat plates 8a and 8b as well. In other words, at least a portion of the cladding located on a side face of the photonic crystal 4 serving as the core is constituted by a fluid. In practice, since the fluid 6 is disposed around the flat plates 5, the waveguides 3a and 3b and the flat plates 8a and 8b, the flat plates 5, the waveguides 3a and 3b and the flat plates 8a and 8b are covered with the fluid 6. However, in FIG. 24, the flat plates 5, the waveguides 3a and 3b and the flat plates 8a and 8b are indicated by solid lines for ease of view. In addition, although FIG. 24 shows the fluid 6 as being fixed onto the substrate 2, the fluid 6 may be, for example, a gas or a liquid, and need not be fixed onto the substrate 2. In practice, the fluid 6 may be disposed around the flat plates 5, the waveguides 3a and 3b and the flat plates 8a and 8b, and between the flat plates 5, between the flat plates 8a and between the flat plates 8b, for example, by immersing, in a container filled with the fluid 6, the substrate 2 on which the flat plates 5, the waveguides 3a and 3b and the flat plates 8a and 8b are placed.

As described above, it is possible to form the waveguide element 1 that includes a core constituted by the photonic crystal 4 having a refractive index periodicity in one direction and including the fluid 6 as at least one of the materials. It should be noted that the cladding for this core is constituted by the fluid 6 and the substrate 2. Furthermore, the waveguide element 1 includes the phase gratings 9a and 9b including the fluid 6.

Thus, the flat plates 5 and the flat plates 8a and 8b for the phase grating are arranged periodically on the substrate 2. In addition, the waveguides 3a and 3b, etc. provided on the substrate 2 are formed. Moreover, the fluid 6 is disposed around the flat plates 5, the waveguides 3a and 3b and the flat plates 8a and 8b such that the fluid 6 flows between the flat plates 5, between the flat plates 8a and between the flat plates 8b. According to this configuration, the waveguide element 1 can be produced easily. Furthermore, the photonic crystal 4, which is a refractive index periodic structure, and the phase gratings 9a and 9b also can be formed easily.

As described above, the waveguide element 1 according to Embodiment 1 can be produced easily, since a portion of the photonic crystal 4, a portion of the cladding and a portion of the phase gratings 9a and 9b are constituted by the fluid 6. By realizing propagation on a Brillouin zone boundary in the waveguide element 1, it is possible to cause "very large wavelength dispersion" or "group-velocity anomaly", making it possible to apply the waveguide element 1 to a variety of optical control elements.

To propagate the light due to a band on the Brillouin zone boundary through the photonic crystal 4 of the waveguide element 1, the above-described first to fifth methods for realizing propagation on the Brillouin zone boundary may be used. In particular, the fourth and fifth methods may be used. The fourth method has been described above.

Figure 25:
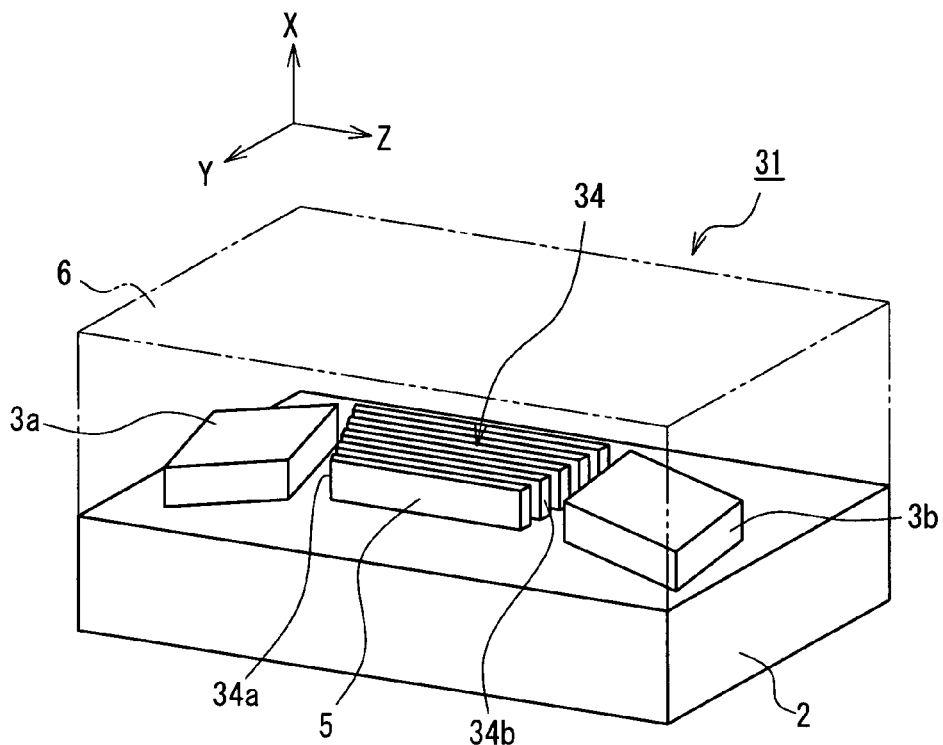
FIG. 25 is a perspective view showing the configuration of a waveguide element using the fifth method for realizing propagation on a Brillouin zone boundary.

The following is a description of the case where the fifth method is used. In order to use the fifth method, the phase gratings 9a and 9b may be removed from the waveguide element 1 shown in FIG. 24, and instead, the incident end face and outgoing end face of the photonic crystal 4 may be rendered oblique. FIG. 25 is a perspective view showing the configuration of a waveguide element using the fifth method for realizing propagation on a Brillouin zone boundary. More specifically, as shown in FIG. 25, a waveguide element 31 using the fifth method includes a photonic crystal 34 having an oblique incident end face. In FIG. 25, those members having the same functions as the members shown in FIG. 24 are denoted by the identical reference numerals, and the description thereof has been omitted.

An end face 34a similar to the end face 171a (see FIG. 14) used in the fifth method may be used in the waveguide element 31 shown in FIG. 25. In the waveguide element 31 shown in FIG. 25, the incident end face 34a of the photonic crystal 34 is inclined with respect to a plane (the XY plane) perpendicular to the propagation direction (the Z-axis direction) of the propagation light. More specifically, the same condition used in the fifth method may be used. Similarly, the outgoing end face 34b of the photonic crystal 34 also may be inclined with respect to a plane (the XY plane) perpendicular to the propagation direction (the Z-axis direction) of the propagation light, as with the incident end face 34a. This makes it possible to convert the light emitted from the end face 34b into a plane wave. In addition, the waveguide 3a constitutes an input portion, and the waveguide 3b constitutes an output portion.

In the foregoing, the waveguide elements 1 and 31 using the fourth and fifth methods have been described. With the waveguide elements 1 and 31, propagation light readily can be coupled to a band on the Brillouin zone boundary. Besides these configurations, the propagation light readily can be coupled to a band on the Brillouin zone boundary, for example, by adopting a configuration in which waveguide elements using the first to third methods are used, and a portion of the photonic crystal is constituted by the fluid. This enables all the propagation light, including the first band light, to exhibit the propagation characteristics similar to those of a higher-order band light, so that it is possible to use the waveguide elements 1 and 31 to form a light control element utilizing a "large change of an effective refractive index due to the wavelength" or "group-velocity anomaly". It is also possible to use the waveguide elements 1 and 31, for example, for a light-emitting element using quantum dots, an optical signal amplification element, a light amplification element using a component such as erbium, thulium or chromium, and a laser oscillation element using organic dyes. It should be noted that the propagation light due to the first or second band on the Brillouin zone boundary may be propagated individually. The propagation mode in a photonic band may not be located on a Brillouin zone boundary. The propagation mode can be located on the center line of the Brillouin zone or in the vicinity thereof on the photonic band which is not the lowest-order band.

Furthermore, the waveguide elements 1 and 31 according to Embodiment 1 can be produced, for example, simply by immersing the rest of the members in the fluid 6, and therefore can be produced easily.

Next, a description is given on the condition for confining higher-order mode propagation light on a Brillouin zone boundary in the photonic crystals 4 and 34 of the waveguide elements 1 and 31 according to Embodiment 1. Here, the vacuum wavelength of light to be propagated is $\lambda_0$, the Z-axis direction component of the wave vector of the higher-order mode propagation light is kz, the period of the photonic crystals 4 and 34 is a, the refractive index of the fluid 6 is $n_F$, and the refractive index of the substrate 2 is $n_S$. Accordingly, the period $\lambda_Z$ in the Z-axis direction of the propagation light is $2\pi/kz$. As described above, the substantial magnitude of the period 206 of the propagation light on the side face 203 (see FIG. 23) of the core on which the periodic structure is exposed is $a\lambda_Z/(\lambda_Z^2/4+a^2)^{0.5}$.

First, of the surfaces of the photonic crystals 4 and 34 that are parallel to the YZ plane, the surface on the fluid 6 side is in contact with a bulk of the fluid 6 having a refractive index $n_F$. Therefore, from Expression (8) above, the light confinement condition of this surface is given by Expression (9) below.

$$a\lambda_Z/(\lambda_Z^2/4+a^2)^{0.5} < \lambda_0/n_F \quad (9)$$

A case will be described where higher-order mode propagation due to the second band on a Brillouin zone boundary occurs in the photonic crystals 4 and 34. For example, since the phase grating 9a having a period 2a is provided on the input side of the photonic crystal 4 in the waveguide element 1 shown in FIG. 24, higher-order mode propagation due to the second band on the Brillouin zone boundary occurs in the photonic crystal 4. In this case, the light confinement condition of the side face of the photonic crystal 4, i.e., the surface parallel to the XZ plane is that the period $\lambda_Z$ in the Z-axis direction of the propagation light is smaller than the wavelength $\lambda_0/n_F$ in the fluid 6. That is, the condition is given as Expression (10) below.

$$\lambda_Z(=2\pi/kz) < \lambda_0/n_F \quad (10)$$

Since the refractive index of the substrate 2 is $n_S$, the light confinement condition of the surface in contact with the substrate 2, of the surfaces of the photonic crystals 4 and 34 that are parallel to the YZ plane, is given as Expression (11) below based on Expression (8) above.

$$a\lambda_Z/(\lambda_Z^2/4+a^2)^{0.5} < \lambda_0/n_S \quad (11)$$

From the foregoing, the light confinement condition of the photonic crystals 4 and 34 is that Expressions (9), (10) and (11) above all are satisfied. However, since the condition of Expression (10) above includes the condition of Expression (9) above, the condition of Expression (9) above is not necessary when the condition of Expression (10) above is satisfied. In addition, if $n_S > n_F$, then Expression (9) above is satisfied when Expression (11) above is satisfied. Further, if $n_S < n_F$, then Expression (11) above is satisfied when Expression (9) above is satisfied.

The various members of the waveguide elements 1 and 31 will be described. If the flat plates 5 and the substrate 2 are made of the same material, then the flat plates 5 readily can be formed by processing the substrate 2 by a method such as etching. In this case, the refractive index $n_S$ of the substrate 2 tends to be higher than the average refractive index of the photonic crystals 4 and 34 serving as the core, so that it may be difficult to satisfy the condition of Expression (11) above. In such a case, the flat plates 5 may be formed with a material having a higher refractive index than the substrate 2.

Since it is necessary to carry out light confinement, an optical glass, a crystallized glass, quartz or a fluoride having a low refractive index is particularly suitable as the material for the substrate 2 of the waveguide elements 1 and 31.

There is no particular limitation with respect to the material for the flat plates 5, as long as the transparency in the wavelength range used is ensured. To obtain the flat plates 5, a thin film may be formed on the substrate 2, and the film may be processed into a plurality of flat plates by a method such as etching. Therefore, examples of suitable materials for the flat plates 5 include silica, silicon, titanium oxide, tantalum oxide, niobium oxide, magnesium fluoride and silicon nitride, which are commonly used as the materials for thin films and which are excellent in terms of durability and film-manufacturing cost. These materials readily can be formed into a thin film by a commonly used method such as sputtering, vacuum deposition, ion assisted deposition or plasma CVD, and also readily can be processed into the flat plates 5 by a method such as etching. The flat plates 5 also may be formed, for example, by nanoimprinting, or pressing of sol-gel glass.

The portions of the waveguide 3a and 3b and the phase gratings 9a and 9b that are other than the fluid 6 can be formed through the same processing as that used for the flat plates 5, so that it is preferable to form them with the same material as that of the flat plates 5, at the same time when the flat plates 5 are processed. This will not require an increase in the number of manufacturing steps, and preparation of any new material, thus making it possible to produce the waveguide elements 1 and 31 according to Embodiment 1 at low cost.

Figure 26:
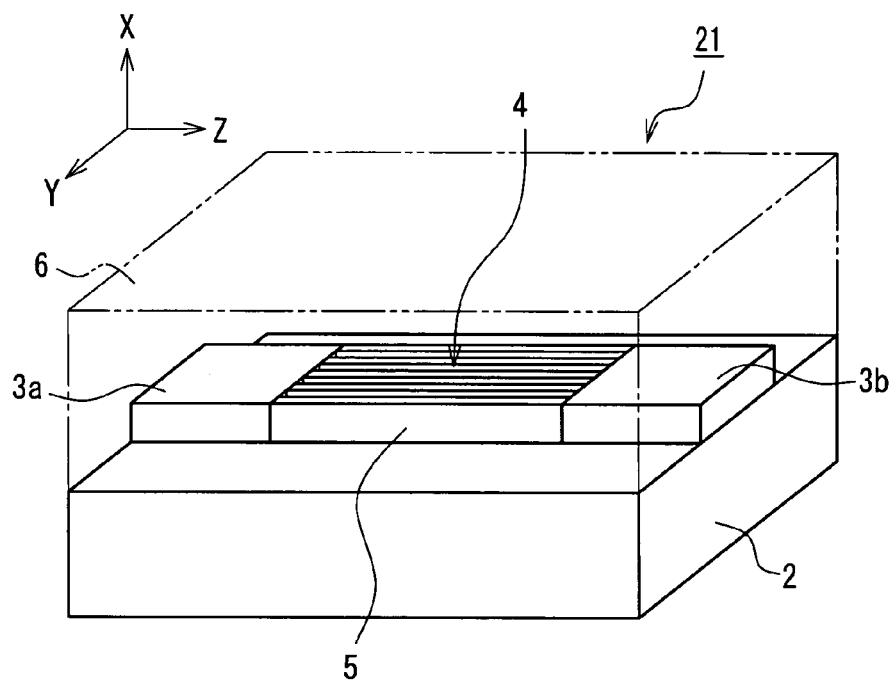
FIG. 26 is a perspective view showing the configuration of a waveguide element according to Embodiment 1 of the present invention that does not couple to propagation light on a Brillouin zone boundary.

Although the waveguide elements that can couple to propagation light on a Brillouin zone boundary have been described specifically in Embodiment 1, this embodiment is not limited to the waveguide element that can couple to propagation light on a Brillouin zone boundary. For example, the waveguide element according to this embodiment may have the configuration shown in FIG. 26. FIG. 26 is a perspective view showing the configuration of a waveguide element according to Embodiment 1 that does not couple to propagation light on a Brillouin zone boundary. It should be noted that the basic configuration of the waveguide element 21 shown in FIG. 26 is identical to that of the waveguide element 1 shown in FIG. 24, but the waveguide element 21 shown in FIG. 26 is different from the waveguide element 1 shown in FIG. 24 in that it does not include the phase gratings 9a and 9b. In the waveguide element 21 shown in FIG. 26, the light propagating through the waveguide 3a is incident on the photonic crystal 4 constituted by the fluid 6 and the plurality of flat plates 5.

In the waveguide element 1 shown in FIG. 24, the phase gratings 9a and 9b and the photonic crystal 4 may have the same period. Consequently, the waveguide element readily can couple to the propagation light of a propagation mode in a photonic band that is located on the center line of the Brillouin zone or in the vicinity thereof and is not the lowest-order band. Additionally, it is possible to reduce the propagation light due to the first band to increase the propagation light due to higher-order bands by providing the phase grating 9a having a period a, as disclosed in JP 2003-215362A and JP 2003-287633A, for example.

As described above, the waveguide element according to Embodiment 1 may be any waveguide element that includes a fluid 6 and a plurality of flat plates 5, wherein the fluid 6 and the flat plates 5 constitute a photonic crystal. This waveguide element readily can be produced, for example, by simply immersing the rest of the materials in the fluid. Although a one-dimensional photonic crystal is used in Embodiment 1, a waveguide element including a two-dimensional photonic crystal or a three-dimensional photonic crystal also readily can be produced by using a fluid as at least one of the materials forming that photonic crystal.

Furthermore, if the fluid 6 is a material that is cured by an external factor, including, for example, a thermosetting resin, then it is possible to form photonic crystals 4 and 34 made of a solid by disposing the fluid 6, and then curing that fluid 6 by heating. More specifically, the plurality of flat plates 5 may be formed on the substrate 2 such that they are parallel to each other and perpendicular to the substrate 2, and the fluid 6 may be disposed between the flat plates 5 and around each of the flat plates 5, followed by solidifying the fluid 6. Thus, a waveguide element including no fluid also readily can be produced. Here, examples of the material that is cured by an external factor include a UV-setting resin, in addition to a thermosetting resin.

Embodiment 2

Figure 27:
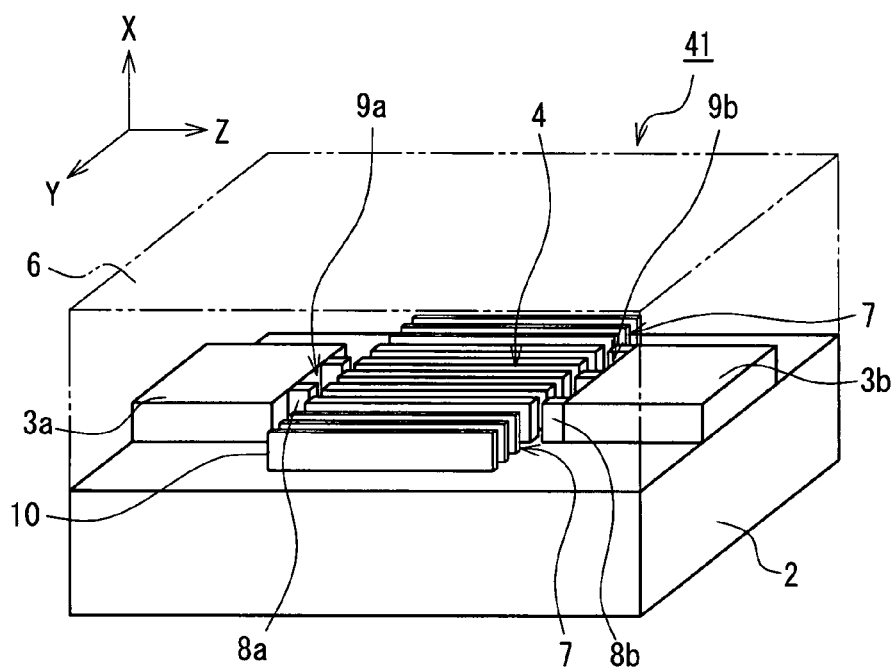
FIG. 27 is a perspective view showing the configuration of a waveguide element according to Embodiment 2 of the present invention.

A waveguide element according to Embodiment 2 of the present invention will be described with reference to the drawings. FIG. 27 is a perspective view showing the configuration of a waveguide element according to Embodiment 2 of the present invention. The waveguide element according to Embodiment 2 of the present invention is a waveguide element in which a photonic crystal serving as a cladding is added in the direction of refractive index period of the waveguide element according to Embodiment 1. In FIG. 27, those members having the same functions as the members shown in FIG. 24 are denoted by the identical reference numerals, and the description thereof has been omitted.

In FIG. 27, a cladding 7 is a photonic crystal formed by cladding flat plates 10 and the fluid 6. Similarly to the flat plates 5, the cladding flat plates 10 periodically are arranged in the Y-axis direction on the substrate 2 such that they are parallel to each other, and the space between the cladding flat plates 10 is filled with the fluid 6. The cladding flat plates 10 and the fluid 6 are arranged alternately periodically, and the cladding flat plates 10 and the fluid 6 constitute a photonic crystal. In other words, the cladding 7 is a one-dimensional photonic crystal having a refractive index periodicity only in the Y-axis direction, and is disposed in the Y-axis direction of the photonic crystal 4 serving as a core to confine propagation light in the Y-axis direction.

When the interaction with the fluid is increased by reducing the group velocity of propagation light, the period $\lambda_Z(=2\pi/kz)$ in the Z-axis direction of the propagation light increases. Accordingly, it becomes difficult to achieve light confinement in the case of the waveguide element 1 according to Embodiment 1 above shown in FIG. 24, even if the fluid 6 is air having a refractive index of 1. In such a case, as in a waveguide element 41 according to Embodiment 2, it is preferable to provide the cladding 7 constituted by a photonic crystal, and to use the photonic band gap of the cladding 7 to confine the light in the photonic crystal 4 serving as the core. The light confinement using the photonic band gap has been described above with reference to FIG. 22.

To confine higher-order mode propagation light on a Brillouin zone boundary in the waveguide element 41, if $n_S > n_F$, then Expression (11) above may be satisfied, as described in Embodiment 1 above. That is, the following may be satisfied.

$$a\lambda_Z/(\lambda_Z^2/4+a^2)^{0.5} < \lambda_0/n_S \qquad (11)$$

If $n_S < n_F$, then Expression (9) above may be satisfied. That is, the following may be satisfied.

$$a\lambda_Z/(\lambda_Z^2/4+a^2)^{0.5} < \lambda_0/n_F \qquad (9)$$

It should be noted that the vacuum wavelength of the light to be propagated is $\lambda_0$, the Z-axis direction component of the wave vector of higher-order mode propagation light is kz, the period of the photonic crystal 4 is a, the refractive index of the fluid 6 is $n_F$, the refractive index of the substrate 2 is $n_S$. Accordingly, the period $\lambda_Z$ in the Z-axis direction of the propagation light is $2\pi/kz$.

The position of the photonic band gap can be adjusted by adjusting the refractive index or the thickness ratio of the materials forming the photonic crystal serving as the cladding 7, so that it is possible to prevent the propagation light from leaking from the side face of the photonic crystal 4 that is parallel to the XZ plane.

The cladding flat plates 10 constituting the cladding 7 can be formed in the same manner as with the flat plates 5 when forming the flat plates 5, and therefore can be formed easily.

Although the waveguide element 41 according to Embodiment 2 shown in FIG. 27 includes phase gratings, it may include the photonic crystal 34 having an oblique incident end face as shown in FIG. 25, in the case of using the fifth method for realizing propagation on a Brillouin zone boundary. It is also possible to produce waveguide elements using the first to third methods in the same manner.

Embodiment 3

Figure 28:
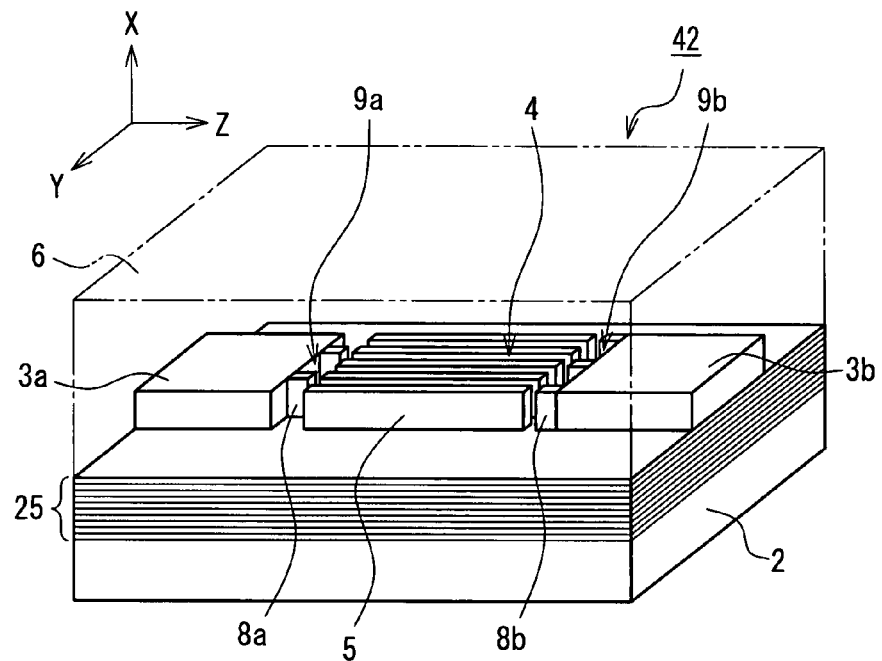
FIG. 28 is a perspective view showing the configuration of a waveguide element according to Embodiment 3 of the present invention.

A waveguide element according to Embodiment 3 of the present invention will be described with reference to the drawings. FIG. 28 is a perspective view showing the configuration of a waveguide element according to Embodiment 3 of the present invention. A waveguide element 42 according to Embodiment 3 of the present invention has a configuration in which a multilayer film 25 constituted by a one-dimensional photonic crystal and being laminated in the X-axis direction is disposed on the surface of the substrate 2 that is on the photonic crystal 4 side in the waveguide element according to Embodiment 1 above shown in FIG. 24. That is, the multilayer film 25 is formed between the substrate 2 and the photonic crystal 4. In FIG. 28, those members having the same functions as the members shown in FIG. 24 are denoted by the identical reference numerals, and the description thereof has been omitted.

In FIG. 28, the multilayer film 25 is constituted by a photonic crystal formed by laminating layers of a plurality of materials periodically and having a refractive index periodicity in the X-axis direction. The position of the photonic band gap can be adjusted by adjusting the refractive index or the thickness ratio of the materials forming the multilayer film 25, so that it is possible to prevent propagation light from leaking from the photonic crystal 4 to the substrate 2 side.

Therefore, in order to confine higher-order mode propagation light on a Brillouin zone boundary in the waveguide element 42, Expression (10) above may be satisfied, as described in Embodiment 1 above. That is, the following may be satisfied.

$$\lambda_Z(=2\pi/kz) < \lambda_0/n_F \qquad (10)$$

Examples of suitable materials for the multilayer film 25 includes silica, silicon, titanium oxide, tantalum oxide, niobium oxide, magnesium fluoride and silicon nitride, which commonly are used as the materials for thin films and which are excellent in terms of the durability and the film-manufacturing cost. These materials readily can be formed into a thin film by a commonly used method such as sputtering, vacuum deposition, ion assisted deposition or plasma CVD. The multilayer film 25 can be formed by successively laminating the thin films.

Figure 29:
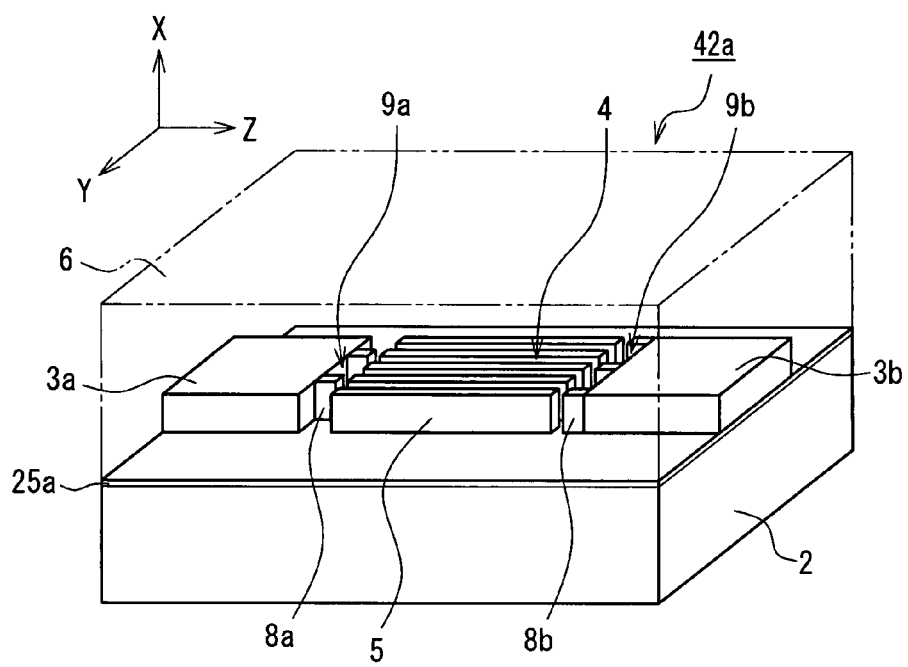
FIG. 29 is a perspective view showing the configuration of another waveguide element according to Embodiment 3 of the present invention.

FIG. 29 is a perspective view showing the configuration of another waveguide element according to Embodiment 3 of the present invention. A waveguide element 42a shown in FIG. 29 has a configuration in which a low refractive index layer 25a is disposed in place of the multilayer film 25 in the waveguide element 42 shown in FIG. 28. The low refractive index layer 25a is a thin film (buffer layer) made of a material having a lower refractive index than the substrate 2, and is in contact with the photonic crystal 4. The low refractive index layer 25a is formed with a material having a refractive index that will not cause the light propagating through the photonic crystal 4 to leak to the low refractive index layer 25a side. With this configuration, it is possible to prevent the propagation light from leaking from the photonic crystal 4 to the low refractive index layer 25a side. It is preferable that the thickness of the low refractive index layer 25a is larger than the wavelength of at least the propagation light. Consequently, it is possible to prevent evanescent light leakage to the substrate 2. For example, magnesium fluoride, which has a lower refractive index than quartz, is suitable as the material for the low refractive index layer 25a. If the refractive index of the low refractive index layer 25a is $n_{SL}$, then the condition for preventing propagation light from leaking from the photonic crystal 4 is that Expression (10) above, and an expression in which $n_{SL}$ is replaced with $n_{SL}$ in Expression (11) above are satisfied. More specifically, the condition is that the following are satisfied.

$$\lambda_Z(=2\pi/kz) < \lambda_0/n_F \qquad (10)$$

$$a\lambda_Z/(\lambda_Z^2/4+a^2)^{0.5} < \lambda_0/n_{SL} \qquad (11)'$$

If $n_{SL} < n_F$, then (11)' above is satisfied when Expression (10) above is satisfied.

As described above, when the multilayer film 25 or the low refractive index layer 25a is used, it is not necessary to consider the refractive index of the substrate 2 when selecting the material for the substrate 2, so that there will be a broader choice when selecting the material.

Although the waveguide elements 42 and 42a according to Embodiment 3 shown in FIGS. 28 and 29 include phase gratings, they may include the photonic crystal 34 having an oblique incident end face as shown in FIG. 25, in the case of using the fifth method for realizing propagation on a Brillouin zone boundary. It is also possible to produce waveguide elements using the first to third methods in the same manner. Furthermore, it is also possible to produce a waveguide element that does not realize propagation on a Brillouin zone boundary (that does not couple to the propagation light on a Brillouin zone boundary) by using the waveguide element shown in FIG. 26.

Embodiment 4

Figure 30:
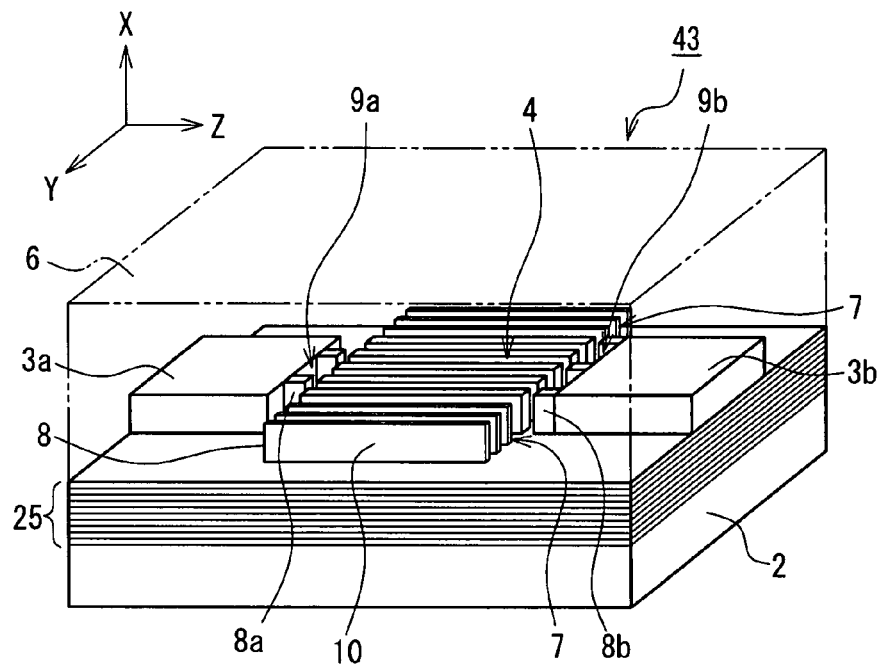
FIG. 30 is a perspective view showing the configuration of a wave guide element according to Embodiment 4 of the present invention.

A waveguide element according to Embodiment 4 of the present invention will be described with reference to the drawings. FIG. 30 is a perspective view showing the configuration of a waveguide element according to Embodiment 4 of the present invention. A waveguide element 43 according to Embodiment 4 of the present invention has a configuration in which the waveguide element 41 according to Embodiment 2 above shown in FIG. 27 and the waveguide element 42 according to Embodiment 3 above shown in FIG. 28 are combined. More specifically, a plurality of cladding flat plates 10 constituting the cladding 7 are arranged periodically in the Y-axis direction on the substrate 2 such that they are parallel to each other and sandwich the photonic crystal 4, and the space between the cladding flat plates 10 is filled with the fluid 6 (the cladding 7 is a photonic crystal constituted by the cladding flat plates 10 and the fluid 6). Further, a multilayer film 25 constituted by a one-dimensional photonic crystal and being laminated in the X-axis direction is disposed on the surface of the substrate 2 that is on the photonic crystal 4 side. In FIG. 30, those members having the same functions as the members shown in FIGS. 27 and 28 are denoted by the identical reference numerals, and the description thereof has been omitted.

Since the photonic crystal is disposed on the two side faces parallel to the XZ plane and the substrate 2-side bottom face of the photonic crystal 4 in the waveguide element 43 according to Embodiment 4, it is possible to achieve light confinement with the photonic band gap in the three directions of those side faces and bottom face. That is, the position of the photonic band gap can be adjusted by adjusting the refractive index or the thickness ratio of the materials constituting the cladding 7 and the photonic crystal serving as the multilayer film 25, so that it is possible to prevent the propagation light from leaking from the side faces of the photonic crystal 4 that are parallel to the XZ plane and the bottom face of the photonic crystal 4 that is on the substrate 2 side.

Therefore, in order to confine higher-order mode propagation light on a Brillouin zone boundary in the waveguide element 43, Expression (9) above may be satisfied, as described in Embodiment 1 above. That is, the following may be satisfied.

$$a\lambda_Z/(\lambda_Z^2/4+a^2)^{0.5} < \lambda_0/n_F \qquad (9)$$

Although the waveguide element 43 according to Embodiment 4 shown in FIG. 30 includes phase gratings, it may include the photonic crystal 34 having an oblique incident end face as shown in FIG. 25, in the case of using the fifth method for realizing propagation on a Brillouin zone boundary. It is also possible to produce waveguide elements using the first to third methods in the same manner.

Additionally, light is not confined with the substrate 2 in Embodiments 3 and 4 above, so that it is not necessary to take into consideration the refractive index of the substrate 2. Accordingly, a semiconductor material such as a Si substrate may be used as the substrate 2.

As described above, the waveguide elements according to Embodiments 1 to 4 above have simple configurations, and therefore can be produced easily. Furthermore, the waveguide elements according to Embodiments 1 to 4 above can be used as waveguide elements for readily coupling propagation light to a band on a Brillouin zone boundary.

Embodiment 5

An optical sensor according to Embodiment 5 of the present invention will be described with reference to the drawings. The optical sensor according to Embodiment 5 has, as its basic structure, a structure in which the fluid 6 is removed from the waveguide element 1 shown in FIG. 24, which has been described in Embodiment 1 above. Further, in the optical sensor according to Embodiment 5, the fluid 6 is a test substance.

Figure 31:
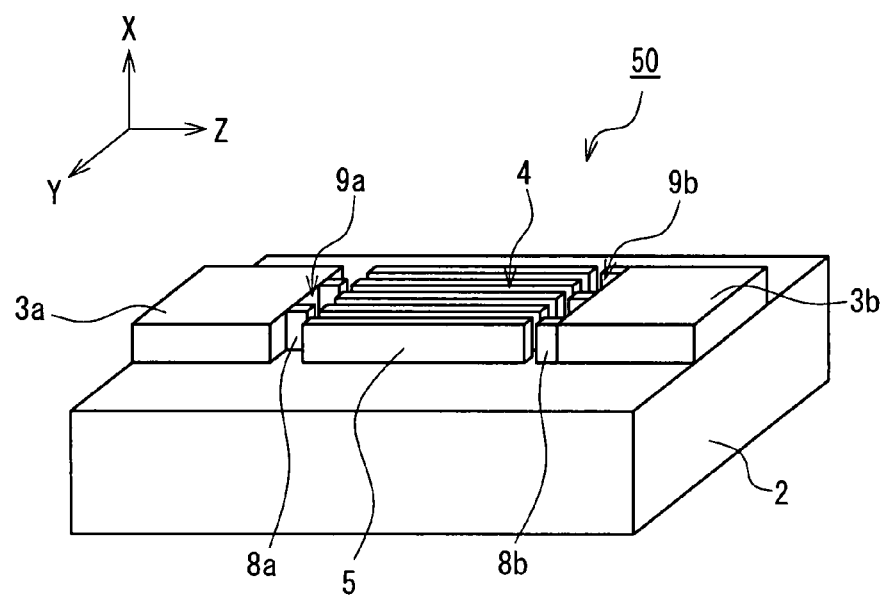
FIG. 31 is a perspective view showing the configuration of an optical sensor according to Embodiment 5 of the present invention.

FIG. 31 is a perspective view showing the configuration of an optical sensor according to Embodiment 5 of the present invention. In FIG. 31, those members having the same functions as the members shown in FIG. 24 are denoted by the identical reference numerals. As shown in FIG. 31, an optical sensor 50 according to Embodiment 5 includes a substrate 2, waveguides 3a and 3b provided on the substrate 2, and a plurality of flat plates 5 arranged periodically in the form of a ridge on the substrate 2. The flat plates 5 are arranged periodically in the Y-axis direction on the substrate 2 such that they are parallel to each other. Since the flat plates 5 are arranged periodically with gaps between them, the flat plates 5 constitute a photonic crystal 4, together with air, for example. Further, a phase grating 9a and a phase grating 9b are respectively disposed between the waveguide 3a and the photonic crystal 4, and between the photonic crystal 4 and the waveguide 3b. Additionally, the phase gratings 9a and 9b are constituted by a plurality of flat plates 8a for the phase grating and a plurality of flat plates 8b for the phase grating, respectively, and air. Further, the waveguide 3a and the phase grating 9a constitute an input portion, and the waveguide 3b and the phase grating 9b constitute an output portion.

The waveguide 3a serves to make light incident onto the photonic crystal 4, and the light emitted from the photonic crystal 4 is input to the waveguide 3b. The light propagated through the waveguide 3b reaches a detection portion such as a detector or a spectroscope.

In the following, a method for using the optical sensor 50 will be described. For example, by dropping a liquid serving as a test substance onto the optical sensor 50, the plurality of flat plates 5 are covered with the test substance. More specifically, the test substance is disposed between the flat plates 5, and around each of the flat plates 5 of the optical sensor 50. In other words, the test substance becomes a part of the photonic crystal including the flat plates 5 as its component. That is, a configuration similar to that of the waveguide element 1 shown in FIG. 24 described in Embodiment 1 above is achieved. It should be noted that the test substance is the fluid 6 (see FIG. 24). The procedure after dropping the test substance serving as the fluid 6 onto the optical sensor 50 will be described also with reference to FIG. 24.

By dropping the test substance serving as the fluid 6 onto the optical sensor 50, the waveguide element 1 shown in FIG. 24 is formed. In the case of propagating light through the photonic crystal 4 of the waveguide element 1, the change in the characteristics, such as the refractive index, of the test substance (fluid 6) directly influences the propagation light. Therefore, the waveguide element 1 functions as an optical sensor that detects the change in the characteristics of the test substance (fluid 6) with high sensitivity. Although the test substance (fluid 6) was described as being dropped, it is also possible, for example, to immerse the optical sensor 50 in a container filled with the test substance (fluid 6). It is sufficient as long as the test substance (fluid 6) is filled between the flat plates 5 and around each of the flat plates 5. A fluid may be used as the test substance, and it is also possible to use a gas, for example.

The optical sensor 50 may be of any size, as long as it can function as the waveguide element 1. For example, the length in the Y-axis direction of the photonic crystal 4 is preferably several times larger than the wavelength of the propagation light. Consequently, for example, when the characteristics of the test substance (fluid 6) have changed, that change is transmitted quickly to the entire test substance (fluid 6) filling the space between the flat plates 5, so that it is possible to realize an optical sensor 50 capable of quick response. For example, in the case of using a fluid as the test substance, reacting the fluid and determining whether the reaction has been completed, it is possible to know whether the reaction has been completed, based on the difference in the characteristics of the propagation light before and after the reaction, by examining, with a detector or the like, the light propagating through the waveguide 3b to which the propagation light in the photonic crystal 4 has been input. Thus, with the optical sensor 50 according to Embodiment 5, it is possible to measure the characteristics of the test substance (fluid 6) with high accuracy, using a simple configuration.

When the test substance (fluid 6) has a lower refractive index than the flat plates 5, the energy of electromagnetic waves such as light generally tends to be localized in a portion with a larger refractive index. That is, in the photonic crystal 4, the electric field is localized in the flat plates 5, which have a higher refractive index, so that the electric field of the fluid 6 serving as the test substance is reduced. Accordingly, the interaction between propagation light and the test substance (fluid 6) is small, reducing the response to the change in the characteristics of the test substance (fluid 6). However, since the flat plates 5 and the test substance (fluid 6) constitute the photonic crystal, it is possible to increase the electric field on the side of the test substance (fluid 6), which has a lower refractive index, for example, by propagating light using a propagation mode of the second band on a Brillouin zone boundary. This in turn makes it possible to detect the change in the characteristics of the test substance (fluid 6) with even higher accuracy. In the case of propagating light using a propagation mode of the second band on a Brillouin zone boundary, the above-described method may be used.

It is preferable that the photonic crystal 4 is longer in the propagation direction (the Z-axis direction). Consequently, the region in which the interaction between light and the fluid 6 occurs is expanded, making it possible to increase the action caused by light. As a result, it is possible to increase the sensitivity of the optical sensor 50 even further.

In the case of using a test substance (fluid 6) having a higher refractive index than the flat plates 5, a propagation mode of the first band on a Brillouin zone boundary may be used. This makes it possible to localize the electric field in the test substance (fluid 6), which is the high refractive index side.

As described above, in the case of using a medium having a lower refractive index than the flat plates 5 as the test substance (fluid 6), a propagation mode of the second band on a Brillouin zone boundary may be used. In the case of using a medium having a higher refractive index than the flat plates 5 as the test substance (fluid 6), a propagation mode of the first band on a Brillouin zone boundary may be used. This makes it possible to localize the electric field on the side of the fluid 6 serving as the test substance, thus enabling the optical sensor 50 to exert the maximum effect as a sensor.

In order to use a propagation mode on a Brillouin zone boundary for the optical sensor 50 according to Embodiment 5 in this way, the first to fifth methods described in Embodiment 1 above may be used. The optical sensor 50 also may include, for example, the photonic crystal 34 having an oblique incident end face (see FIG. 25).

Furthermore, it is possible to provide, for example, the cladding 7 constituted by a photonic crystal (see FIG. 27), the multilayer film 25 on the substrate 2 (see FIG. 28), or the low refractive index layer 25a (see FIG. 29) in order to strengthen the light confinement of the photonic crystal 4. It is also possible to adopt, for example, a combination (complex) of these components (see FIG. 30).

Even if the photonic crystal 4 of the optical sensor 50 does not use a mode on a Brillouin zone boundary, it sufficiently functions as a sensor. More specifically, this sensor has a configuration in which the fluid 6 is used as the test substance in the waveguide element 21 shown in FIG. 26. The band diagrams in this case are shown in FIGS. 3 and 4. As shown in these band diagrams, propagation is achieved only due to the first band when the normalized frequency is low, and propagation is achieved due to a plurality of bands when the normalized frequency is increased to some degree. Since the intensity of the electric field of the low refractive index layer is increased to some extent in a higher-order band, this configuration also provides a sufficient effect as a sensor.

Furthermore, as described above, it is possible to reduce the propagation light due to the first band to increase the propagation light due to a higher-order band by providing a phase grating having the same period a as the photonic crystal 4 on the input side of the photonic crystal 4.

Next, the characteristics that are measured when using the above-described optical sensor 50 will be described specifically.

Figure 32:
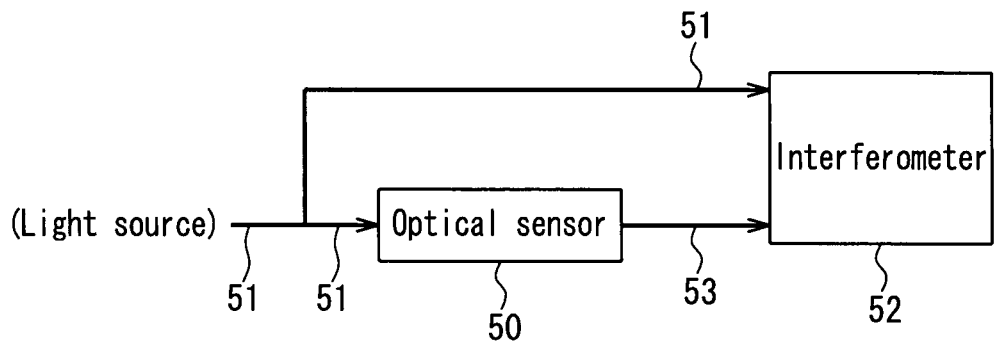
FIG. 32 is a block diagram showing the configuration of a refractive index sensor according to Embodiment 5 of the present invention.

First, a case is described where the optical sensor 50 is used as a refractive index sensor for measuring the refractive index of a test substance and the change of the refractive index. FIG. 32 is a block diagram showing the configuration of a refractive index sensor according to Embodiment 5 of the present invention. As shown in FIG. 32, there is provided an interferometer 52 to which the output of the optical sensor 50 onto which a test substance is dropped is input. Input light 51 is input from the input side of the optical sensor 50, the light propagated through the photonic crystal containing the test substance is output as output light 53 from the output side of the optical sensor 50, and the output light 53 is input to the interferometer 52. Further, the input light 51 is branched before being input to the optical sensor 50, and the branched input light 51 is also input to the interferometer 52. In the interferometer 52, the phase difference with respect to the output light 53 is measured, using the input light 51 as reference light. Then, the refractive index of the test substance is determined based on this phase difference. Since the above-described phase difference also changes as the refractive index of the test substance changes, it is also possible to detect the amount of change of the refractive index by detecting the phase difference. Furthermore, it is also possible to detect the frequency or intensity of light in the same manner.

Next, a case will be described where the optical sensor 50 is used as a fluorometric analysis sensor for analyzing fluorescence in a test substance. The optical sensor 50 in this case may have a configuration that enables the second band propagation light on a Brillouin zone boundary to propagate through the photonic crystal 4. In this configuration, excitation light having a frequency that generates fluorescence in the test substance is propagated through the photonic crystal 4 containing the test substance as the second band propagation light on the Brillouin zone boundary. This causes generation of strong fluorescence, since the test substance is located in the antinodes of the electric field in the photonic crystal 4. The fluorescent light is emitted randomly to the area surrounding the photonic crystal 4. Since the fluorescent light is spatially incoherent, some of this fluorescent light that is output from the waveguide 3b may be condensed using a lens or the like, and the condensed fluorescent light may be analyzed. In addition, some of the fluorescent light is not input to the waveguide 3b, so that it may be retrieved from the area surrounding the photonic crystal 4 for analysis.

Furthermore, it is possible to produce an optical sensor 50 for performing Raman scattering analysis, analysis using two-photon absorption fluorescence reaction, SHG detection or THG detection in the same manner. Since the intensity of nonlinear reactions such as Raman scattering, two-photon absorption fluorescence reaction, SHG and THG is proportional to the square or cube of the electric field intensity, it is preferable to have a configuration in which the test substance is located in the antinodes of the electric field.

Furthermore, it is possible to increase the intensity of each of the above-described types of light by extending the waveguide length of the photonic crystal 4, thereby increasing the accuracy of analysis and the like.

Figure 33:
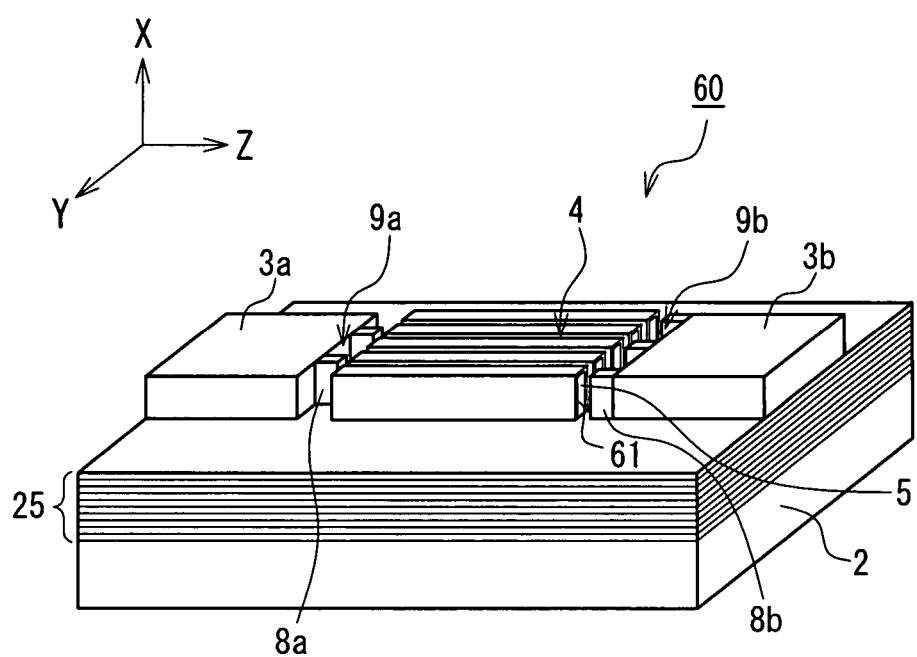
FIG. 33 is a perspective view showing the configuration of another optical sensor according to Embodiment 5 of the present invention.

FIG. 33 is a perspective view showing the configuration of another optical sensor according to Embodiment 5 of the present invention. An optical sensor 60 according to Embodiment 5 has a configuration that is substantially the same as that of the optical sensor 50, but is different from the optical sensor 50 in that a thin-film layer 61 is provided on an exposed surface of each of the flat plates 5 that is not parallel to the XY plane. The rest of the configuration is the same as that of the optical sensor 50, so that those members having the same functions are denoted by the identical reference numerals, and the description thereof has been omitted.

In FIG. 33, any material that selectively reacts with a specific component may be used as the material for the thin-film layer 61. More specifically, an organic resin thin film in which an ionophore that incorporates a specific ion is dispersed, or a porous material thin film supporting an enzyme that forms a bond with a specific protein, for example, may be used as the material for the thin-film layer 61. With this configuration, when a specific component (e.g., ion or protein) is contained in the test substance, the configuration of the photonic crystal 4 is altered during measurement, so that the propagation light changes. Accordingly, it is possible to detect whether the specific component is contained in the test substance.

It is also possible to allow the optical sensor 60 to function as an SPR sensor by using a metal film as the thin-film layer 61. That is, propagation light having a wavelength that matches the SPR wavelength tends to leak to the test substance. Therefore, when detecting the wavelength of the propagation light, if the wavelength at which the propagation loss is maximal is a resonant wavelength, then the wavelength of the propagation light can be detected easily. In addition, the resonant wavelength also changes when the refractive index of the test substance changes, so that it is possible to detect the amount of change of the refractive index by detecting the resonant wavelength. It is also possible to measure the refractive index of the test substance in the same manner. Accordingly, the optical sensor 60 also can be used as a refractive index sensor.

Furthermore, the thin-film layer 61 may have a two-layer structure. For example, a metal film may be formed on the surface each of the flat plates 5, and a layer that reacts with a specific component may be formed on the metal film. This can improve the effect as an SPR sensor even further.

Although the optical sensor 50 having a configuration in which the fluid 6 is removed from the waveguide element 1 shown in FIG. 24 has been described in Embodiment 5 as an example, optical sensors having, for example, configurations in which the fluid 6 is removed from the waveguide elements 21, 31, 41, 42, 42a and 43 (see FIGS. 25 to 30) described in Embodiments 1 to 4 above also can exert the above-described effect as the optical sensor 50. Therefore, it is possible to allow these optical sensors to exert the same effect as that of the optical sensor 60 by providing the thin-film layer 61 on an exposed surface of each of the flat plates 5 that is not parallel to the XY plane, as in the optical sensor 60 described with reference to FIG. 33.

Although the optical sensor according to Embodiment 5 has been described above, the test substance may be any material that can be used for the fluids of the waveguide elements according to Embodiments 1 to 4 above. It is possible to use, for example, various organic solvents, organic resins, and inorganic solvents, besides air or aqueous solutions. Furthermore, by disposing the test substance between the flat plates 5 and around each of the flat plates 5, and then solidifying that test substance, the optical sensor also can be used for analysis of solids. Examples of test substances that can be solidified include a UV-setting resin and sol-gel glass. In the case of detecting components that are sensitive to high temperature, such as organic compounds, proteins, enzymes, antibodies and microorganisms, these components may be contained in fluids that solidify them at a low temperature, and the fluids may be used as the test substance.

By appropriately selecting the materials for the members and the test substance, the optical sensor 50 according to Embodiment 5 can exert its performance in a commonly used light wavelength region, which is a wavelength range of about 200 nm to about 20 μm.

The optical sensor 50 according to Embodiment 5 includes the waveguide constituted by the photonic crystal 4, and the photonic crystal 4 includes the test substance (fluid 6). Accordingly, with the propagation light of the photonic crystal 4, it is possible to detect the change in the characteristics of the test substance (fluid 6) with high sensitivity.

Furthermore, it is possible to carry out more highly accurate measurement by using higher-order band light as the propagation light.

The following shows the results of actually forming the waveguide elements according to Embodiments 1 to 4 above, and determining the propagation characteristics of the waveguide elements using simulation calculation for electromagnetic waves. For the calculation, an FDTD (Finite Difference Time Domain) method was used. The software used for the calculation was a "JMAG" manufactured by The Japan Research Institute, Limited.

Calculation Example 1

Figure 34A:
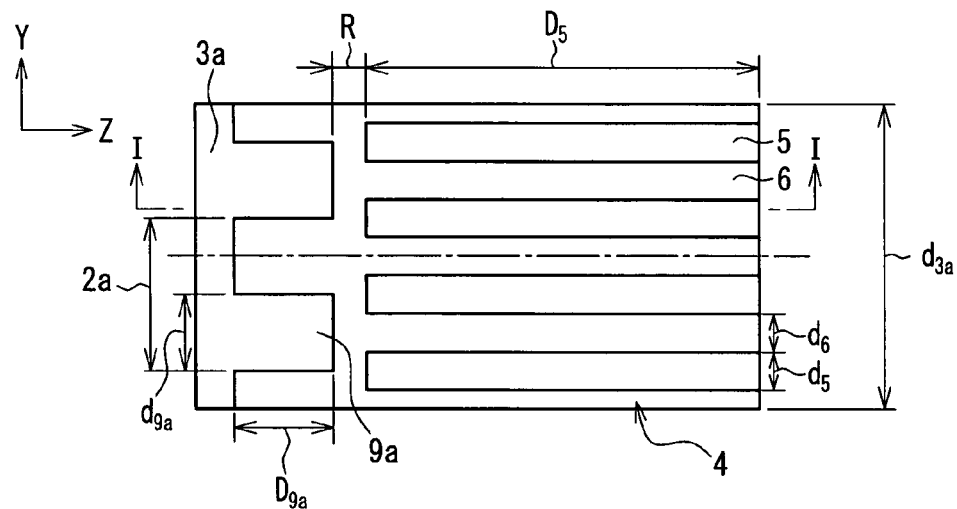
FIG. 34A is a diagram showing the configuration of the waveguide element used for Calculation Example 1, showing a cross-sectional view in the YZ plane of the waveguide element.
Figure 34B:
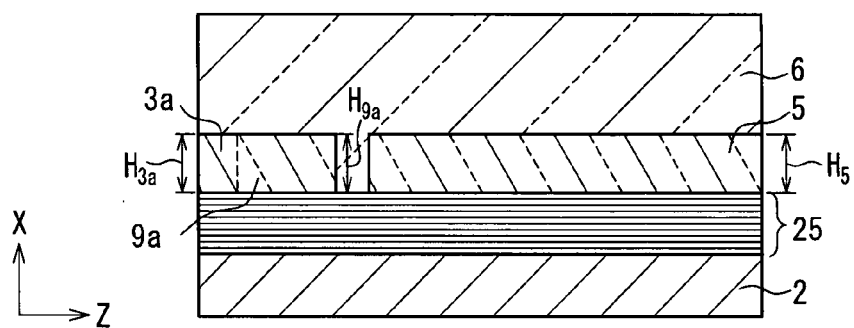
FIG. 34B is a diagram showing the configuration of the waveguide element used for Calculation Example 1, showing a cross-sectional view taken along the arrow I-I in FIG. 34A.

FIG. 34 shows diagrams showing the configuration of the waveguide element used for Calculation Example 1, wherein FIG. 34A is a cross-sectional view in the YZ plane showing the waveguide element, and FIG. 34B is a cross-sectional view taken along the arrow I-I in FIG. 34A (cross-sectional view in the XZ plane of the waveguide element). It should be noted that the propagation direction of light is the Z-axis direction, and the direction of refractive index period of the one-dimensional photonic crystal is the Y-axis direction.

The waveguide element used for Calculation Example 1 has a configuration corresponding to a part of the waveguide element 42 shown in FIG. 28. Therefore, FIG. 34 does not show, for example, the waveguide on the output side. The propagation of the electromagnetic waves through the photonic crystal 4 was calculated for the case where a plane wave having a vacuum wavelength $\lambda_0$ was made incident on the photonic crystal 4 from the input-side waveguide 3*a* serving as a homogeneous waveguide through the phase grating 9*a*. Air (refractive index 1.00) was used as the fluid 6. A light confinement multilayer film 25 was formed on a substrate 2 having a refractive index of 1.45, and flat plates 5, a phase grating 9*a* and a waveguide 3*a* that were made of a material having a refractive index of 2.00 were disposed on the surface of the multilayer film 25. The flat plates 5 and the fluid 6 were arranged periodically with a period a in the Y-axis direction. The boundary surface orthogonal to the Y-axis is the periodic boundary surface, and the structure in the Y-axis direction is equivalent to an infinite periodic structure. The specific numerical values are shown below. Here, the period a of the photonic crystal 4 is used as the standard of length.

(1) Numerical Values Regarding Structure of Photonic Crystal 4
  Refractive index of flat plates 5: 2.00
  Thickness $d_5$ of flat plates 5: 0.30 a
  Thickness $d_6$ of fluid 6: 0.70 a
  Height $H_5$ of flat plates 5: 2.00 a
  Length $D_5$ in Z-axis direction of flat plates 5: 8.30 a
  Number of flat plates 5: 4

(2) Numerical Values Regarding Structure of Phase Grating 9*a*
  Period: 2 a
  Height $H_{9a}$: 2.00 a
  Refractive index: 2.00
  Thickness $d_{9a}$: 1.06 a
  Length $D_{9a}$ in Z-axis direction: 0.500 a
  Spacing R with photonic crystal 4: 1.00 a It should be noted that, of the flat plates for the phase grating constituting the phase grating 9*a*, the intermediate position in the Y-axis direction of the adjacent ones coincides with the intermediate position in the Y-axis direction of the adjacent flat plates 5 of the photonic crystal 4.

(3) Numerical Values Regarding Structure of Waveguide 3*a*
  Height $H_{3a}$: 2.00 a
  Refractive index: 2.00
  Thickness $d_{3a}$ (length in Y-axis direction): 4.00 a (4) Numerical Value Regarding Characteristics of Fluid 6
  Refractive index: 1.00

(5) Numerical Value Regarding Characteristics of Substrate 2
  Refractive index: 1.45

(6) Numerical Values Regarding Structure of Multilayer Film 25

The multilayer film 25 is formed by 10 periods (20 layers) of first thin films and second thin films that are laminated alternately. In addition, a first thin film is in contact with the substrate 2, and a second thin film is in contact with the photonic crystal 4.
  (First Thin Film)
  Refractive index: 2.10
  Height (length in X-axis direction): 0.165 a
  (Second Thin Film)
  Refractive index: 1.45
  Height (length in X-axis direction): 0.165 a (7) Ranges of Calculation in Directions of Respective Axes
  X-axis direction: 7.80 a
  Y-axis direction: 4.00 a ($=d_{3a}$)
  Z-axis direction: 10.00 a (8) Characteristics of Incident Plane Wave
  Vacuum wavelength $\lambda_0$: 1.06 a, TM polarized light (whose magnetic field direction is the X direction)
  Intensity distribution: Gaussian beam only in Y-axis direction
  Length $d_Y$ in Y-axis direction: 1.00 a It should be noted that $d_Y$ denotes the distance at which the central intensity of the incident plane wave is decreased to $1/e^2$ (13.5%). Here, e is the base of a natural logarithm (=2.718 . . . ).

As described above, the refractive index $n_F$ of the fluid 6 is 1.00 in Calculation Example 1, and the light will not leak to the substrate 2 side due to the photonic band gap of the multilayer film 25 formed on the substrate 2, so that the condition for confining the propagation light is that Expression (10) above is satisfied. Accordingly, if the following is not satisfied, then leaking light will occur.

$$\lambda_Z(=2\pi/kz)<\lambda_0/n_F \qquad (10)$$

From the band calculation of the photonic band, the period $\lambda_Z$ in the traveling direction of the electromagnetic waves propagating through the photonic crystal 4 in a mode in the second band on the Brillouin zone boundary is 0.896 a, and the vacuum wavelength $\lambda_0$ of the electromagnetic waves propagating through the photonic crystal 4 is 1.06 a in the condition of Calculation Example 1. Accordingly, Expression (10) above is satisfied in Calculation Example 1, so that the propagation light propagates through the photonic crystal 4 without leaking.

Figure 35A:
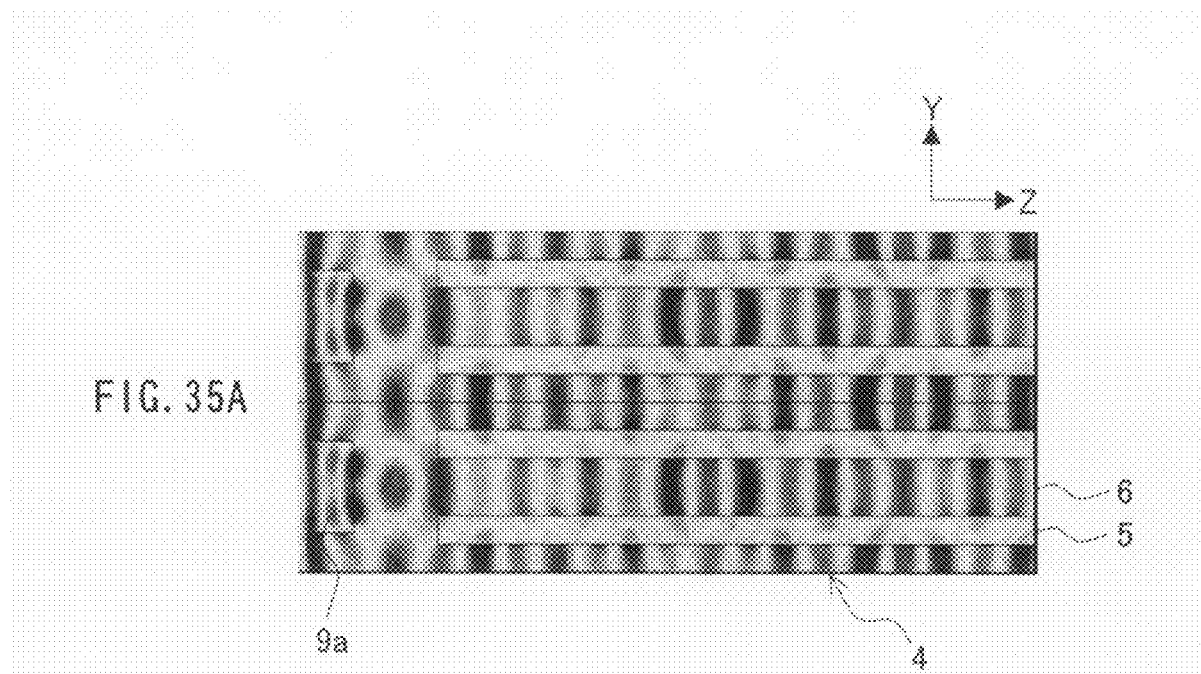
FIG. 35A shows the simulation results of Calculation Example 1, illustrating the electric field intensity distribution in the YZ plane of the waveguide element.
Figure 35B:
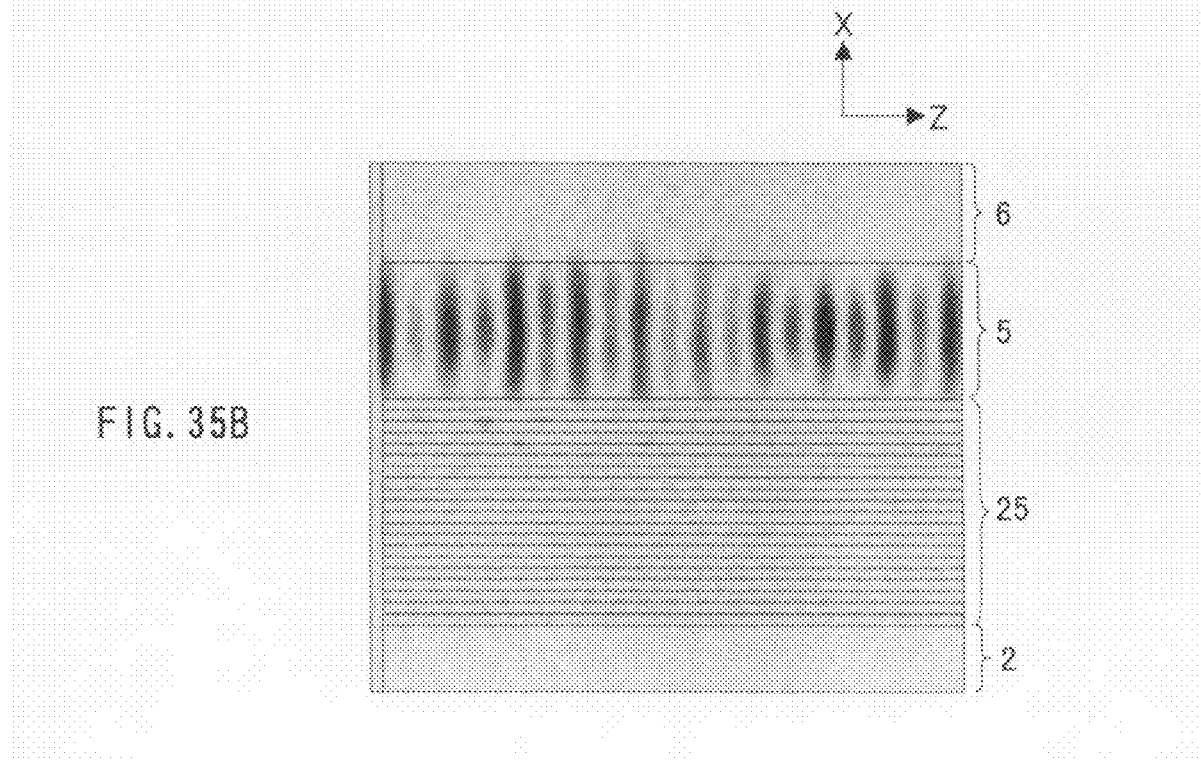
FIG. 35B shows the simulation results of Calculation Example 1, illustrating the electric field intensity distribution in the XZ plane of the waveguide element.

FIG. 35 shows the simulation results of Calculation Example 1, illustrating the electric field intensity distribution. FIG. 35A is a view in the YZ plane of the waveguide element, and FIG. 35B is a view in the XZ plane of the waveguide element. FIGS. 35A and 35B correspond to FIGS. 34A and 34B, respectively. In FIGS. 35A and 35B, dark areas indicate the areas with strong electric field intensity. From FIGS. 35A and 35B, it can be seen that the electric field is localized in the fluid 6 portion, and also that the propagation is achieved with a mode of the second band on a Brillouin zone boundary. Additionally, the waves propagate through the photonic crystal 4, and almost no light is observed to leak to the substrate 2 and the fluid 6 portion serving as the cladding.

Calculation Example 2

Figure 36A:
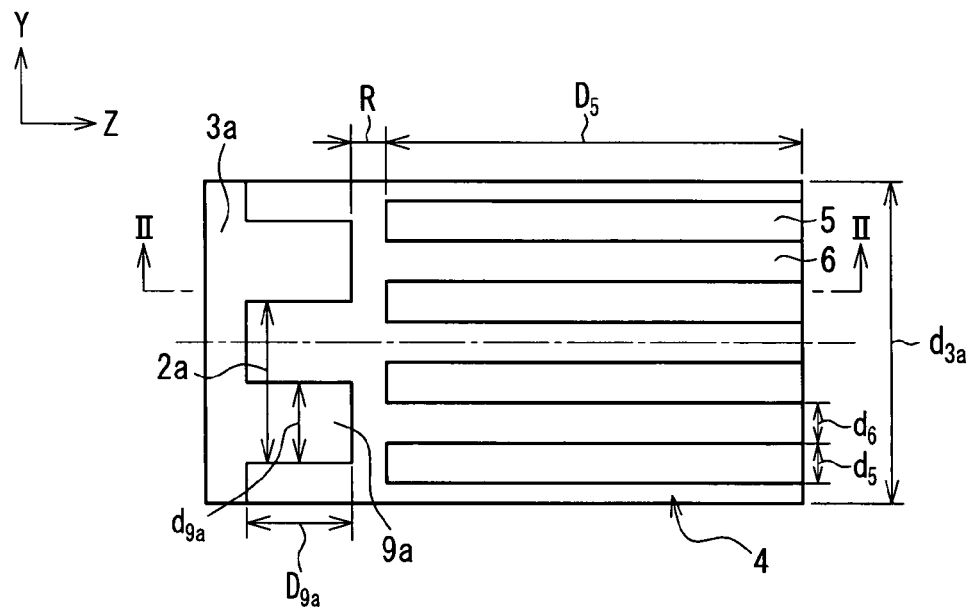
FIG. 36A is a diagram showing the configuration of the waveguide element used for Calculation Example 2, showing a cross-sectional view in the YZ plane of the waveguide element.
Figure 36B:
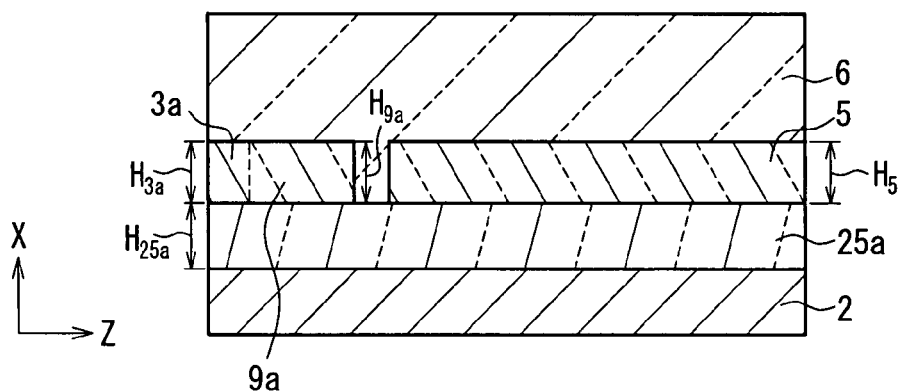
FIG. 36B is a diagram showing the configuration of the waveguide element used for Calculation Example 2, showing a cross-sectional view taken along the arrow II-II in FIG. 36A.

FIG. 36 shows the configuration of the waveguide element used for Calculation Example 2, wherein FIG. 36A is a cross-sectional view in the YZ plane of the waveguide element, and FIG. 36B is a cross-sectional view taken along the arrow II-II in FIG. 36A (cross-sectional view in the XZ plane of the waveguide element). It should be noted that the propagation direction of light is the Z-axis direction, and the direction of refractive index period of the one-dimensional photonic crystal is the Y-axis direction.

The waveguide element used for Calculation Example 2 has a configuration corresponding to a part of the waveguide element 42*a* shown in FIG. 29. Therefore, FIG. 36 does not show, for example, the waveguide on the output side. The propagation of the electromagnetic waves through the photonic crystal 4 was calculated for the case where a plane wave having a vacuum wavelength $\lambda_0$ was made incident on the photonic crystal 4 from the input-side waveguide 3*a* serving as a homogeneous waveguide through the phase grating 9*a*. Water (refractive index 1.33) was used as the fluid 6. A low refractive index layer 25*a* (refractive index 1.38) was formed on a substrate 2 having a refractive index of 1.45, and flat plates 5, a phase grating 9*a* and a waveguide 3*a* that were made of a material having a refractive index of 2.00 were disposed on the surface of the low refractive index layer 25a. The flat plates 5 and the fluid 6 were arranged periodically with a period a in the Y-axis direction. The boundary surface orthogonal to the Y-axis is the periodic boundary surface, and the structure in the Y-axis direction is equivalent to an infinite periodic structure. The specific numerical values are shown below. Here, the period a of the photonic crystal 4 is used as the standard of length.

(1) Numerical Values Regarding Structure of Photonic Crystal 4

Refractive index of flat plates 5: 2.00
Thickness $d_5$ of flat plates 5: 0.50 a
Thickness $d_6$ of fluid 6: 0.50 a
Height $H_5$ of flat plates 5: 2.00 a
Length $D_5$ in Z-axis direction of flat plates 5: 13.0 a
Number of flat plates 5: 4

(2) Numerical Values Regarding Structure of Phase Grating 9a

Period: 2 a
Height $H_{9a}$: 2.00 a
Refractive index: 2.00
Thickness $d_{9a}$: 0.745 a
Length $D_{9a}$ in Z-axis direction: 0.943 a
Spacing R with photonic crystal 4: 0.985 a It should be noted that, of the flat plates for the phase grating constituting the phase grating 9a, the intermediate position in the Y-axis direction of the adjacent ones coincides with the intermediate position in the Y-axis direction of the adjacent flat plates 5 of the photonic crystal 4.

(3) Numerical Values Regarding Structure of Waveguide 3a

Height $H_{3a}$: 2.00 a
Refractive index: 2.00
Thickness $d_{3a}$ (length in Y-axis direction): 4.00 a (4) Numerical Value Regarding Characteristics of Fluid 6

Refractive index: 1.33

(5) Numerical Value Regarding Characteristics of Substrate 2

Refractive index: 1.45

(6) Numerical Values Regarding Structure of Low Refractive Index Layer 25a

Refractive index: 1.38
Height $H_{25a}$ (length in X-axis direction): 1.500 a (7) Ranges of Calculation in Directions of Respective Axes X-axis direction: 8.00 a
Y-axis direction: 4.00 a ($=d_{3a}$)
Z-axis direction: 15.128 a (8) Characteristics of Incident Plane Wave Vacuum wavelength $\lambda_0$: 1.19 a, TE polarized light (whose electric field direction is the X direction)
Intensity distribution: Gaussian beam only in Y-axis direction
Length $d_Y$ in Y-axis direction: 1.00 a It should be noted that $d_Y$ denotes the distance at which the central intensity of the incident plane wave is decreased to $1/e^2$ (13.5%). Here, e is the base of a natural logarithm (=2.718 . . . ).

As described above, in Calculation Example 2, the refractive index $n_F$ of the fluid 6 is 1.33, and the refractive index $n_{SL}$ of the low refractive index layer 25a is 1.38, so that $n_{SL} > n_F$. Therefore, the condition for confining the propagation light is that Expression (10) above, and an expression in which $n_S$ is replaced with $n_{SL}$ in Expression (11) above are satisfied. Accordingly, if the following are not satisfied, then leaking light will occur.

$$\lambda_Z (=2\pi/kz) < \lambda_0/n_F \quad (10)$$

$$a\lambda_Z/(\lambda_Z^2/4+a^2)^{0.5} < \lambda_0/n_{SL} \quad (11)'$$

From the band calculation of the photonic band, the wavelength $\lambda_Z$ in the traveling direction of the electromagnetic waves propagating through the photonic crystal 4 in a mode in the second band on a Brillouin zone boundary is 0.824 a, and the vacuum wavelength $\lambda_0$ of the electromagnetic waves propagating through the photonic crystal 4 is 1.19 a in the condition of Calculation Example 2. Accordingly, both Expressions (10) and (11)' above are satisfied in Calculation Example 2, so that the propagation light propagates through the photonic crystal 4, without leaking.

FIG. 37 shows the simulation results of Calculation Example 2, illustrating the electric field intensity distribution. FIG. 37A is a view in the YZ plane of the waveguide element, and FIG. 37B is a view in the XZ plane of the waveguide element. FIGS. 37A and 37B correspond to FIGS. 36A and 36B, respectively. In FIGS. 37A and 37B, dark areas indicate the areas with strong electric field intensity. From FIGS. 37A and 37B, it can be seen that propagation light due to a mode of the second band on a Brillouin zone boundary whose nodes of the electric field are located in the high refractive index layers is obtained. Additionally, the waves propagate through the photonic crystal 4, and almost no light is observed to leak to the low refractive index layer 25a and the fluid portion 6 serving as the cladding.

INDUSTRIAL APPLICABILITY

The waveguide element according to the present invention can be used as a light control element, and also can be applied to an optical sensor. Such an optical sensor can detect the characteristics of a test substance with high sensitivity, and therefore can be used in a wide range of applications, including, for example, component analysis and the detection and monitoring of a specific component in the fields of chemistry, biology, medical care, and so on.

The invention claimed is:

1. A waveguide element comprising:

a photonic crystal waveguide including a core that is constituted by a photonic crystal having a refractive index periodicity at least in one direction, and that propagates an electromagnetic wave in a direction in which the photonic crystal does not have the refractive index periodicity, wherein at least one of materials forming the core constituted by the photonic crystal, and at least a portion of a cladding in contact with a side face of the core are constituted by a fluid, wherein the at least a portion of the cladding in contact with the side face of the core is in contact with at least one side face of the core that is parallel to the direction in which the photonic crystal has the refractive index periodicity, and when the period in a traveling direction of an electromagnetic wave propagating through the core is $\lambda_Z$, the refractive index of the fluid is $n_F$, the period of the core constituted by the photonic crystal is a, and the vacuum wavelength of an electromagnetic wave propagating through the core is $\lambda_0$, then the following condition is satisfied:

$$a\lambda_Z/(\lambda_Z^2/4+a^2)^{0.5} < \lambda_0/n_F.$$

2. The waveguide element according to claim 1,
comprising an input portion that causes, in the core, propagation light due to a band on a Brillouin zone boundary,
wherein the input portion is a waveguide having no periodic structure,
further comprising a substrate on whose principal surface the core constituted by the photonic crystal is disposed, and
an input-side end face of the core is perpendicular to the principal surface of the substrate, and is not parallel, but inclined with respect to the direction of the periodicity of the core.

3. The waveguide element according to claim 2,
wherein the propagation light due to the band on the Brillouin zone boundary is propagation light due to a first band or a second band.

4. The waveguide element according to claim 1,
comprising an input portion that causes, in the core, propagation light due to a band on a Brillouin zone boundary,
wherein the input portion comprises a phase grating having a period that is twice the period of the core.

5. The waveguide element according to claim 4,
wherein the propagation light due to the band on the Brillouin zone boundary is propagation light due to a first band or a second band.

6. The waveguide element according to claim 1,
comprising an input portion that causes, in the core, propagation light of a propagation mode in a photonic band that is on a center line of a Brillouin zone or in the vicinity thereof and is not the lowest order band,
wherein the input portion comprises a phase grating having a period that is identical with the period of the core.

7. The waveguide element according to claim 1,
comprising an input portion that causes, in the core, propagation light of a propagation mode in a photonic band that is on a center line of a Brillouin zone or in the vicinity thereof and is not the lowest-order band,
wherein the input portion is a waveguide having no periodic structure.

8. The waveguide element according to claim 7,
further comprising a substrate on whose principal surface the core constituted by the photonic crystal is disposed, and
an input-side end face of the core is perpendicular to the principal surface of the substrate, and is not parallel, but inclined with respect to the direction of the periodicity of the core.

9. A waveguide element comprising:
a photonic crystal waveguide including a core that is constituted by a photonic crystal having a refractive index periodicity at least in one direction, and that propagates an electromagnetic wave in a direction in which the photonic crystal does not have the refractive index periodicity,
wherein at least one of materials forming the core constituted by the photonic crystal, and at least a portion of a cladding in contact with a side face of the core are constituted by a fluid,
wherein a plurality of flat plates are provided at equal intervals on a substrate such that they are parallel to each other and perpendicular to the substrate,
the fluid is disposed between the flat plates and around each of the flat plates,
the core constituted by the photonic crystal is formed by the flat plates and the fluid disposed between the flat plates, and
the fluid disposed on the side face of the core constitutes the at least a portion of the cladding, and
wherein, when the period in a traveling direction of an electromagnetic wave propagating through the core is $\lambda_Z$, the refractive index of the fluid is $n_F$, the period of the core constituted by the photonic crystal is a, and the vacuum wavelength of the electromagnetic wave propagating through the core is $\lambda_0$, the following condition is satisfied:

$$a\lambda_Z/(\lambda_Z^2/4+a^2)^{0.5} < \lambda_0/n_F.$$

10. The waveguide element according to claim 9,
wherein, when the refractive index of the substrate is $n_S$, the following condition is satisfied:

$$a\lambda_Z/(\lambda_Z^2/4+a^2)^{0.5} < \lambda_0/n_S.$$

11. The waveguide element according to claim 10,
wherein a plurality of cladding flat plates further are provided at equal intervals outside the core on the substrate in the direction in which the core has the refractive index periodicity such that they are parallel to each other and perpendicular to the substrate,
the thickness of the plurality of flat plates is different from the thickness of the plurality of cladding flat plates, or the interval between the flat plates and the interval between the cladding flat plates is different,
the fluid is disposed between the cladding flat plates and around each of the cladding flat plates, and
the cladding flat plates and the fluid constitute a cladding that confines light to the core, using a photonic band gap.

12. The waveguide element according to claim 9,
wherein the following condition is satisfied:

$$\lambda_Z < \lambda_0/n_F.$$

13. The waveguide element according to claim 12,
wherein a multilayer film laminated in a direction perpendicular to a principal plane of the substrate is provided between the substrate and the plurality of flat plates.

14. The waveguide element according to claim 12,
wherein a low refractive index layer made of a material having a lower refractive index than the substrate is provided between the substrate and the plurality of flat plates, and
when the refractive index of the low refractive index layer is $n_{SL}$, the following condition is satisfied:

$$a\lambda_Z/(\lambda_Z^2/4+a^2)^{0.5} < \lambda_0/n_{SL}.$$

15. The waveguide element according to claim 9,
comprising an input portion that causes, in the core, propagation light due to a band on a Brillouin zone boundary,
wherein the input portion is a waveguide having no periodic structure,
further comprising a substrate on whose principal surface the core constituted by the photonic crystal is disposed, and
an input-side end face of the core is perpendicular to the principal surface of the substrate, and is not parallel, but inclined with respect to the direction of the periodicity of the core.

16. The waveguide element according to claim 15,
wherein the propagation light due to the band on the Brillouin zone boundary is propagation light due to a first band or a second band.

17. The waveguide element according to claim 9,
comprising an input portion that causes, in the core, propagation light due to a band on a Brillouin zone boundary, wherein the input portion comprises a phase grating having a period that is twice the period of the core.

18. The waveguide element according to claim 17, wherein the propagation light due to the band on the Brillouin zone boundary is propagation light due to a first band or a second band.

19. The waveguide element according to claim 9, comprising an input portion that causes, in the core, propagation light of a propagation mode in a photonic band that is on a center line of a Brillouin zone or in the vicinity thereof and is not the lowest-order band, wherein the input portion comprises a phase grating having a period that is identical with the period of the core.

20. The waveguide element according to claim 9, comprising an input portion that causes, in the core, propagation light of a propagation mode in a photonic band that is on a center line of a Brillouin zone or in the vicinity thereof and is not the lowest-order band, wherein the input portion is a waveguide having no periodic structure.

21. The waveguide element according to claim 20, further comprising a substrate on whose principal surface the core constituted by the photonic crystal is disposed, and an input-side end face of the core is perpendicular to the principal surface of the substrate, and is not parallel, but inclined with respect to the direction of the periodicity of the core.

22. An optical sensor comprising:
a waveguide portion including a core that is constituted by a photonic crystal having a refractive index periodicity at least in one direction, and that propagates light in a direction in which the photonic crystal does not have the refractive index periodicity;
an input portion that makes light incident on the waveguide portion; and
a detection portion that detects light emitted from the waveguide portion,
wherein the waveguide portion has a configuration in which a plurality of flat plates are provided on a substrate such that they are parallel to each other and perpendicular to the substrate, and allowing a fluid serving as a test substance to be disposed between the flat plates and around each of the flat plates,
wherein the core constituted by the photonic crystal is formed by the flat plates and the fluid disposed between the flat plates, and the fluid disposed on the side face of the core constitutes at least a portion of a cladding, and
wherein, when the period in a traveling direction of an electromagnetic wave propagating through the core is $\lambda_Z$, the refractive index of the fluid is $n_F$, the period of the core constituted by the photonic crystal is a, and the vacuum wavelength of the electromagnetic wave propagating through the core is $\lambda_0$, the following condition is satisfied:

$$a\lambda_Z/(\lambda_Z^2/4+a^2)^{0.5} < \lambda_0/n_F.$$

23. The optical sensor according to claim 22, wherein the detection portion detects the type, intensity, frequency or phase of the light emitted from the waveguide portion.

24. The optical sensor according to claim 22, wherein a layer that selectively reacts with a specific component contained in the test substance is formed on at least a portion of a surface of the flat plates.

25. The optical sensor according to claim 22, wherein a metal film is formed on at least a portion of a surface of the flat plates.

26. The optical sensor according to claim 25, wherein a layer that selectively reacts with a specific component contained in the test substance is further formed on at least a portion of a surface of the metal film.

27. A method for producing a waveguide element, the waveguide element comprising:
a photonic crystal waveguide including a core that is constituted by a photonic crystal having a refractive index periodicity at least in one direction, and that propagates an electromagnetic wave in a direction in which the photonic crystal does not have the refractive index periodicity,
wherein at least one of materials forming the core constituted by the photonic crystal, and at least a portion of a cladding in contact with a side face of the core are constituted by a fluid, and
wherein, when the period in a traveling direction of an electromagnetic wave propagating through the core is $\lambda_Z$, the refractive index of the fluid is $n_F$, the period of the core constituted by the photonic crystal is a, and the vacuum wavelength of the electromagnetic wave propagating through the core is $\lambda_0$, the following condition is satisfied:

$$a\lambda_Z/(\lambda_Z^2/4+a^2)^{0.5} < \lambda_0/n_F;$$

the method comprising the steps of:
forming, on a substrate, at equal intervals, a plurality of flat plates such that they are parallel to each other and perpendicular to the substrate;
disposing the fluid between the flat plates and around each of the flat plates; and
solidifying the fluid, thereby forming the core constituted by the photonic crystal by the flat plates and the fluid disposed between the flat plates, and forming the at least a portion of the cladding by the fluid disposed on the side face of the core.

* * * * *